(12) United States Patent
Langmacher et al.

(10) Patent No.: US 9,459,771 B2
(45) Date of Patent: Oct. 4, 2016

(54) METHOD AND APPARATUS FOR MODIFYING ATTRIBUTES OF MEDIA ITEMS IN A MEDIA EDITING APPLICATION

(71) Applicant: Apple Inc., Cupertino, CA (US)

(72) Inventors: Tom Langmacher, Washougal, WA (US); Samuel Joseph Liberto, III, Portland, OR (US)

(73) Assignee: APPLE INC., Cupertino, CA (US)

( * ) Notice: Subject to any disclaimer, the term of this patent is extended or adjusted under 35 U.S.C. 154(b) by 409 days.

(21) Appl. No.: 13/902,757

(22) Filed: May 24, 2013

(65) Prior Publication Data
US 2013/0339856 A1 Dec. 19, 2013

Related U.S. Application Data

(62) Division of application No. 12/475,598, filed on May 31, 2009, now Pat. No. 8,458,593.

(60) Provisional application No. 61/174,491, filed on Apr. 30, 2009.

(51) Int. Cl.
*G06F 3/048* (2013.01)
*G06F 3/0484* (2013.01)
(Continued)

(52) U.S. Cl.
CPC ......... *G06F 3/0484* (2013.01); *G06F 3/04847* (2013.01); *G11B 27/034* (2013.01); *G11B 27/34* (2013.01)

(58) Field of Classification Search
CPC ............ G06F 3/0484; G06F 3/04847; G06F 3/0482; G06F 3/04842; G11B 27/034; G11B 27/34; G11B 27/036

USPC .......................... 715/723, 726, 771, 721, 711
See application file for complete search history.

(56) References Cited

U.S. PATENT DOCUMENTS

| 4,181,961 A | 1/1980 | Nopper |
| 4,868,687 A | 9/1989 | Penn et al. |

(Continued)

FOREIGN PATENT DOCUMENTS

| CN | 2526911 Y | * 12/2002 |
| WO | WO 00/36496 | 6/2000 |

(Continued)

OTHER PUBLICATIONS

Portions of prosecution history of U.S. Appl. No. 14/433,886, Sep. 25, 2013, Langmacher, Tom, et al.
(Continued)

*Primary Examiner* — Steven Sax
(74) *Attorney, Agent, or Firm* — Adeli LLP

(57) ABSTRACT

Some embodiments provide novel methods for editing the value of an attribute of a media item (e.g., a media content or a media operation) for a media editing application. Such attributes of a media item can include scale, rotation, opacity, pan, volume, etc. In some embodiments, a media editing application represents the changing value of such an attribute over a duration (e.g., a duration of time or frequencies, etc.) as a key-indexed geometry. A user can manipulate these geometries to change the attribute value over a duration, which may include graphs and shapes. For such applications, some embodiments provide a novel method for editing the value of one or more attribute directly in a preview display area used to view the composite presentation created in the media editing application.

21 Claims, 46 Drawing Sheets

(51) Int. Cl.
*G11B 27/034* (2006.01)
*G11B 27/34* (2006.01)

(56) References Cited

U.S. PATENT DOCUMENTS

| | | | |
|---|---|---|---|
| 5,146,346 A | 9/1992 | Knoll | |
| 5,151,998 A | 9/1992 | Capps | |
| 5,204,969 A | 4/1993 | Capps et al. | |
| 5,331,111 A | 7/1994 | O'Connell | |
| 5,359,712 A | 10/1994 | Cohen et al. | |
| 5,659,793 A | 8/1997 | Escobar et al. | |
| 5,664,216 A | 9/1997 | Blumenau | |
| 5,682,326 A | 10/1997 | Klingler et al. | |
| 5,692,117 A | 11/1997 | Berend et al. | |
| 5,812,983 A | 9/1998 | Kumagai | |
| 5,835,611 A | 11/1998 | Kaiser et al. | |
| 5,874,950 A | 2/1999 | Broussard et al. | |
| 5,898,436 A | 4/1999 | Stewart et al. | |
| 5,929,867 A | 7/1999 | Herbstman et al. | |
| 5,940,573 A | 8/1999 | Beckwith | |
| 5,941,820 A | 8/1999 | Zimmerman | |
| 5,999,173 A * | 12/1999 | Ubillos | 715/724 |
| 5,999,195 A | 12/1999 | Santangeli | |
| 6,023,016 A | 2/2000 | Tamura | |
| 6,108,011 A | 8/2000 | Fowler | |
| 6,154,221 A | 11/2000 | Gangnet | |
| 6,154,600 A | 11/2000 | Newman et al. | |
| 6,154,601 A | 11/2000 | Yaegashi et al. | |
| 6,222,540 B1 | 4/2001 | Sacerdoti | |
| 6,239,846 B1 | 5/2001 | Billing | |
| 6,266,103 B1 | 7/2001 | Barton et al. | |
| 6,392,135 B1 | 5/2002 | Kitayama | |
| 6,392,710 B1* | 5/2002 | Gonsalves et al. | 348/578 |
| 6,469,711 B2 | 10/2002 | Foreman et al. | |
| 6,504,545 B1 | 1/2003 | Browne et al. | |
| 6,512,522 B1 | 1/2003 | Miller et al. | |
| 6,704,029 B1 | 3/2004 | Ikeda et al. | |
| 6,744,968 B1 | 6/2004 | Imai et al. | |
| 6,763,175 B1 | 7/2004 | Trottier et al. | |
| 6,778,186 B2 | 8/2004 | Mehigan | |
| 6,828,971 B2 | 12/2004 | Uesaki et al. | |
| 6,867,787 B1 | 3/2005 | Shimizu et al. | |
| 6,928,613 B1 | 8/2005 | Ishii et al. | |
| 6,956,574 B1 | 10/2005 | Cailloux et al. | |
| 7,006,688 B2 | 2/2006 | Zaklika et al. | |
| 7,030,872 B2 | 4/2006 | Tazaki | |
| 7,062,713 B2 | 6/2006 | Schriever et al. | |
| 7,134,093 B2 | 11/2006 | Etgen et al. | |
| 7,194,676 B2 | 3/2007 | Fayan et al. | |
| 7,225,405 B1 | 5/2007 | Barrus et al. | |
| 7,239,316 B1 | 7/2007 | Cox et al. | |
| 7,319,764 B1 | 1/2008 | Reid et al. | |
| 7,355,606 B2 | 4/2008 | Paquette | |
| 7,381,188 B1 | 6/2008 | Farazi | |
| 7,518,611 B2 | 4/2009 | Boyd et al. | |
| 7,546,532 B1 | 6/2009 | Nichols et al. | |
| 7,594,182 B2* | 9/2009 | King | G06F 9/542 715/700 |
| 7,616,868 B2 | 11/2009 | Hosoda et al. | |
| 7,725,828 B1 | 5/2010 | Johnson | |
| 7,765,491 B1* | 7/2010 | Cotterill | 715/833 |
| 7,965,292 B2 | 6/2011 | Buck | |
| 7,979,318 B1 | 7/2011 | Morton et al. | |
| 7,986,355 B2 | 7/2011 | Nozawa | |
| 7,995,474 B2 | 8/2011 | Berstis | |
| 8,209,612 B2 | 6/2012 | Johnson | |
| 8,286,081 B2 | 10/2012 | Langmacher et al. | |
| 8,458,593 B2 | 6/2013 | Langmacher et al. | |
| 8,543,921 B2 | 9/2013 | Langmacher et al. | |
| 8,566,721 B2 | 10/2013 | Langmacher et al. | |
| 2001/0020953 A1* | 9/2001 | Moriwake et al. | 345/723 |
| 2001/0036356 A1 | 11/2001 | Weaver et al. | |
| 2001/0040592 A1* | 11/2001 | Foreman et al. | 345/723 |
| 2002/0044148 A1 | 4/2002 | Ludi | |
| 2002/0154140 A1* | 10/2002 | Tazaki | 345/620 |
| 2002/0154156 A1 | 10/2002 | Moriwake et al. | |
| 2002/0156805 A1 | 10/2002 | Schriever et al. | |
| 2002/0163498 A1 | 11/2002 | Chang et al. | |
| 2003/0117431 A1 | 6/2003 | Moriwake et al. | |
| 2003/0139995 A1* | 7/2003 | Farley | G06Q 10/06 705/37 |
| 2003/0146915 A1 | 8/2003 | Brook et al. | |
| 2003/0164845 A1 | 9/2003 | Fayan et al. | |
| 2004/0071441 A1 | 4/2004 | Foreman et al. | |
| 2004/0088723 A1 | 5/2004 | Ma et al. | |
| 2004/0199395 A1 | 10/2004 | Schulz | |
| 2005/0007383 A1 | 1/2005 | Potter et al. | |
| 2006/0005130 A1 | 1/2006 | Hiroi et al. | |
| 2006/0008247 A1* | 1/2006 | Minami et al. | 386/52 |
| 2006/0109271 A1 | 5/2006 | Lomask | |
| 2006/0271865 A1* | 11/2006 | Garbow | G06F 17/30398 715/764 |
| 2006/0282248 A1* | 12/2006 | Kageyama | G06F 17/5009 703/13 |
| 2007/0093913 A1 | 4/2007 | Ferguson et al. | |
| 2007/0104384 A1 | 5/2007 | Shaw | |
| 2007/0159487 A1 | 7/2007 | Felt | |
| 2007/0243515 A1 | 10/2007 | Hufford | |
| 2007/0245238 A1 | 10/2007 | Fugitt et al. | |
| 2008/0080721 A1 | 4/2008 | Reid et al. | |
| 2008/0289477 A1 | 11/2008 | Salter | |
| 2009/0002370 A1 | 1/2009 | Helfman | |
| 2009/0019995 A1 | 1/2009 | Miyajima | |
| 2009/0046097 A1 | 2/2009 | Franklin | |
| 2009/0174551 A1* | 7/2009 | Quinn | G06F 21/552 340/540 |
| 2009/0201310 A1 | 8/2009 | Weiss | |
| 2009/0297022 A1* | 12/2009 | Pettigrew | H04N 1/62 382/162 |
| 2010/0180224 A1 | 7/2010 | Willard et al. | |
| 2010/0201692 A1 | 8/2010 | Niles et al. | |
| 2011/0131526 A1 | 6/2011 | Vronay et al. | |
| 2011/0258547 A1 | 10/2011 | Symons et al. | |
| 2013/0097502 A1 | 4/2013 | Langmacher et al. | |

FOREIGN PATENT DOCUMENTS

WO    WO 2009/122213    10/2009
WO    WO 2010/106586    9/2010

OTHER PUBLICATIONS

Portions of prosecution history of U.S. Appl. No. 12/475,601, Aug. 30, 2013, Langmacher, Tom, et al.
Portions of prosecution history of U.S. Appl. No. 12/475,602, Sep. 6, 2012, Langmacher, Tom, et al.
Portions of prosecution history of U.S. Appl. No. 12/475,598, May 9, 2013, Langmacher, Tom, et al.
Allen, Damian, et al., "Apple Pro Training Series Motion 3," Safari Books Online, Aug. 30, 2007, 7 pages, Peachpit Press.
Author Unknown, "Adobe Premiere Pro CS3," Classroom in a Book, Nov. 3, 2007, 21 pages, Adobe Press.
Author Unknown, "Apple Announces Final Cut Pro 4," NAB, Apr. 6, 2003, pp. 1-3, Apple Inc., Las Vegas, NV, USA.
Author Unknown, "Adobe Director 11: User Guide," Month Unknown, 2008, 498 pages, Adobe Systems Incorporated, San Jose, California, USA.
Author Unknown, "Adobe Premiere Pro CS3: User Guide," Apr. 1, 2008, 455 pages, Adobe Systems Incorporated, San Jose, California, USA.
Author Unknown, "Cinelerra CV Manual," Chapters 1, 2 and 18, Mar. 8, 2008, 34 pages.
Author Unknown, "Cinelerra Linux Video Editing, Cinelerra Cv Manual Section 18: Keyframing," Feb. 16, 2008, 4 pages.
Author Unknown, "Editing for Beginners Part 2—Cut, Copy and Paste," http://audacity.sourceforge.net/manual-1.2/tutorial_ed_beginner2.html, Apr. 12, 2004, 3 pages.
Author Unknown, "iMovie '08 Getting Started," Month Unknown, 2008, pp. 1-50, Apple Inc., USA.
Author Unknown, "KDenLive Open Source Video Editing, Keyframe for Every Video and Audio Effect Variable in the Effects Stack," Nov. 10, 2008 through May 1, 2009, 5 pages.

(56) References Cited

OTHER PUBLICATIONS

Author Unknown, "Using Adobe Flash CS4 Professional," Updated Mar. 5, 2009, 474 pages, Adobe Systems Incorporated, San Jose, California, USA.
Author Unknown, "Using Adobe Premiere Elements 8 Editor," Month Unknown, 2009, 313 pages, Adobe Systems Incorporated, San Jose, California, USA.
Bolante, Anthony, "Premiere Pro CS3 for Windows and Macintosh: Visual QuickPro Guide," Dec. 4, 2007, 2 pages, Peachpit Press.
Brenneis, Lisa, "Final Cut Pro 3 for Macinotsh: Visual QuickPro Guide," Apr. 2002, 288 pages, Peachpit Press, Berkeley, CA, USA.
Jones, Jerry, "India Pro Special Effects Titler," The Ken Stone Index, Apr. 1, 2002, pp. 1-18.
Meade, Tom, et al., "Maya 6: The Complete Reference," Month N/A, 2004, pp. iv-xviii, 194, 204, McGraw-Hill Professional, USA.
Spencer, Mark, "Working with Keyframes in Motion, Part 1: Creating and Manipulating Keyframes," The Ken Stone Index, Feb. 11, 2005, 7 pages.
Stone, Ken, "Basic Keyframing in Final Cut Express", The Ken Stone Index, Jan. 27, 2003, pp. 1-14, V. 1.0.1, Ken Stone.
Stone, Ken, "Motion Paths and the Bezier Handle in FCP," The Ken Stone Index, Aug. 13, 2001, pp. 1-11, Ken Stone.
Stone, Ken, "Boris Calligraphy: Text Generators for Final Cut Pro 3 Title Creation and Animation with 'Title 3D' and 'Title Crawl'," The Ken Stone Index, Jan. 14, 2002, pp. 1-11.
Stone, Ken, "The Basics—Editing with Transitions in Final Cut Pro," The Ken Stone Index, Jun. 12, 2001, pp. 1-8.
Stone, Ken, "Using the Text Generators in FCP," The Ken Stone Index, Aug. 27, 2001, pp. 1-13.

* cited by examiner

METHOD AND APPARATUS FOR MODIFYING ATTRIBUTES OF MEDIA ITEMS IN A MEDIA EDITING APPLICATION

CLAIM OF BENEFIT TO PRIOR APPLICATIONS

This application is a divisional application of U.S. patent application Ser. No. 12/475,598, filed May 31, 2009, now published as U.S. Publication 2010/0281367. U.S. patent application Ser. No. 12/475,598 claims the benefit of U.S. Provisional Application 61/174,491, entitled "Editing Key-Indexed Graphs in Media Editing Applications", filed Apr. 30, 2009. U.S. patent application Ser. No. 12/475,598, now published as U.S. Publication 2010/0281367 and U.S. Provisional Application 61/174,491 are incorporated herein by reference.

FIELD OF THE INVENTION

The invention relates to editing attributes of media items in a media editing application.

BACKGROUND OF THE INVENTION

To date, many media editing applications have been proposed for editing digital graphic designs, image editing, audio editing, and video editing. These applications provide graphical designers, media artists, and other users with the tools for creating and editing media presentations. Examples of such applications include Final Cut Pro® and iMovie®, both sold by Apple® Inc.

Several of the media editing applications provide editing tools that allow the users to perform keyframe editing. Typically, keyframe editing is done on attributes that are associated with a particular media content. The value of an attribute is defined at a particular keyframe by its position on a line graph where the line graph connects one or more keyframes for representing the changing value of that particular attribute over the same period in which its corresponding media content spans.

Each keyframe is identified as a control point that conveys the particular location and value of one attribute of a media content. A user of a media editing application must know how to manipulate these control points with a certain amount of precision to create desired effects. For instance, to modify the shape of the line in between two keyframes, each control point has corresponding Bezier handles in some prior media editing applications. These Bezier handles are pulled, pushed, and dragged in various directions in the coordinate chart to affect the curve of the line between the keyframes. A user must not only understand how to manipulate these control points and their associated Bezier handles but also possess the patience and drawings skills to create a desired effect between keyframes. Furthermore, if a user wishes to create the same keyframes and effects for a second or multiple other attributes, the user must repeat the same editing operations for each attribute.

Therefore, there is a need for a more simplified way of performing keyframe editing. This includes the ability to affect multiple keyframes for multiple attributes to avoid repetitive editing to achieve the same results for multiple attributes. Also, there is a need for a media editing application that allow its user to perform simple to complex keyframe editing with minimal drawing skills and without having to understand how control points and Bezier handles work.

SUMMARY OF THE INVENTION

Some embodiments of the invention provide novel methods for editing the value of an attribute of a media item (e.g., a media content or a media operation) for a media editing application. Such attributes of a media item can include scale, rotation, opacity, pan, volume, etc. In some embodiments, a media editing application represents the changing value of such an attribute over a duration (e.g., a duration of time, a duration of frequencies, etc.) as a key-indexed geometry. A user of the media editing application can manipulate these geometries to change the attribute value over a duration. Such geometries may include graphs and shapes. For such applications, some embodiments provide novel compressed geometric representations (i.e., collapsed views) of one or more uncompressed key-indexed geometries (e.g., graphs or shapes). Additionally, other embodiments provide a novel method for editing the value of one or more attribute directly in a preview display area used to view the composite presentation created in the media editing application.

The compressed and uncompressed key-indexed geometries represent the value of attributes across a duration, which may be a temporal duration, a frequency duration, or any other duration of interest for a media editing operation. In some embodiments, the compressed geometric representations that span across a temporal duration, take the form of a timing bar. Specifically, some embodiments provide collapsed views of key-indexed geometries (e.g., key-indexed graphs and/or shapes) as single-attribute timing bars, multi-attribute timing bars, and/or global timing bars on which a user can perform simple to complex key-index edit operations for one or more attributes. In some embodiments, examples of certain operations that can be performed on a collapsed timing bar include creating new key indices, relocating key-indices, manipulating the attribute value at a key-index, and effecting the interpolation between two key indices.

In some embodiments, each type of timing bar can be edited to affect the value of one or more attributes over a duration. A single-attribute timing bar is a geometry that represents the value of one particular attribute over a duration. A multi-attribute timing bar represents two or more attribute geometries where manipulation of the multi-attribute timing bar simultaneously affects each attribute associated with the multi-attribute timing bar in a similar fashion. A global timing bar is a collective representation of all the active attributes displayed in a particular display area of the media editing application. In other words, a particular global timing bar in some embodiments is a bar that is associated with a particular display area that displays a particular set of key-indexed geometries. When user edits are made on a global timing bar, each active attribute displayed in the particular display area of the media editing application will be affected by the edit in a similar fashion.

In some embodiments, when a new key index is created on a timing bar, it is represented by displaying a key-index marker along with a moveable key index on the timing bar. In some embodiments, a key index marker is a line that spans the timing bar to identify the location of the key index over a duration. The moveable key index sits along the key index marker. The vertical position of the key index along the key index marker conveys the attribute value at that position. The moveable key index can also slide vertically along the key index marker to affect the attribute value at that particular position. Both the key index marker and moveable key index may also be selected and moved horizontally along the timing bar to relocate the position of the key index over a duration.

Some embodiments also display the attribute value through text labels directly on the timing bar. For example, the value of an attribute at a particular key index can be displayed with text on the timing bar itself. In some embodiments, a text label will display a constant value of an attribute between two key indices when the value at the both key indices is the same. When the attribute value at each key index changes between two key indices, the text label can show a beginning value and the ending value. Furthermore, an icon can also be displayed between the two values to indicate a particular type of interpolation that is applied between the two key indices. These text labels can also be selected and modified to affect the value of an attribute at one or more key indices.

Some embodiments also provide novel interpolation marks on a timing bar in order to manipulate the interpolation between two key indices on a timing bar. The interpolation defines the ease or speed at which an attribute value changes between starting and ending key indices. The speed at which the attribute value changes can be represented by several interpolation marks that span a timing bar between a starting and ending key index. The spacing between each of the interpolation marks represents how slow or fast the value is changing. Some embodiments interpret a smaller distance between each interpolation mark as a slower change in value and a larger distance to represent a faster change. Other embodiments can interpret the speed in the alternative where a smaller spacing represents a faster change and a larger spacing represents a slower change in attribute value. Some embodiments allow these interpolation marks to be modified as a group through selection of the timing bar in any region between the starting and ending key indices. A cursor selection and movement (e.g., through a click and drag operation), vertically or horizontally, can manipulate the marks by squeezing or distancing the interpolation marks in the selected region thereby affecting the speed at which the attribute value changes between the starting and ending key indices.

As mentioned above, some embodiments also provide the ability to manipulate the value of one or more attributes of a media item directly from a display area for displaying presentations (e.g., preview presentation) of media content in the media editing application. This ability is provided with some or all of the key-indexed editing operations of the above described collapsed key-index representations in some embodiments. In other embodiments, this ability is provided in lieu of the above described key index editing operations of the collapsed key-indexed representations. In some embodiments, a display area, or canvas, is for previewing a presentation created in a media editing application. While editing content in the application, the canvas will display a frame of a media item on the canvas. This frame corresponds to a point in the duration of the presentation as defined by the position of a playhead.

From the canvas, a user can manipulate multiple attributes of the media item being displayed using various editing tools. In some embodiments, such tools can be defined by selectable graphics directly on the canvas, through user interface buttons, right-click context menus, or drop down menus. Using these tools, a user can select a pre-defined duration and interpolation for the each attribute being edited on the canvas. Specifically, a user can create a new key index at the playhead for each attribute that is edited on the canvas. If a duration is identified, a second key index can automatically be created as a starting or ending key index for the pre-defined duration. Furthermore, if a pre-defined interpolation is selected for the edits, the interpolation will be applied between the starting and ending key indices for each attribute edited on the canvas. Therefore, canvas editing is an alternative way of modifying the value of an attribute over a duration. Some embodiments translate the edit operations that are directly specified on the canvas into a key-indexed geometry or geometries, which may also be used subsequently to modify the value of the attribute.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
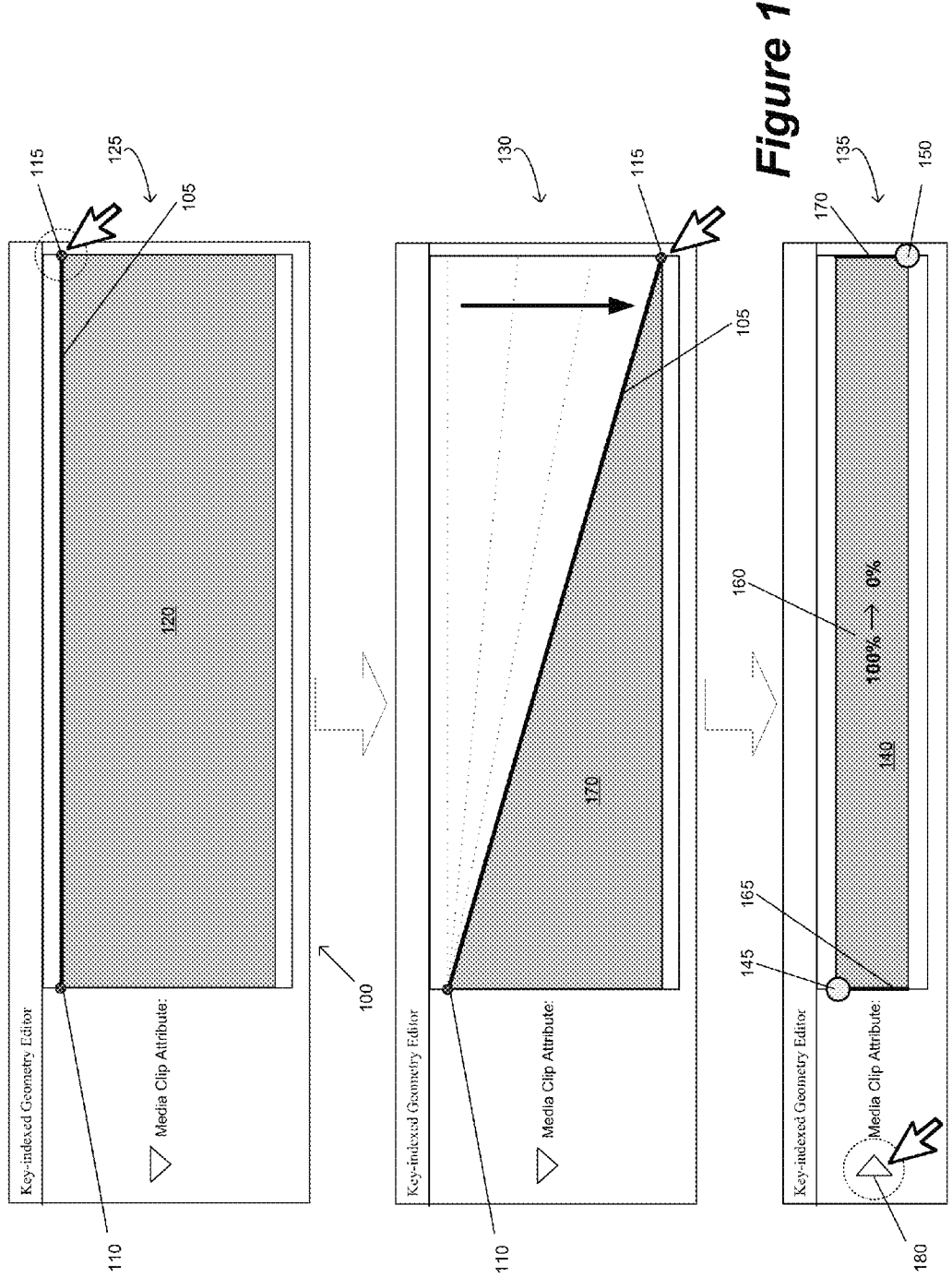
FIG. 1 illustrates a key-indexed graph and a collapsed representation of the key-indexed graph in some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a media editing application, some embodiments of the invention provide novel methods for editing the value of an attribute of a media content or a media operation. Some media editing applications represent the changing value of such an attribute over a duration (e.g., a duration of time, a duration of frequencies, etc.) as a key-indexed geometry. Such geometries may include graphs, graph shapes, or bars. For such applications, some embodiments provide novel compressed or collapsed views of one or more key-indexed graphs or shapes. For instance, some embodiments provide single-attribute timing bars, multi-attribute timing bars, and/or global timing bars on which a user can perform key-index edit operations for one or more attributes. Other embodiments provide a novel method for manipulating the value of one or more attribute directly in a display area that is used to view the media content in the media editing application.

Several examples of such embodiments will be initially described below by reference to FIGS. 1-8. However, before describing these initial examples, several terms are defined. In some media editing applications, a key index represents a value (e.g., a default value or a user-specified value) of an attribute of a media content (e.g., a clip) or a media operation at a particular location in a particular duration. For example, in a fade to black operation, a starting key index might represent one point in time when an opacity attribute starts to change from fully visible to fully transparent, and an ending key index represents another transitional point in time when the change ends.

Some embodiments use such key indices to define geometries such as graphs and/or shapes that specify the transitioning values of any attribute associated with the edited media content (e.g., media clips) or the editing operations. Different types of media content may have different attributes. For instance, attributes of a video clip may include opacity, axis, color, and scale, while attributes of an audio clip may include volume level, echo, and pan. Moreover, the duration across which the attributes are defined may differ. They may differ in length or in type (e.g., the duration might be expressed in time, or in frequency, or along a different axis).

FIGS. 1-8 illustrate examples of compressed timing bars of the media editing application of some embodiments of the invention. The many embodiments that will be described will refer to key-indexed graphs and their associated shapes as well as collapsed timing bar representations of those graphs and shapes. These terms represent different types of key-indexed geometries. The geometries represent the values of attributes across a duration, which may be a temporal duration, a frequency duration, or any other duration of interest for a media editing application. Although compressed representations of the geometries will be referred to as timing bars, they can also be frequency bars for a frequency duration.

In the following examples, the timing bars are compressed representations of key-indexed graphs and their associated key-indexed shapes that specify the changing values of attributes along a timeline. One of ordinary skill will realize, however, that such compressed timing bars can be used in embodiments that only used key-indexed graphs or key-indexed shapes to specify the changing values of attributes. For purposes of simplifying the description of these figures, only the geometry editing window 100 of the media editing application is shown in these figures. An example of a graphical user interface ("GUI") of a media editing application of some embodiments is described further below in FIG. 9.

FIG. 1 illustrates a key-indexed graph 105 being collapsed into a timing bar representation. Specifically, FIG. 1 illustrates the geometry editing window 100 at three different stages, a first stage 125 displaying a key-indexed graph, a second stage 130 where one of the key-indices of the graph is manipulated, and a third stage 135 illustrating a timing bar as the collapsed version of the key-indexed graph.

In the first stage 125, a key-indexed graph 105 is initially shown in the key-index geometry editing window 100. This graph 105 represents the value of an attribute (e.g., opacity, position, volume level) of a media clip (e.g., audio clip, video clip, text overlay, picture, and/or other media) over a duration of time. Initially, the graph 105 is a horizontal line that represents a constant attribute value. This graph also defines a rectangular shape 120 within the window 100 of the media editing application; in other words, the key-indexed shape 120 is initially defined underneath the graph 105. Also, in this example, a timeline (not shown) spans across the window 100. One or more media tracks (not shown) also span along this timeline in a composite display area of the media editing application. Each track is for holding one or more media clips, with each clip lasting a particular duration. Each media clip can have several attributes, one of which is represented by the key-indexed graph 105 in this first stage 125.

As shown in the second stage 130 of FIG. 1, the value of the attribute at the second key index 115 is changed to a zero value thus changing the slope of the graph 105. The graph 105 in the second stage 130 now defines a triangular shape 170. This shape is an example of one editable shape in some embodiments of the media editing application.

The third stage 135 illustrates selection of a user control 165 which presents the user with a modified view of the key-indexed graph 105 and the shape 170 it defines. Specifically, the selection of the user control 180 causes the key-indexed graph 105 to collapse into a compressed timing bar 140. This timing bar represents the key-indexed graph 105 in a collapsed form. Some embodiments provide the user selectable control 180 to expand and collapse the view of a key-indexed graph while others may accomplish the same with different user commands (e.g., a click or double-click selection of the attribute label or a key-board shortcut).

The timing bar 140 displays each key index 110 and 115 as selectable key indices 145 and 150 on respective key index markers 165 and 170. The vertical position of each key index 145 and 150 along the key index markers 165 and 170 conveys the value of the attribute. Here, the first key index 145 is located towards the top of the timing bar representing the attribute value at its maximum, while the second key index 150 is located at the bottom of the timing bar representing the attribute value at its minimum.

Figure 2:
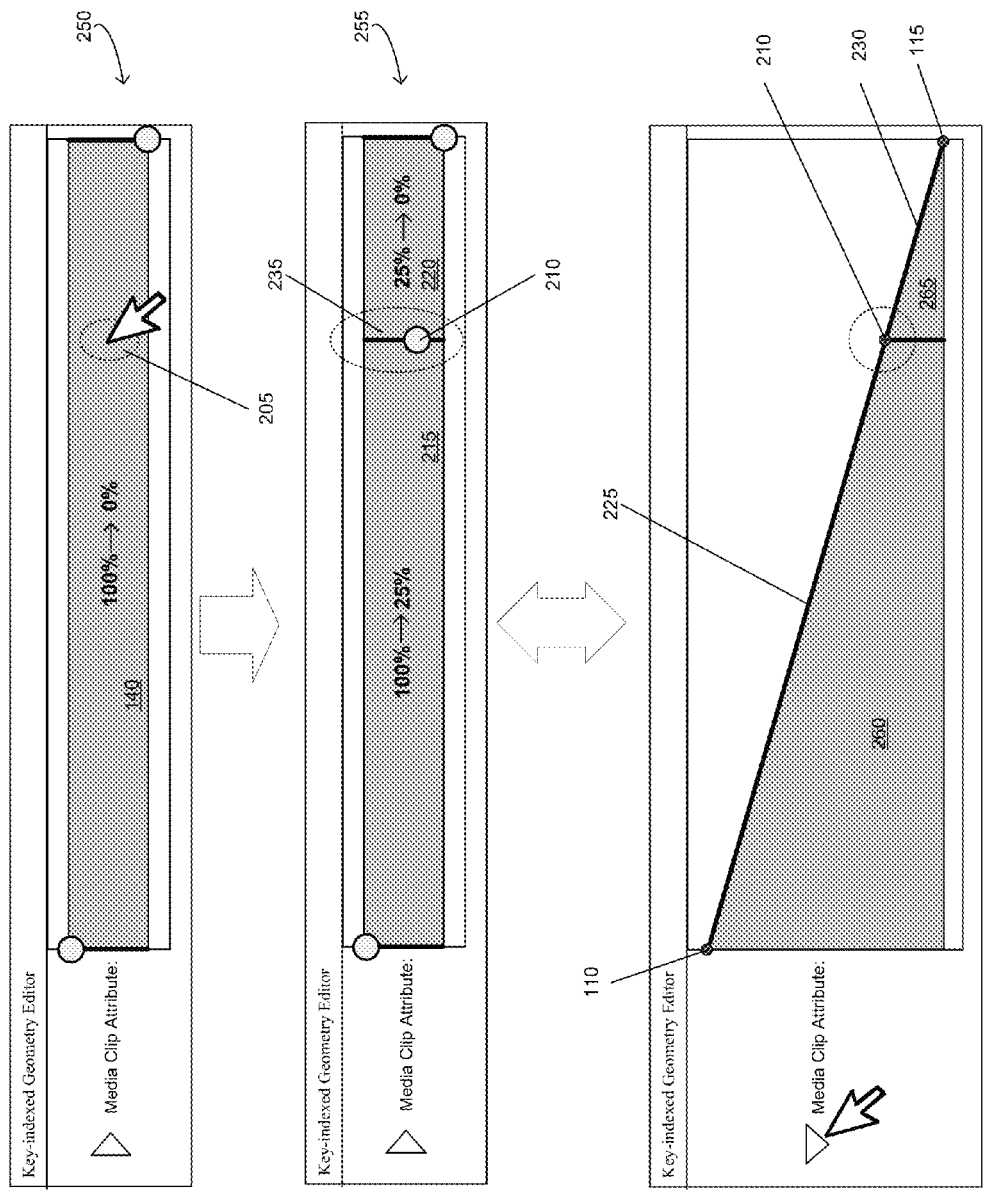
FIG. 2 illustrates an example of creating a new key index for an attribute on a timing bar in some embodiments.

As shown in the third stage 135 of FIG. 1, some embodiments display the change in value of the attribute as a text label 160 that is displayed on top of the timing bar. Some embodiments can display this text label in other forms such as below the timing bar or through a pop-up window when a user scrolls over the timing bar or key index. As show, the text is displayed between two key indices 145 and 150 and the label displays the value at each key index. When a timing bar has multiple key indices, it appears segmented. Each segment is defined by a starting and ending key index. A text label can be displayed for each segment to convey the changing attribute values between the starting and ending key index. Such an example is shown in FIG. 2. Furthermore, to display attribute values in the compressed timing bar format, some embodiments do not use both the text description 160 and the vertical position of the key indices 145 and 150 on the timing bar, and instead only use one of these approaches. Still other embodiments use other techniques in conjunction with one or both of these techniques.

FIG. 2 illustrates an example of creating a new key index for the graph 105 on the timing bar 140. Specifically, FIG. 2 illustrates the geometry editing window at two different stages, a first stage 250 where an interior location for creating a key index is selected and a second stage 255 where a key index has been created on the timing bar. The timing bar 140 at the first stage 250 illustrates the cursor selection (e.g., a double click operation within) of an interior location 205 within the timing bar 140. The second stage 255 illustrates the creation of a new key index 210 that divides the timing bar into two new portions or segments 215 and 220. Specifically, this cursor selection creates the new key index 210 about the horizontal location 205 of the cursor. The new key index 210 defines a new graph segment 225 along with the key index 110 and a new graph segment 230 along with the key index 115. Each segment also has a respective text label that displays the changing attribute value between each key index.

The media editing applications of different embodiments treat differently the division of the graph 105 into the two graph segments 225 and 230. For instance, some embodiments discard the graph 105 and only use the two graph segments 225 and 230 and/or their associated shapes 260 and 265 as selectable elements in the graphical user interface of the media editing application. Other embodiments, however, use the new graph segments 225 and 230 and/or associated shapes 260 and 265 as conceptual, pictorial representations of the division of the graph 105 and the shape 170; in other words, these embodiments maintain the graph 105 and shape 170 as the selectable element in the GUI, and use the new key index 210 for placing bounds on the modifications that are received directly or indirectly with respect to the graph 105 and the shape 170.

When a key index is created on a collapsed timing bar, some embodiments create and display on the timing bar 1) a key index marker and 2) a moveable key index on the key index marker. In some embodiments, a key index marker is represented as a vertical line that spans the timing bar. This line identifies the horizontal location of the key index along the timeline. A key index marker, or the key index displayed on the marker, can be selected and moved horizontally along the timing bar to modify the position of the key index along the timeline. As discussed above, the attribute value at that particular location is identified by the vertical position of a key index along the key index marker. This key index is selectable and can slide up or down along the key index marker to affect the attribute value at that particular position on the timeline. One example of such a key index and key index marker combination is illustrated in FIG. 2. For instance, in the second stage 255 of FIG. 2, the selection of the interior location 205 of the timing bar 150 causes a line 235 (i.e. key index marker) and the key index 210 to appear on the timing bar. This key index marker 235 can be viewed as dividing the timing bar 140 into two distinct segments 215 and 220. Alternatively, the marker 235 and its associated key index 210 can simply be viewed as only a selectable control within the shape. Irrespective of its characterization, the next two figures, FIGS. 3-4, will illustrate the use of the key index marker and its associated key index for modifying attribute value and location of a particular key index.

Figure 3:
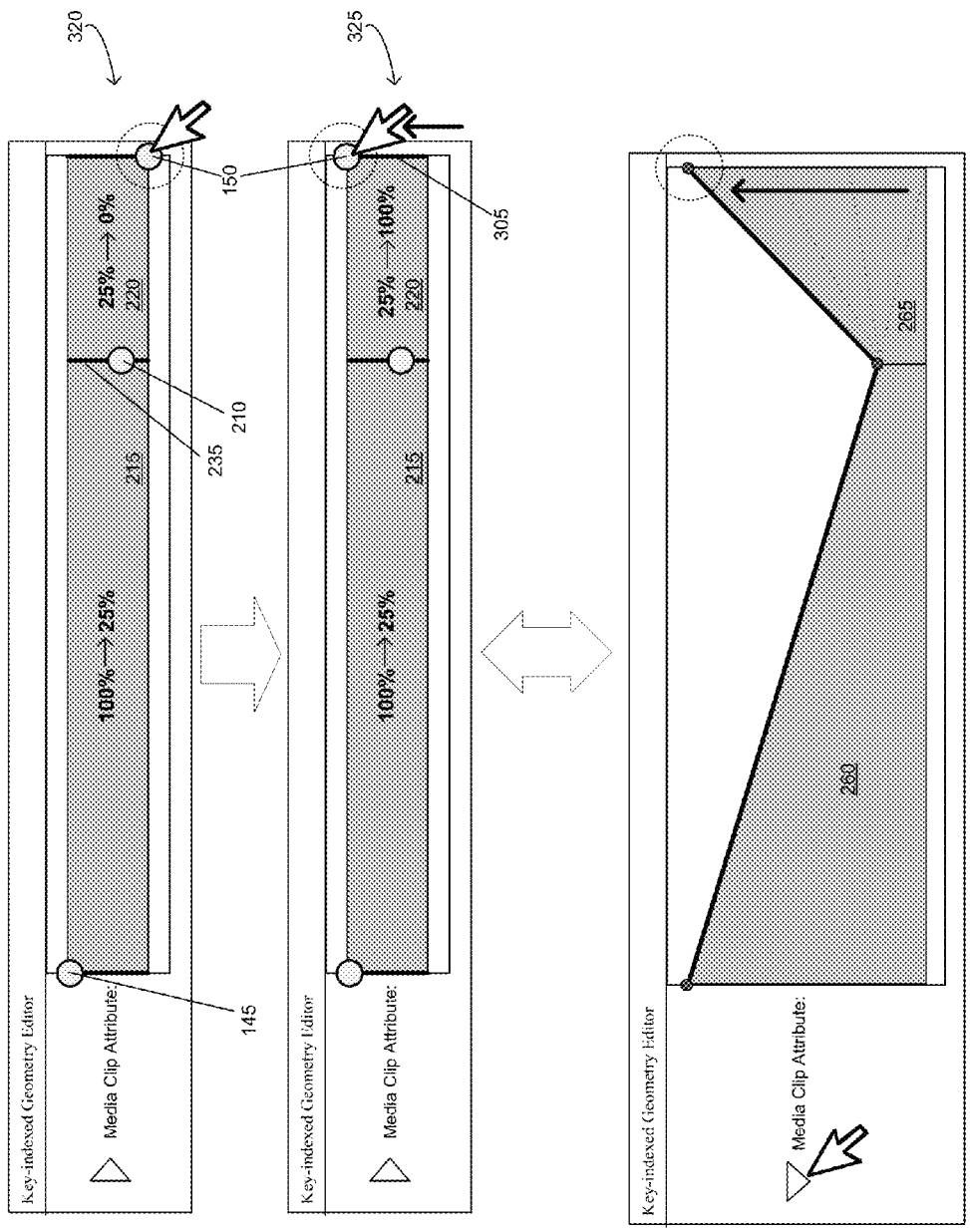
FIG. 3 illustrates an example of modifying the value of an attribute at a particular key index on a timing bar in some embodiments.

FIG. 3 continues from FIG. 2 and illustrates an example of modifying the attribute value of a key index from a timing bar. Specifically, FIG. 3 illustrates modifying the attribute value of a key index at two stages, a first stage 320 where a key index 150 is selected, and a second stage 325 where the attribute value of the key index 150 is modified. As illustrated, three key indices 145, 210, and 150 from FIG. 2 are defined on the timing bar. In the first stage 320, the vertical position of the three key indices 145, 210, and 150 on their respective key index markers convey their values of 100%, 25%, and 0%. Here, the cursor selection of the key index 150 is illustrated at the first stage 320.

Figure 4:
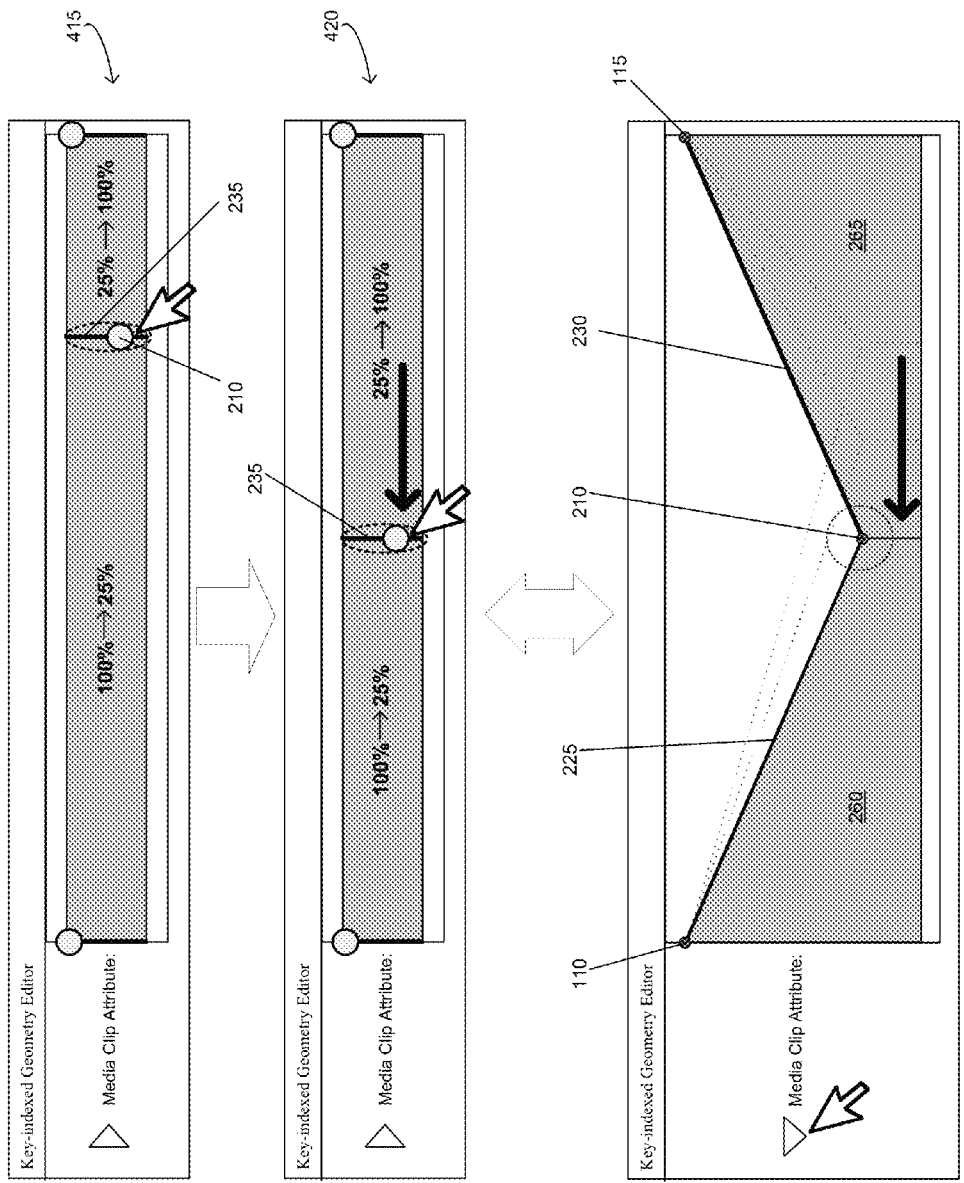
FIG. 4 illustrates an example of relocating a key index on a timing bar in some embodiments.

The second stage 325 then illustrates sliding the key index 150 in an upward direction along the key index marker 305 to affect the attribute value at that location. Specifically, the attribute value is changed from 0% to its maximum, 100%. The change in attribute value is reflected by the change in segment shape 265 which is illustrated in the uncollapsed view of the key-indexed graph in FIG. 3. As illustrated in FIG. 4, both shapes 260 and 265 can further be modified by relocating the key index 210 and its associated key index marker 235 to a different position along the timelines.

FIG. 4 illustrates an example of relocating the key index 210 with its associated key index marker 235 to a new location on the graph 105. Specifically, FIG. 4 illustrates the geometry editing window at two stages 415 and 420. The first stage 415 illustrates the cursor selection of the key index marker 235 along with key index 210. The selection can be accomplished by selecting either the key index marker 235 or the key index 210 itself. The second stage 420 illustrates moving the marker 235 and key index 210 (e.g., a cursor click and drag operation) along a horizontal direction. The movement also redefines the graph segments 225 and 230, as it reduces the distance between the key indices 110 and 210 while distancing the key indices 210 and 115. In other words, the horizontal movement causes the transitional period between the key indices 210 and 115 to increase while causing the transitional period between the key indices 110 and 210 to decrease. The attribute value at each key index 110 and 210 remains the same and thus affects the slope of each graph segment 225 and 230 as well as the shapes defined by each 260 and 265. This operation maintains the attribute value at the key index whereas the operation described in FIG. 3 illustrated changing the attribute value by sliding key index 150 vertically along the key index marker 235. To avoid accidental modification of both attribute value and location when selecting a key index, some embodiments provide a controlled selection (e.g., keyboard and cursor selection) of the key index for modification of only the attribute value or the location of the key index.

The previous figures have described operations on a timing bar for creating a key index, modifying the attribute value at a key index, and relocating the position of the key index. Other embodiments also provide a mechanism for directly modifying the interpolation between two key indices without modifying the key index value or location using a timing bar. One such example is illustrated in FIG. 5.

Figure 5:
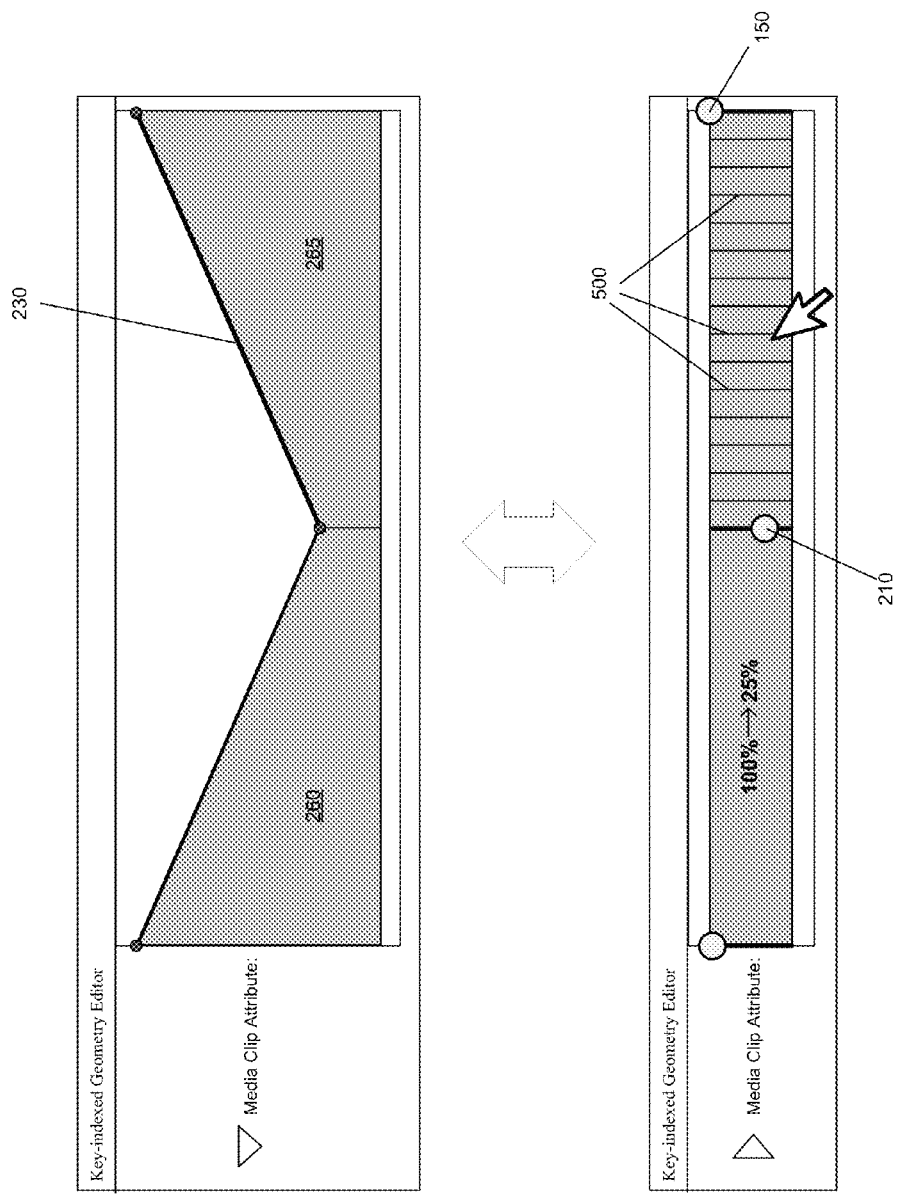
FIG. 5 illustrates an example of interpolation marks on a timing bar in some embodiments.

FIG. 5 shows several editable interpolation marks 500 on a collapsed representation of the key-indexed graph of FIG. 4. The interpolation marks 500 span a segment within the timing bar which, in this example, is a segment defined by key indices 210 and 150. The space between each interpolation mark conveys the speed or ease at which the attribute value changes over the duration of the segment. In this example, the interpolation marks 500 are evenly spaced and thus represent a linear change in attribute value as shown by the key-indexed graph 230.

Figure 6:
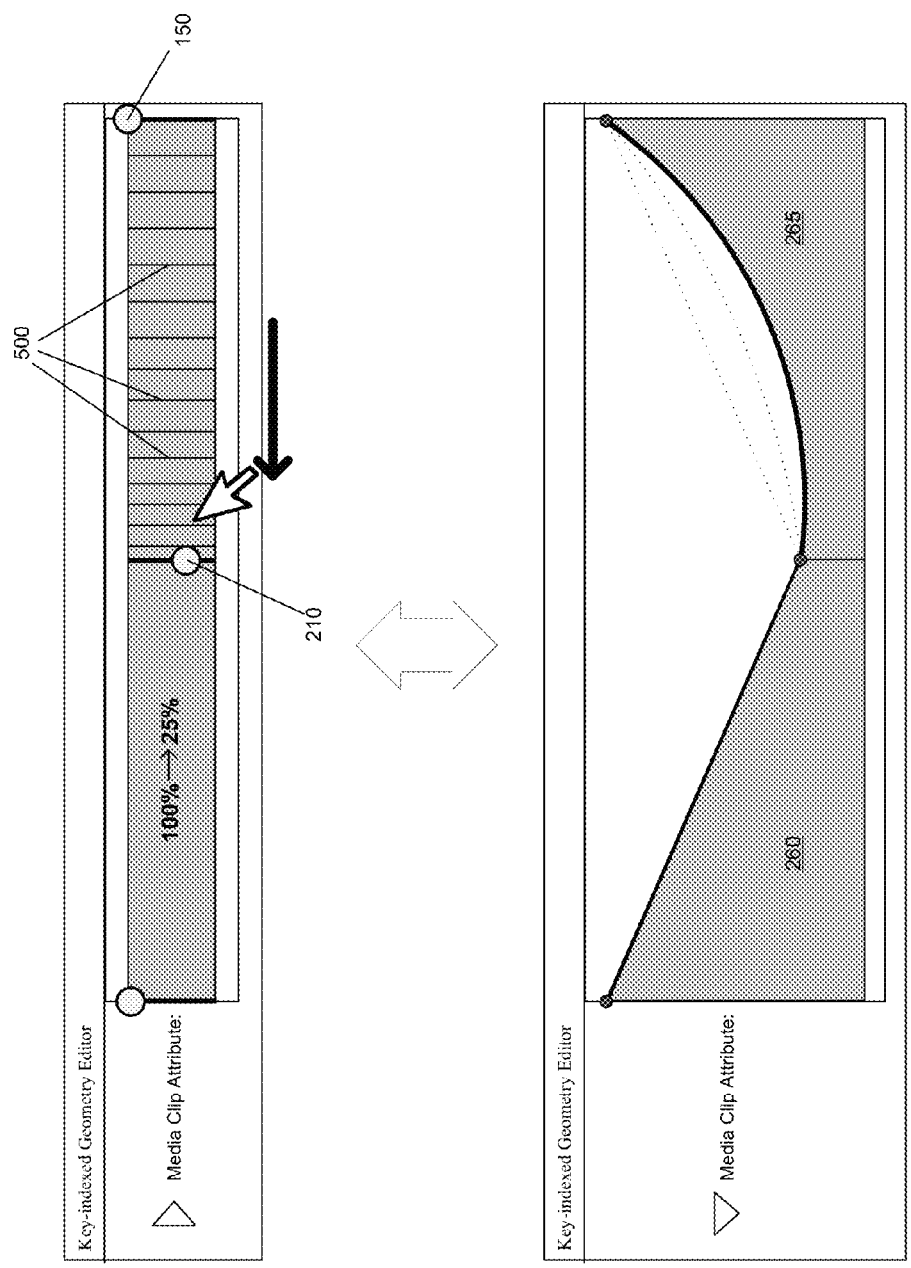
FIG. 6 illustrates an example of editing the interpolation between two key indices by manipulating interpolation marks on a timing bar in some embodiments.

As illustrated in FIG. 6, the interpolation marks 500 can be selected at any point within the segment and modified to affect the interpolation between two key indices. Here, a click and drag operation from the center of the segment modifies the interpolation marks by squeezing them closer together towards the first key index 210. In some embodiments a shorter distance between each interpolation mark indicates a faster transition while other embodiments might interpret a shorter distance to be a slower transition. In this particular example, a shorter distance represents a slower transition as illustrated by the modified shape 265 between key indices 210 and 150. This interpolation mark mechanism provides a user with a simple method to directly modify the interpolation between key indices. This mechanism can also be invoked in various ways including a user interface item, keyboard shortcut, or drop down menu.

All the examples described above have modified a key-indexed graph using a collapsed representation of the graph. In order to get visual feedback of how each modification has affected the corresponding key-indexed graph, the timing bar would have to be uncollapsed into its full key-indexed graph form. However, some embodiments allow viewing of the modified key-indexed graph without uncollapsing the timing bar into a full key-indexed graph. This is accomplished by providing a zoom tool that displays a portion of the graph being modified in a separate window. Such an example of a zoom tool is illustrated in FIG. 7.

Figure 7:
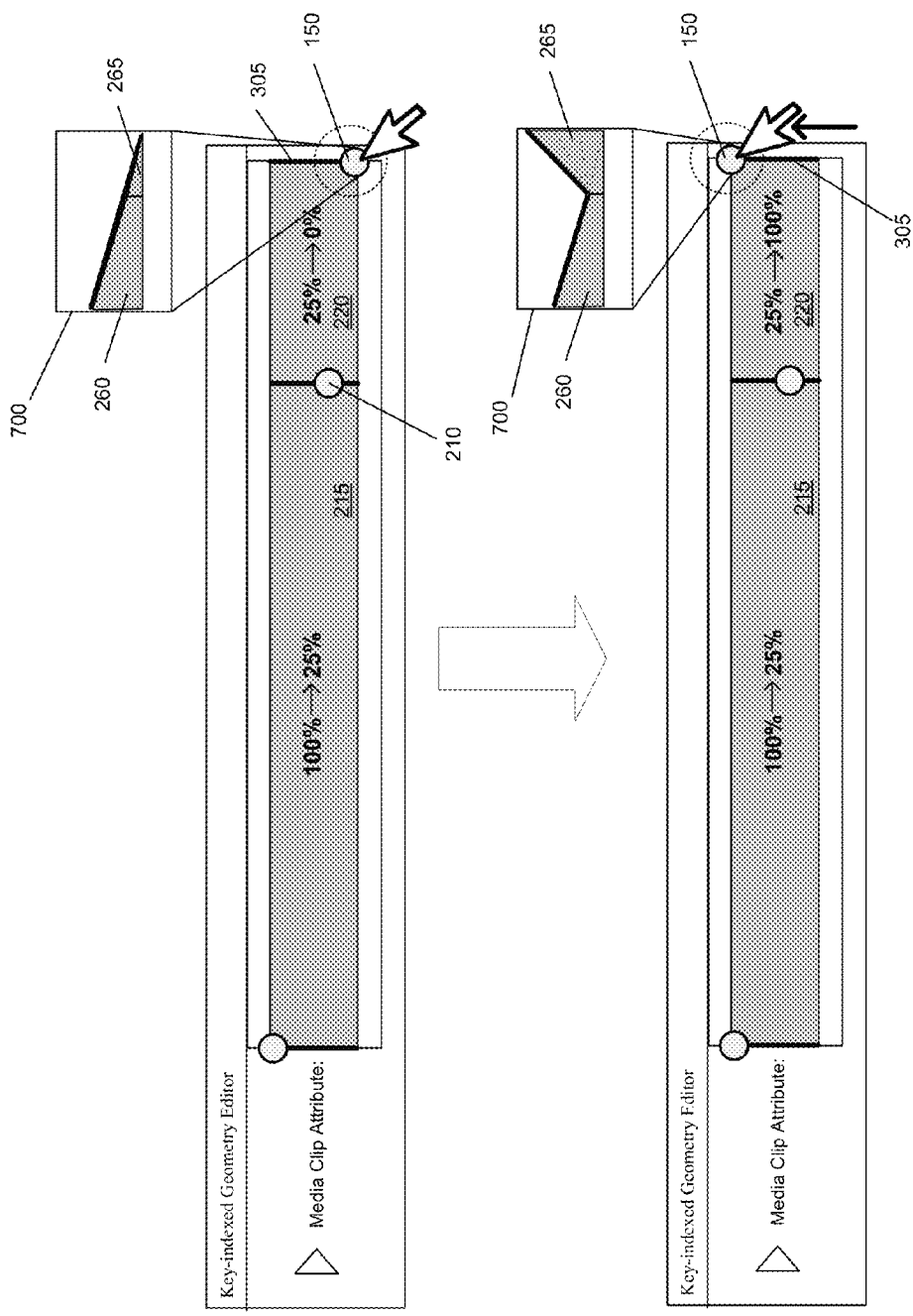
FIG. 7 illustrates an example of a zoom tool for displaying a portion of the key-indexed graph when editing a timing bar in some embodiments.

FIG. 7 shows the same timing bar and the same modification of attribute value using key index 150 as shown in FIG. 3. In this figure, as the attribute value is being modified using key index 150 (i.e. by sliding key index 150 along the key index marker 305) a window 700 is displayed. This window 700 initially shows a portion of the key indexed graph and shapes 260 and 265. As the graph is being modified from the timing bar, the effect of the modification on its corresponding key-indexed graph is concurrently displayed in the zoom window 700. Therefore this window alleviates the need to uncollapse the timing bar to view a modified key-indexed graph.

Figure 8:
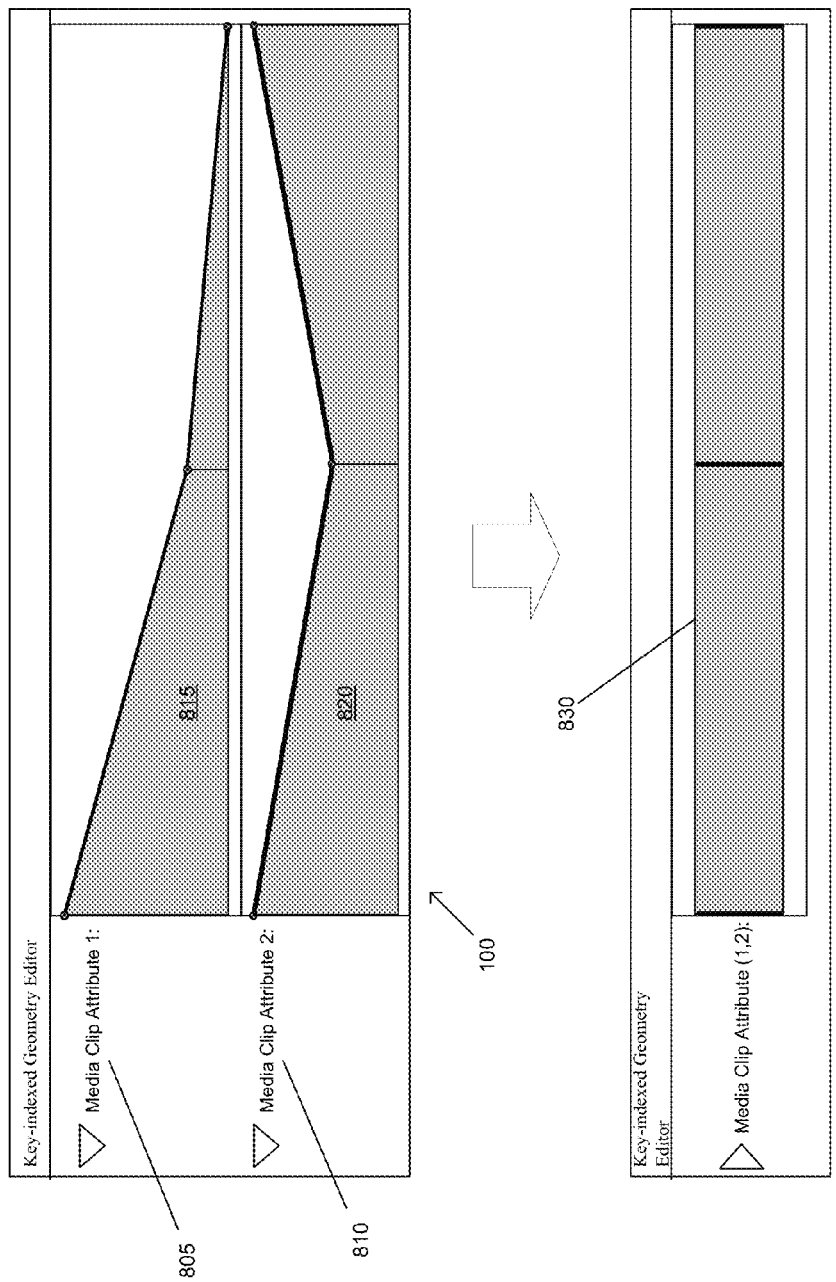
FIG. 8 illustrates an example of a multi-attribute timing bar for representing two or more attribute of media content in some embodiments.

FIGS. 1-7 above illustrate examples where the compressed timing bar represents one key-indexed graph or shape in a collapsed mode. However, as mentioned above, some embodiments use a single collapsed timing bar to represent multiple attributes rather than individual key-indexed graphs or shapes for each attribute. FIG. 8 shows one such example.

FIG. 8 illustrates a timing bar for representing two or more attributes of a media clip. Specifically, FIG. 8 first shows two media clip attributes 805 and 810 in the geometry editor window 100. Both attributes 805 and 810 are displayed in an expanded view where shapes 815 and 820 represent the key-indexed graphs. The geometry editor window 100 is then shown with both graphs combined into a single multi-attribute timing bar 830 where a user can perform editing operations to affect both attributes simultaneously. Such operations can include one or more of the operations discussed above such as creating new key indices, relocating key indices, and affecting attribute values at a specific key index.

The multi-attribute timing bar described in FIG. 8 is also equivalent to a third timing bar variation, specifically, a global timing bar. A global timing bar is tied to the geometry editor window and is a collective representation of all the attributes that currently reside in the geometry editor. These timing bar variations will be discussed in further detail in the following sections.

As described above, some embodiments allow a user to manipulate key indices and attribute values without interacting with the key-indexed line or shape graph. Other embodiments also allow manipulation of the transition, or interpolation, between two key indices directly from the timing bar. Furthermore, a timing bar can represent one or more attributes of a media clip. For instance, some embodiment provide a single attribute timing bar for representing one attribute while other embodiments provide a multi-attribute timing bar for representing two or more attributes of a media clip. In addition, some embodiments also provide a global timing bar for representing all attributes that a user is actively editing in a geometry editor window of a media editing application. Some embodiments provide the timing bars as selectable and modifiable items in the graphical user interface ("GUI") of the media editing application (i.e., as items that can be selected and modified by the user in the GUI).

The examples illustrated in FIGS. 1-8 were described above to include certain features of a timing bar. Several more detailed examples of manipulating key-indexed graphs using timing bars will be described below. However, before describing these examples, an exemplary media editing application that implements the graph editing operations of some embodiments will be described below in Section I. Section II then describes the variations of timing bars provided by a media editing application. Section III follows that discussion with several examples of manipulating attributes of media content using one or more variations of a timing bar. Section IV continues with a discussion of attribute editing operations performed directly from the display area of a media editing application. Section V follows that discussion with a description of the software modules used to implement some embodiments of the media editing application. Lastly, Section VI describes a computer system which implements some embodiments of the invention.

I. Media Editing Application

Figure 9:
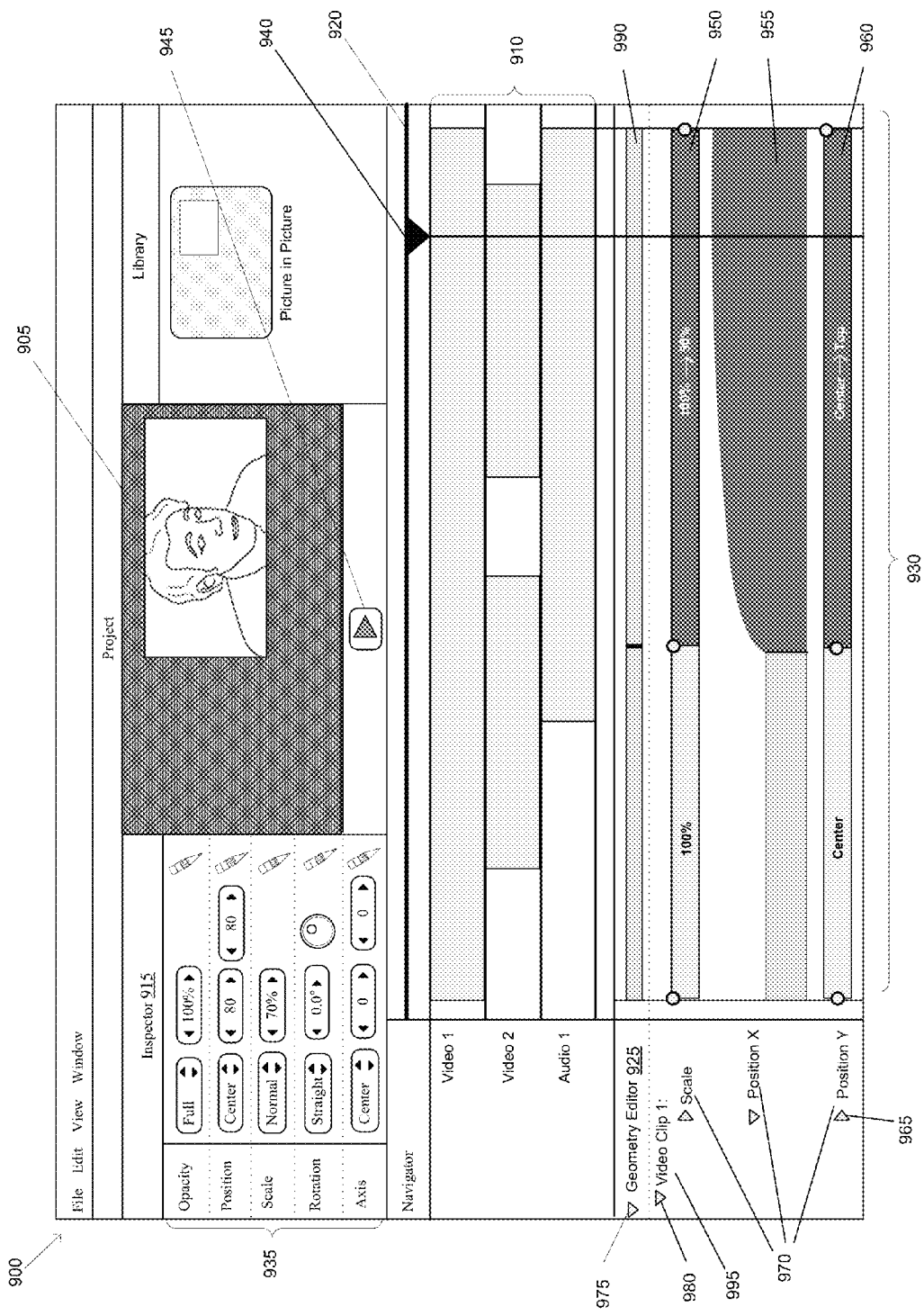
FIG. 9 illustrates a graphical user interface of a video editing application in some embodiments.

FIG. 9 illustrates a graphical user interface ("GUI") 900 of a video editing application that uses novel key-indexed timing bars to represent one or more attributes of a media clip. As shown, the GUI 900 includes a canvas 905, a composite display area 910, a timeline 920, an attribute display window 915, and a geometry editor 925 with a geometry editing window 930.

The canvas 905 displays the preview of the media presentation that the media editing application creates. The composite display area 910 provides a visual representation of the composite presentation being created by the application's user. It displays one or more geometric shapes that represent one or more pieces of media content that are a part of the media presentation. In the example illustrated in FIG. 9, the composite display area 910 is an area that includes multiple media tracks that span across the timeline 920. One or more pieces of media content can be placed on each track. Each piece of media content has multiple editable attributes which can be represented as various geometric shapes such as key-indexed graphs and/or timing bars.

The timeline 920 represents a duration or a portion of the duration in the media presentation. A time marker (also called a playhead) 940 is situated on the timeline 920. The user of the media editing application can drag the time marker along the timeline to display a preview of a frame of the media presentation at a particular point in the presentation, or to play the preview starting from the particular point by selecting the play button 945.

The attribute display window 915 is an area in the GUI 900 through which the application's user can view the multiple attributes of a media content or a media editing operations for the media presentation. The user can select one or more attributes in this window 915 for editing. For some or all attributes, such a selection will cause an editable graph to be presented in the geometry editing window 930 in order to allow the user to view and edit the graph. The attribute display window 915 also provides various user interface tools 935 (e.g., list boxes, text fields, buttons, radial dials, etc.) for modifying the attributes.

The geometry editor 925 is the area in the application that displays the geometry editing window 930. This window 930 displays one or more key-indexed geometries that can be modified by a user according to one or more editing operations. In the example illustrated in FIG. 9, the window 930 displays three representations 950, 955, and 960 of key-indexed attribute geometries. The geometry editor displays each attribute of a media clip being edited by (i) displaying a description 970 of each attribute and (ii) displaying a key-indexed geometry over a particular duration in the timeline 920.

In the example illustrated in FIG. 9, the key-indexed geometries 950, 955, and 960 are provided in the geometry editing window 930 that is dedicated for displaying such geometries in the media editing application. However, in some embodiments, one or more such geometries may be provided in another window in the media editing application. For instance, in some such embodiments, one or more such geometries may be shown in the composite display area 910 with its corresponding media content (e.g., on top of or adjacent to the media content).

II. Timing Bars Variations

FIG. 9 further illustrates the geometry editor 925 displaying two types of timing bars, specifically a single-attribute timing bar and a global timing bar. As shown, the geometry editor 925 has two attributes represented through single attribute timing bars 950 and 960 while another attribute is represented by a key-indexed graph and the shape it defines 955. As previously illustrated in FIG. 1, a single attribute timing bar representation is displayed when a key-indexed graph is collapsed, for example by using a user control 965 or a double click operation.

A second type of timing bar, a multi-attribute timing bar, similar to the one described in FIG. 8 may also be displayed in the geometry editor window 930. A multi-attribute timing bar represents two or more attributes that a user wishes to group together within the geometry editor window 930. A user can perform edit operations on a multi-attribute timing bar that simultaneously affects all the attributes associated with the multi-attribute timing bar in the same fashion. For example, selection of the user control 975 would collapse all the attributes being edited for video clip 1 980 in the geometry editor window into a single multi-attribute timing bar to represent all the attributes that were being edited for video clip 1 995. In other embodiments, a multi-attribute timing bar may also be created by a user grouping two or more attributes of together for editing. For example, attributes for a clip's position in the x-direction and y-direction may be combined in a multi-attribute timing bar for performing the same editing operations so the user can avoid having to perform repetitive operations for multiple attributes.

Furthermore, a third type of timing bar, a global timing bar 990, is illustrated in FIG. 9. The global timing bar 990 is tied to the geometry editor window 930 and is a timing bar that collectively represents each attribute that is displayed in the geometry editor window. In some embodiments, the global timing bar is always present at the top of the geometry editor window and by default, represents every attribute and their respective key indices that are currently displayed in the geometry editor window 930. Other embodiments allow user selection of which attributes to associate with the global timing bar.

The global timing bar and multi-attribute timing bar are similar, but a multi-attribute timing bar is defined by one or more attributes that a user wishes to group together rather than a default representation of all attributes in a geometry editor window. Furthermore, a global timing bar can be equivalent to a single-attribute timing bar when only one attribute is associated with the global timing bar or if only one attribute is actively being edited in the geometry editor window. Several more detailed examples of how each type of timing bar may be used to manipulate key-indexed graphs will be described in the following sections.

III. Key-Index Editing With Timing Bars

As mentioned above, some embodiments provide several novel methods for editing the value of an attribute of a media content or a media operation. Some media editing application represent the changing value of such an attribute over a duration (e.g., a duration of time, duration of frequencies) as a key-indexed geometry. Such geometries may include graphs, graph shapes, or bars which are displayed in a geometry editor window of the media editing application. For such applications, some embodiment provide novel compressed or collapsed views of one or more key-indexed graphs or shapes, namely timing bars and different variations of timing bars.

A user of the application populates the geometry editing window with attribute geometries through selection of a piece of content and identifying one or more attributes of the content for editing. This can be accomplished in various ways such as a drag and drop operation from an attribute display window which displays all the modifiable attributes of a selected content, context menus, drop-down menus, or automatic population of all modifiable attributes when a media content is selected. These are only some examples of populating the geometry editor with attribute geometries of a media clip and it would be clear to one skilled in the art that the same can be accomplished through other different methods.

Several different examples of operations for modifying the value of one or more attributes over a duration using collapsed timing bar representations of the attributes' key-indexed graphs will be described below. In some cases, these different operations may be used conjunctively (i.e., all together) in one application, while in other cases, some of the operations may be alternatives to one another. When these operations are used conjunctively in one application, some embodiments allow a user to differentiate one operation from another operation by providing user interface tools, user interface techniques, and/or shortcuts (e.g., through the use of hotkeys). This will be further elaborated in the examples described below. Several examples of manipulating the different types of timing bars will now be described by reference to FIGS. 10-35.

A. Creating Key Indices

FIGS. 10-15 illustrate several examples of creating new key indices for one or more attributes of media content using timing bars. Specifically, these figures illustrate creating new key-indices across one or more attributes by selecting an interior location of a timing bar. Different types of timing bars including a single attribute timing bar, a global timing bar, and a multi-attribute timing bar are illustrated in these figures. For purposes of simplifying the description of these figures, only the geometry editor 1000 of the media editing application is shown.

Figure 10:
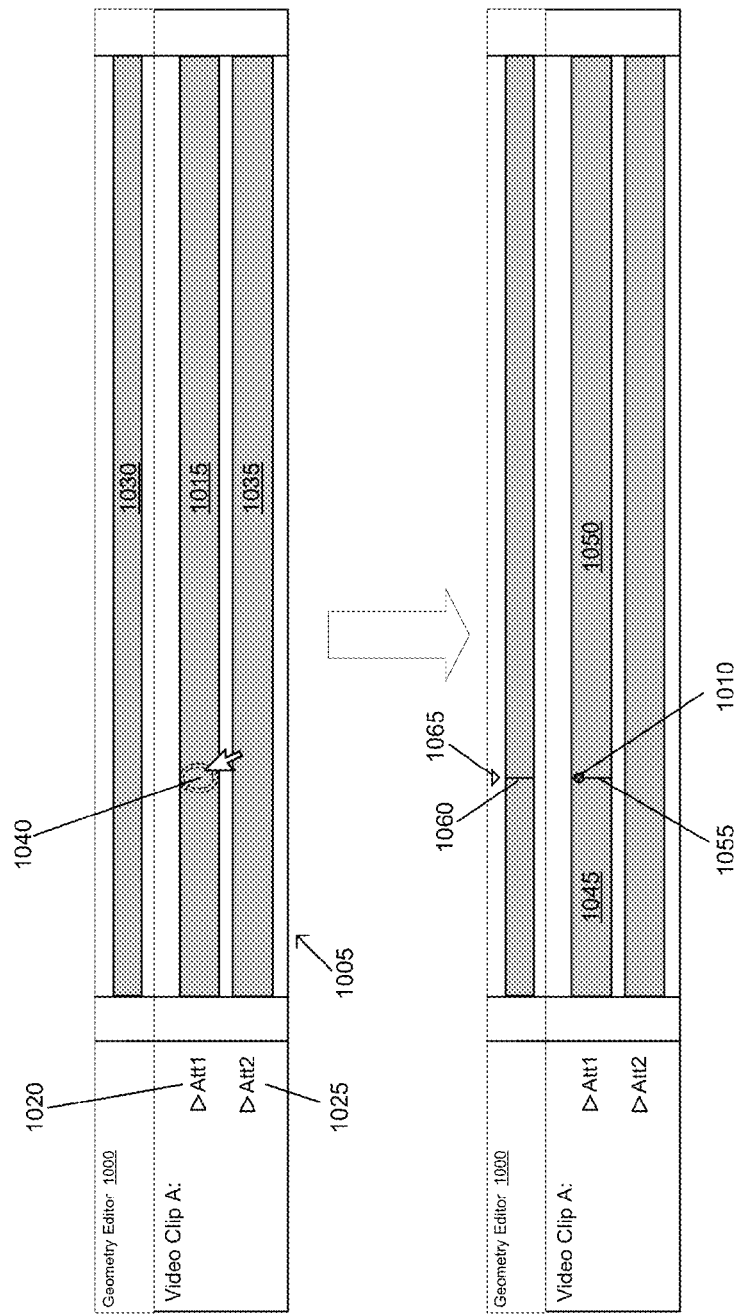
FIG. 10 illustrates an example of creating a new key index on a single attribute timing bar in some embodiments.

FIG. 10 illustrates an example of creating a new key index for an attribute from a timing bar. Specifically, FIG. 10 illustrates a geometry editor 1000 where a new key index 1010 is created for a single attribute 1020 using a single-attribute timing bar 1015. FIG. 10 shows a geometry editing window 1005, two attributes 1020 and 1025 of a particular media clip, two collapsed timing bars 1015 and 1035 for representing the two attributes, and a global timing bar 1030. The two timing bars, 1015 and 1035, are each associated with a corresponding single attribute, Att1 1020 and Att2 1025, of a media clip over the duration of a particular media clip. The global timing bar 1030 is for displaying a collective representation of all attributes displayed in the geometry editing window 1005. From the following examples it will become clear that all editing operation for one or more attributes can be accomplished directly from a global timing bar, whereas more complex editing might require the use of the geometry editor for manipulating key-indexed graphs and shapes individually.

When multiple attributes are being represented by the global timing bar, the global timing bar can display the location of one or more key indices by segmenting the global timing bar. Further information such as the existence of shared key indices or attribute values at the key indices can also be conveyed. Some embodiments display icons that represent globally shared versus non-shared key indices. Such information can be conveyed to the user through use of icons in or above the global timing bar as well as the use of different icon colors to represent different key indices for different attributes. These are just some examples of information that may be conveyed by a global timing bar, and it will be clear to one skilled in the art that the use of icons and colors can be used in a variety of ways to display different information that may be useful when performing edit operation on a key-indexed graphs, shapes, and/or timing bars.

FIG. 10 illustrates creating a new key index 1010 for a single attribute 1020 using a single-attribute timing bar 1015. Similar to the example described in FIG. 2, this figure illustrates performing a cursor selection (e.g., a double click operation within) of an interior location 1040 of the timing bar 1015. It further illustrates that this selection causes the timing bar to divide into two portions (i.e., segments 1045 and 1050) about the horizontal location of the cursor. As mentioned above, the media editing applications of different embodiments treat differently the division of the timing bar 1015 into the two bar segments 1045 and 1050. For instance, some embodiments discard the timing bar 1015 and only use the segments 1045 and 1050 as selectable elements in the graphical user interface of the media editing application. Other embodiments, however, use the new segmented bars 1045 and 1050 as conceptual, pictorial representations of the division of the timing bar and graph that it represents; in other words, these embodiments maintain the timing bar 1015 as the selectable element in the GUI, and use the new key index 1010 for placing bounds on the modifications that are received directly or indirectly with respect to the timing bar 1015.

When a key index is created on a graph, some embodiments create and display a key index marker to represent the location of a key index on the timeline. This marker can then be selected and moved in order to cause the key index to be relocated to a new location on the timeline. One example of such a marker in some embodiments is a line 1055 that spans the timing bar at the location of the key index 1010. For instance, in FIG. 10, the selection of the interior location of the timing bar 1040 causes a line 1055 to appear on the timing bar. This line 1055 can be viewed as dividing the timing bar 1015 into two distinct segments 1045 and 1050. Alternatively, this line 1055 can simply be viewed as only a selectable control within the shape.

In conjunction with displaying a key index marker on the timing bar, some embodiments display a marker for the new key index on the global timing bar. For instance, FIG. 10 illustrates when the key index 1010 is created, a line 1060 representing the key index is displayed on the global timing bar 1030. Specifically, the line 1060 is displayed on the global timing bar at the horizontal coordinate of the key index. Along with the line 1060 on the global timing bar, a graphical icon may also be used to display further information as discussed above. Here, a small triangle 1055 is displayed above the global timing bar and the newly created key index to convey that the key index at that position is not a globally shared key index between all attributes currently being displayed in the geometry editor window 1005. Furthermore, similar to the marker 1055 on the single attribute timing bar, the marker in some embodiments is a selectable graphical user interface item that a user can select and move in order to cause the key index to be relocated to a new location on the graph as will be describes in later figures.

Figure 11:
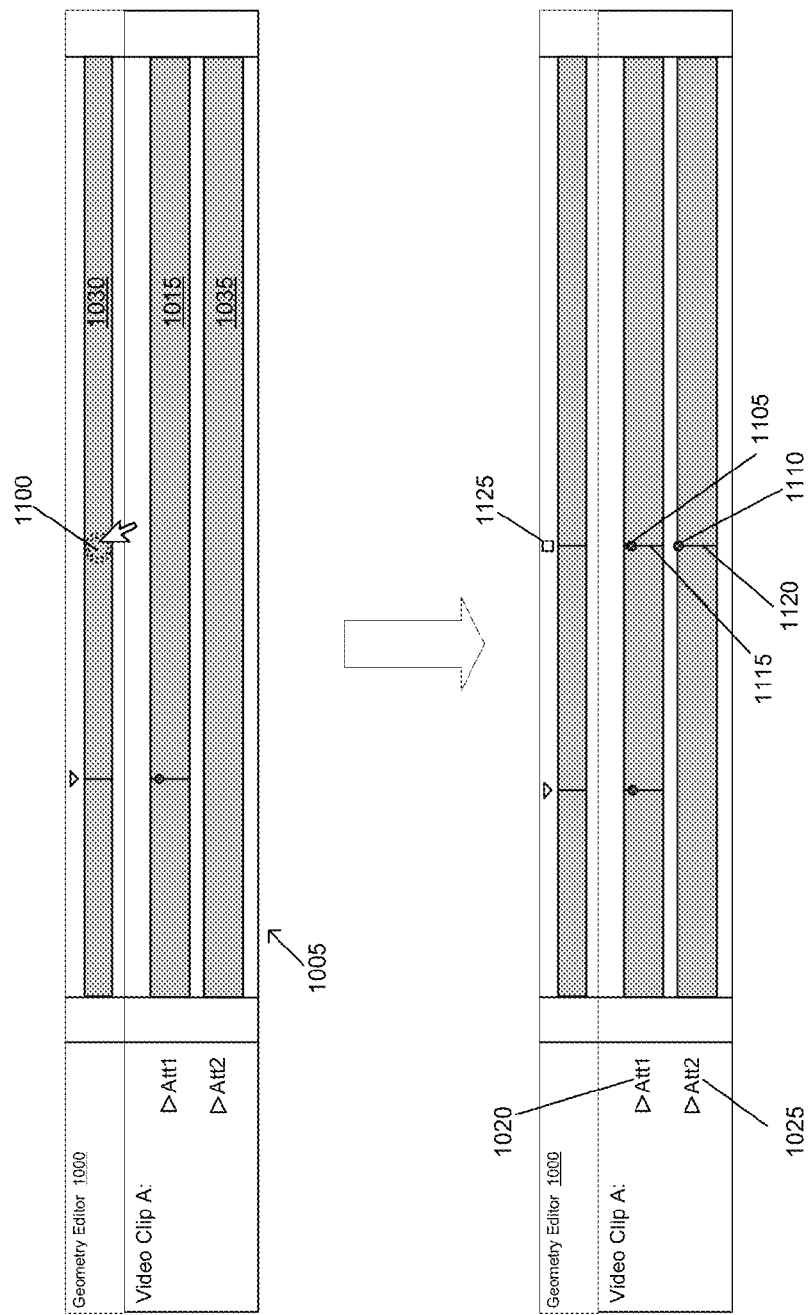
FIG. 11 illustrates an example of creating a new key index for multiple attributes from a global timing bar in some embodiments.

FIG. 11 illustrates an example of selecting a location on the global timing bar 1030 in order to create key indices across all attributes currently residing in the geometry editor window 1005. Specifically, FIG. 11 illustrates the cursor selection (e.g., a double-click operation) of a location 1100 in the global timing bar 1030. As shown, this operation creates two new key indices 1105 and 1110, where one key index 1105 is associated with the first attribute 1020, while the other key index 1110 is associated with the second attribute 1025. In this example, new key indices are created across the timing bars 1015 and 1030 about the horizontal coordinate of the selected location. Also, two new key index markers 1115 and 1120 that correspond to the two new key indices 1105 and 1110 are displayed across the timing bars 1015 and 1030 about the horizontal coordinate of the selected location.

In some embodiments, when multiple new key indices are created at a same location on multiple timing bars, some embodiments display an icon, as previously discussed, for representing the globally shared key index location on or above the global timing bar. For instance, in FIG. 11, as the two new key indices 1105 and 1110 are created at a same location along the duration, the selection causes one icon 1125, for example a square, that represents that the key index at that location is a shared key index between all attributes currently displayed in the geometry editor window 1005. Some embodiments also use such a representation when two key indices that were created at two different times for two different attributes subsequently overlap in time.

In some cases, it may be desirable to manipulate multiple different attributes at once, but not every attribute in the geometry editor window. For instance, when multiple key-indexed shapes are displayed in a geometry editor, the user may want to create key indices across only some but not all of the graphs through a single selection of a location on the global timing bar. Accordingly, some embodiments allow the user to associate and/or disassociate one or more key-indexed graphs in the global timing bar allowing modification of only the associated attributes from the global timing bar. In other embodiments, the user can select or deselect two or more shapes to combine into one multi-attribute timing bar which allows a user to perform key-index operations on multiple attributes from one multi-attribute timing bar. Such examples will described by the following figures.

Figure 12:
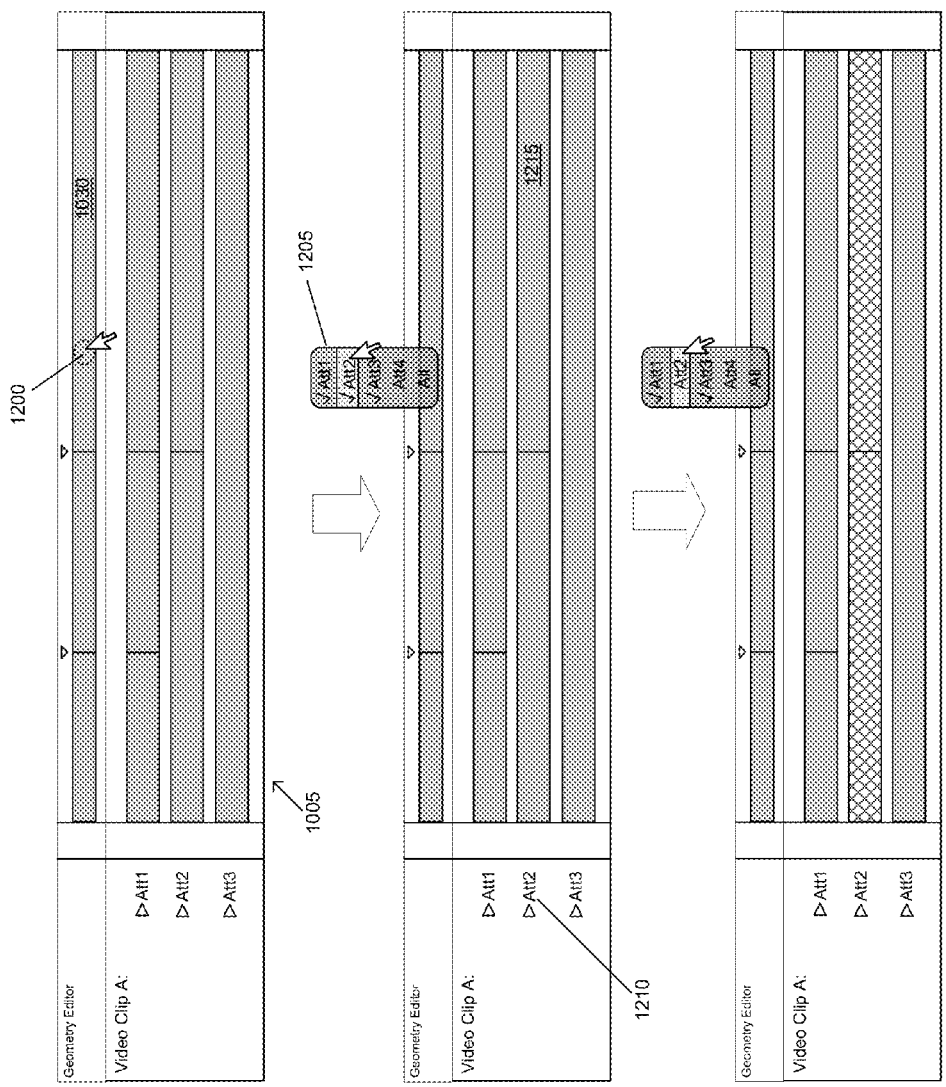
FIG. 12 illustrates an example of disassociating a particular attribute from a global timing bar in some embodiments.

FIG. 12 illustrates how to associate or disassociate one or more particular attributes of a media clip from a global timing bar. In one embodiment, as shown, a user can perform a right-click or control-click using the cursor on a location 1200 in the global timing bar 1030 to open up a context menu 1205. Within the context menu 1205, a user is presented with a listing of attributes associated with a particular media clip. In some embodiments, if multiple media clips are being edited, the user may be provided with sub-context menus for displaying the attributes for each of the media clips being edited. From the context menu, a user may select all attributes to be associated in the global timing bar or individually select which attributes to associate with the global timing bar. FIG. 12 illustrates the disassociation of Attribute 2 1210 from the global timing bar 1030. When Att2 1210 is disassociated from the global timing bar 1030, the timing bar 1215 representing Att2 1210 becomes inactive for editing purposes. Some embodiments will shade an inactive attribute differently from the active attributes to differentiate it while other embodiments might remove the attribute shape or timing bar altogether so as not to be displayed in the geometry editing window 1005. Once the desired attributes are the only attributes associated with the global timing bar, a user can perform key-index operations across all the associated attributes from the global timing bar as illustrated in FIG. 13.

Figure 13:
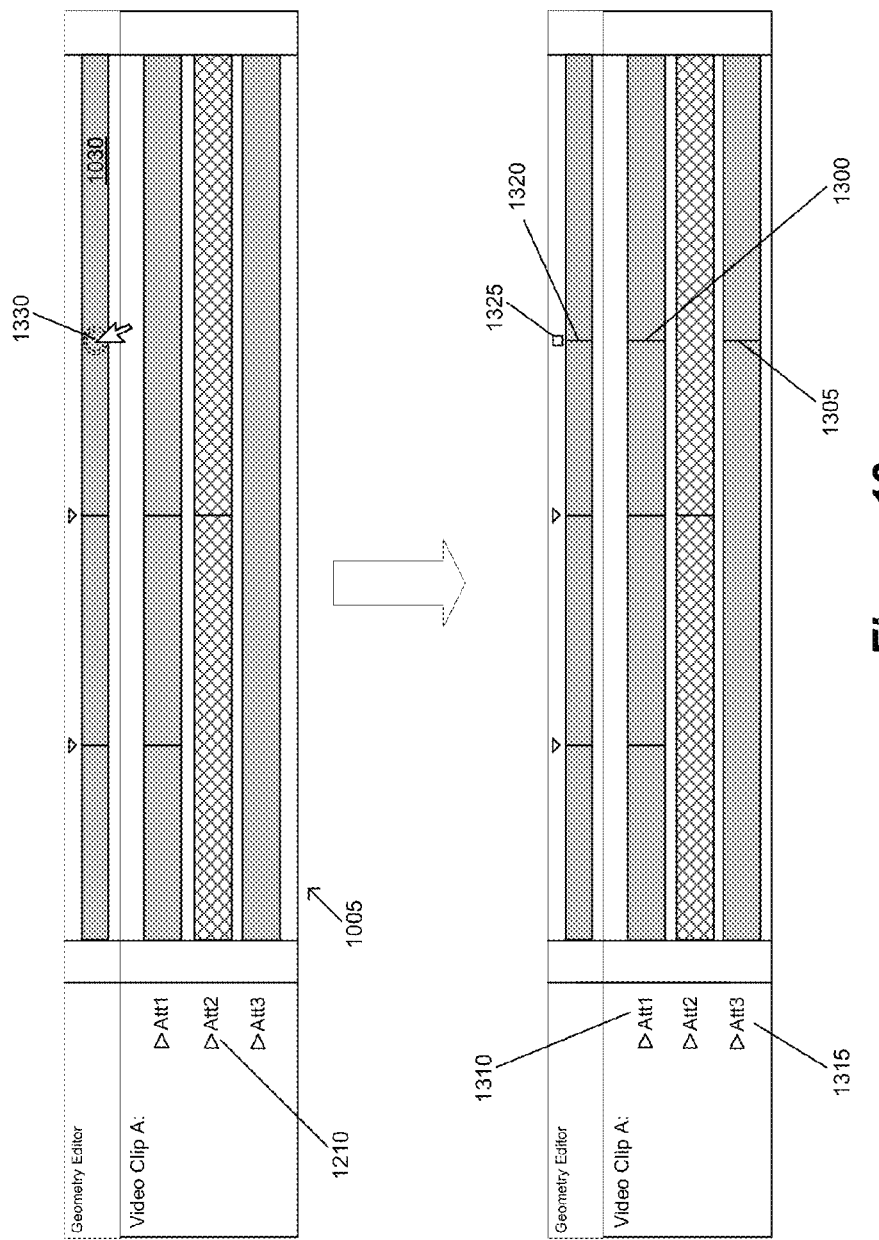
FIG. 13 illustrates an example of creating a new key index for all attributes associated with the global timing bar in some embodiments.

FIG. 13 shows the creation of a new key-index across all attributes associated with the global timing bar 1030 similar to the operation of FIG. 11. Specifically, a double-click operation 1330 in the global timing bar 1030 creates two new key index markers 1300 and 1305 for the associated attributes Att1 1310 and Att3 1315 at the same location. The global timing bar displays a unique symbol such as a square 1325 above the newly created global key-index 1320 to signify that the key index is globally shared across all the attributes that are currently associated with the global timing bar. If Att2 1210 was once again activated or displayed in the geometry editor window, the icon 1325 would change to represent that the key index at that location no longer is a global key index for all attributes in the geometry editor window 1005.

Figure 14:
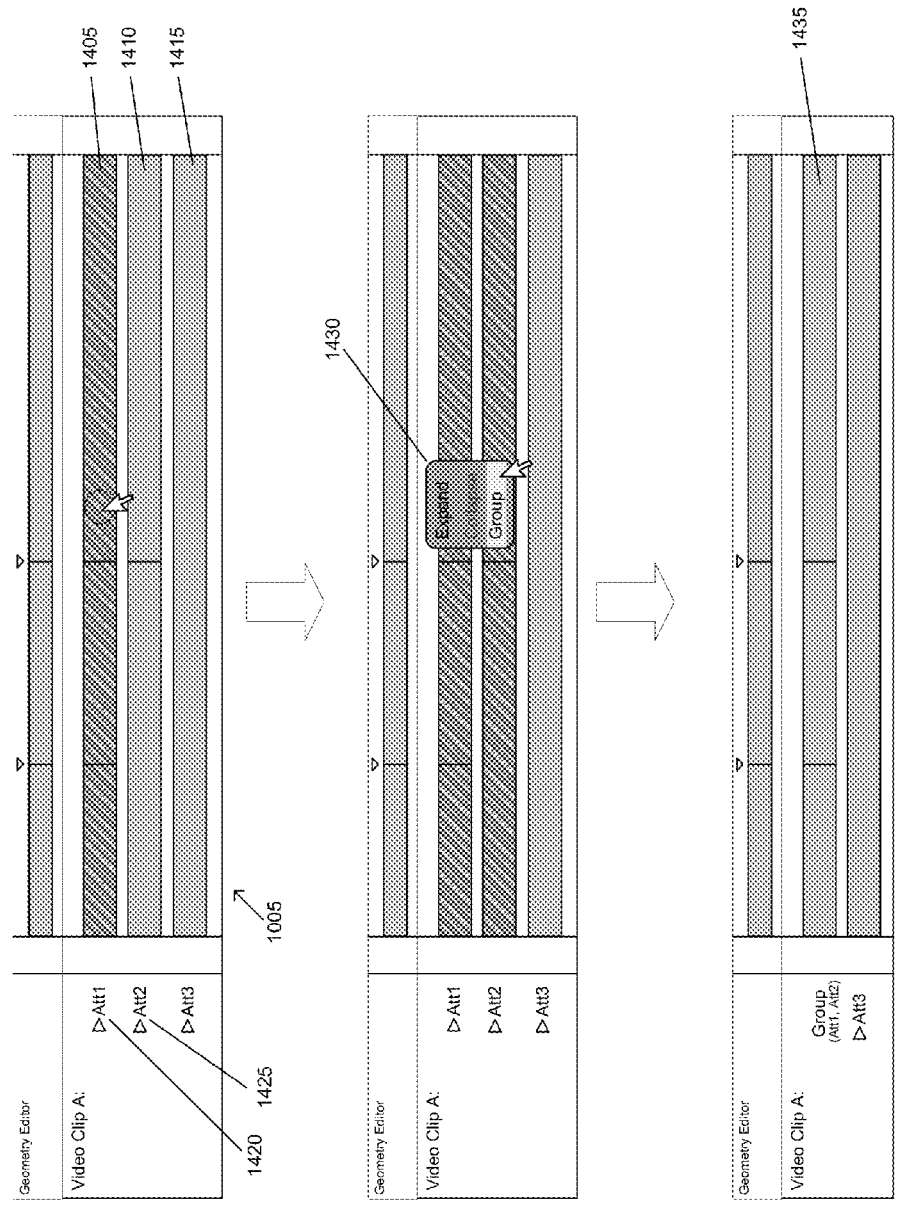
FIG. 14 illustrates and example of combining two attributes into one multi-attribute timing bar in some embodiments.

The same operation for creating a key index across multiple desired attributes can also be accomplished by combining the desired attributes together in a multi-attribute timing bar as illustrated in FIG. 14. This operation may sometimes be preferred over disassociating the undesired attribute(s) from the global timing bar or removing them from active editing in the geometry editor window 1005.

FIG. 14 illustrates altering the selection state of multiple timing bars in order to combine two attributes 1420 and 1425 in a single multi-attribute timing bar 1435. As shown, three timing bars 1405, 1410, and 1415 are displayed in the geometry editor window 1005. In this example, the selection states of two attributes 1420 and 1425 are altered. Specifically, the user alters the selection states by first selecting the Att1 timing bar 1405, and then selecting the Att2 timing bar 1410. The timing bars, or graph shapes in an un-collapsed view, may be selected in any number of different ways. For instance, the user may select the timing bars 1405 and 1410 through a cursor click operation while holding down a modifier key, by selecting user-interface controls (e.g., check boxes), or through hotkeys (e.g., CTRL+A). Once the desired attribute shape representations are selected, some embodiments use a right click operation to bring up a context menu 1430 allowing the user to group the selected attributes 1420 and 1425 into a single multi-attribute timing bar 1435. The grouping of attributes may also be performed in any number of different ways. For instance, the user may combine the two using a drop down menu from the file browser of through the use of a hotkey or keyboard shortcut.

Figure 15:
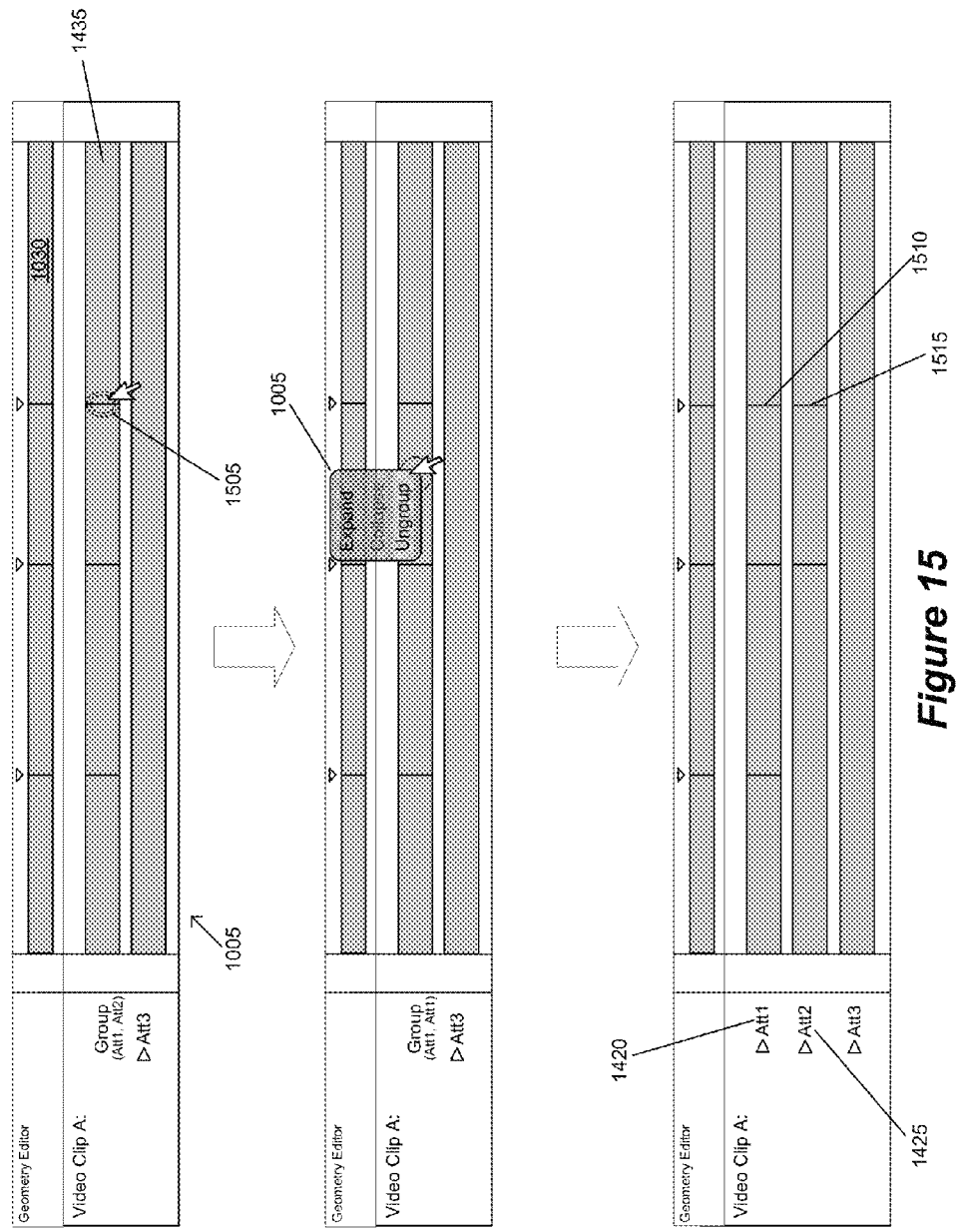
FIG. 15 illustrates an example of creating a new key index across all attributes associated with a multi-attribute timing bar in some embodiments.

FIG. 15 illustrates an example of creating key indices across the selected attributes associated with the multi-attribute timing bar 1435 created in FIG. 14. Specifically, it illustrates the cursor as selecting (e.g., through a double click operation) one location 1505 on the multi-attribute timing bar in the same fashion as illustrated in FIG. 2 and FIG. 10. The user can then ungroup the multi-attribute timing bar through a context menu 1430 or keyboard shortcut to reveal the individual shapes and/or timing bars representing each attribute that was associated with the multi-attribute timing bar. As shown, the selection to create a key index in the multi-attribute timing bar creates two new key index markers, where one key index marker 1510 is associated with Att1 1420, while the other key index marker 1515 is associated with Att2 1425. This method may be useful when a user is working with several attributes and wishes not to remove several attributes from the editor window 1005 or disassociate them from the global timing bar 1030 in order to manipulate only a few of the several attributes being edited.

Figure 16:
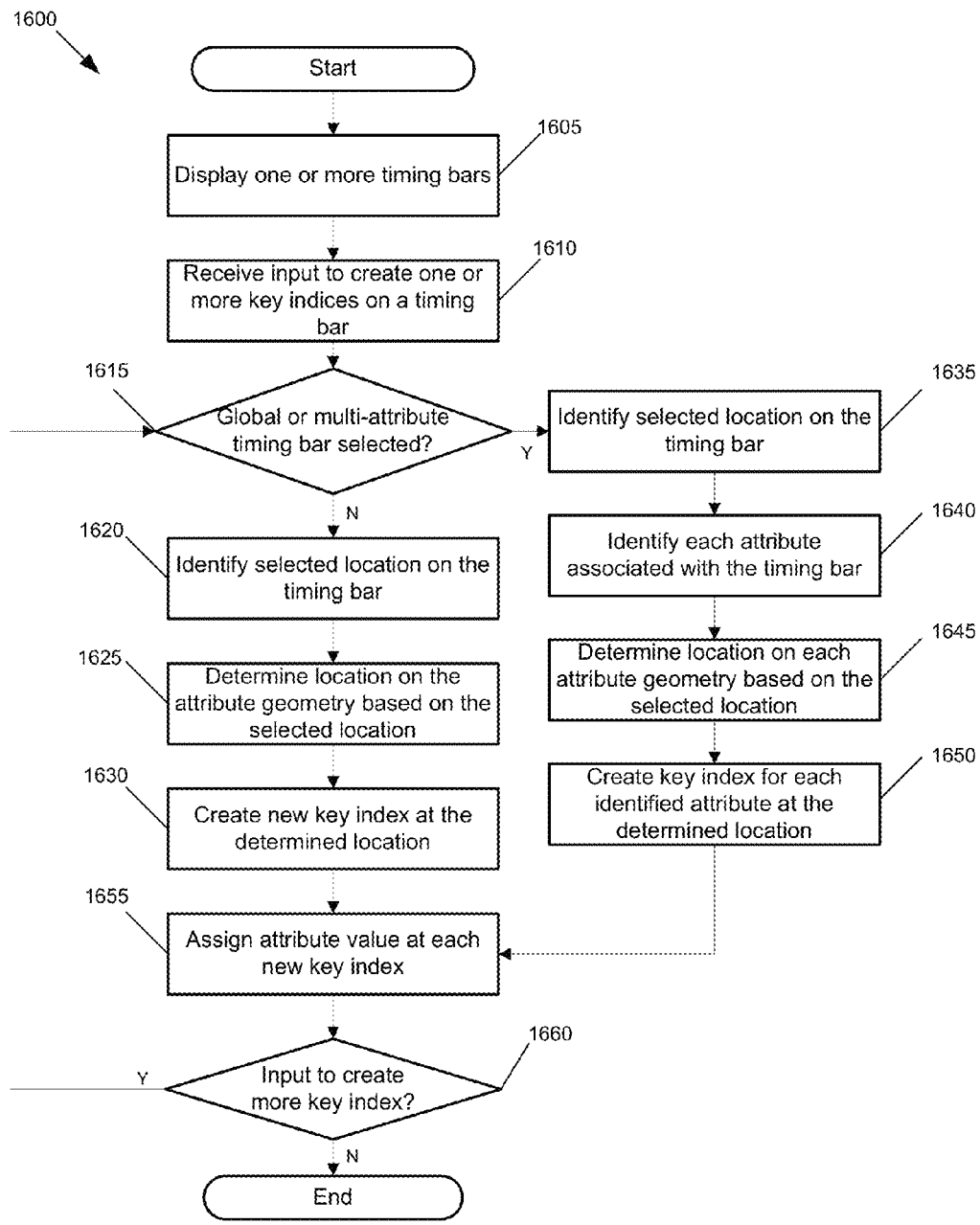
FIG. 16 illustrates a process for creating key indices using timing bars.

The preceding section described and illustrated various ways to create new key indices for one or more attributes of media content using timing bars. FIG. 16 conceptually illustrates a process 1600 of some embodiments for creating one or more new key indices. The specific operations of the process may not be performed in the exact order described. The specific operations may not be performed in one continuous series of operations. Different specific operations may be performed in different embodiments. Furthermore, the process could be implemented using several sub-processes, or as part of a larger macro-process. As shown, the process displays (at 1605) one or more timing bars. Several examples of displaying such timing bars in a geometry editor window are illustrated in FIGS. 10-15.

The process then receives (at 1610) an input to create one or more new key indices on a timing bar. In some embodiments, the input is received from the user interacting with a graphical user interface of the media editing application. Next, the process (at 1615) determines whether a multi-attribute timing bar or a global timing bar is selected as opposed to a single-attribute timing bar. An example of receiving a user's selection of a single-attribute timing bar is illustrated in FIG. 10. An example of receiving selection of a location on a global or multi-attribute timing bar is described above in FIGS. 11 and 15.

When a global or multi-attribute timing bar is selected, process proceeds to 1635 which is described below. Otherwise, the process identifies (at 1620) the selected location on a single-attribute timing bar. In some embodiments, such identification entails determining the input coordinate of the selected location. The process then determines (at 1625) a location on the attribute geometry for the new key index based on the selected location. For instance, when the user selects the interior location of a timing bar, some embodiments determine the location for the new key index at the horizontal coordinate of the selected location. The process then creates (at 1630) the new key index on the timing bar at the determined location. The process then proceeds to 1655 which is described below.

When the determination is made (at 1615) that a global or multi-attribute timing bar is selected, the process proceeds to 1635. The process identifies (at 1635) the selected location on the timing bar. In some embodiments, such identification includes determining the input coordinate of the selected location. The process then identifies (at 1640) each attribute that is associated with the selected timing bar.

The process then determines (at 1645) the location for each new key index on each identified attribute geometry. For instance, when the user selects the location on the global or multi-attribute timing bar, some embodiments determine the location for each new key index at the horizontal coordinate of the selected location. The process then creates (at 1650) a new key index for each identified attribute. For instance, as illustrated in FIG. 11, if a global timing bar was selected a new key index is created for every attribute being editing in the geometry editor window. If a multi-attribute timing bar was selected, as shown in FIG. 15, a new key index is created for each attribute associated with the multi-attribute timing bar.

When one or more key indices are created, the process assigns (at 1655) an attribute value at each new key index. In some embodiments, one or more of the new key indices are assigned a default value. For instance, when the new key index represents an opacity attribute, it might be assigned a value that defines the opacity as fully visible. Some embodiments assign a value at the key index that is equal to the value of the attribute at the horizontal coordinate of the key index before the creation of the key index as illustrated in FIG. 2. That is, the creation of the key index does not alter the key-indexed graph at that point. The process then awaits (at 1660) an input to create more new key indices. When such input is received, the process returns to 1615. Otherwise, the process ends.

One of ordinary skill in the art will realize that not all features for creating key indices need to be used together. Accordingly, some embodiments perform variations of the process 1600. In some embodiments, the operations of process 1600 might be performed by two or more separate processes. That is, some embodiments could have one process for creating a new key index through selection of single-attribute timing bar and a separate process for creation of a new key index on a global or multi-attribute timing bar.

The preceding section described and illustrated alternative ways to create new key indices through the use of various types of timing bars including single-attribute, multi-attribute and global timing bars. The next section will illustrate how key indices may be relocated using the various types of timing bars illustrated in the preceding sections.

B. Relocating Key Indices

FIGS. 17-21 provide several examples of relocating key indices on one or more key-indexed graphs. Specifically, these figures illustrate relocating key indices by selecting and moving: (i) a representation (e.g. key index marker) of a key index on a timing bar (single or multi-attribute), (ii) an interior location within such a timing bar, and (iii) representations of key indices on a global timing bar.

Figure 17:
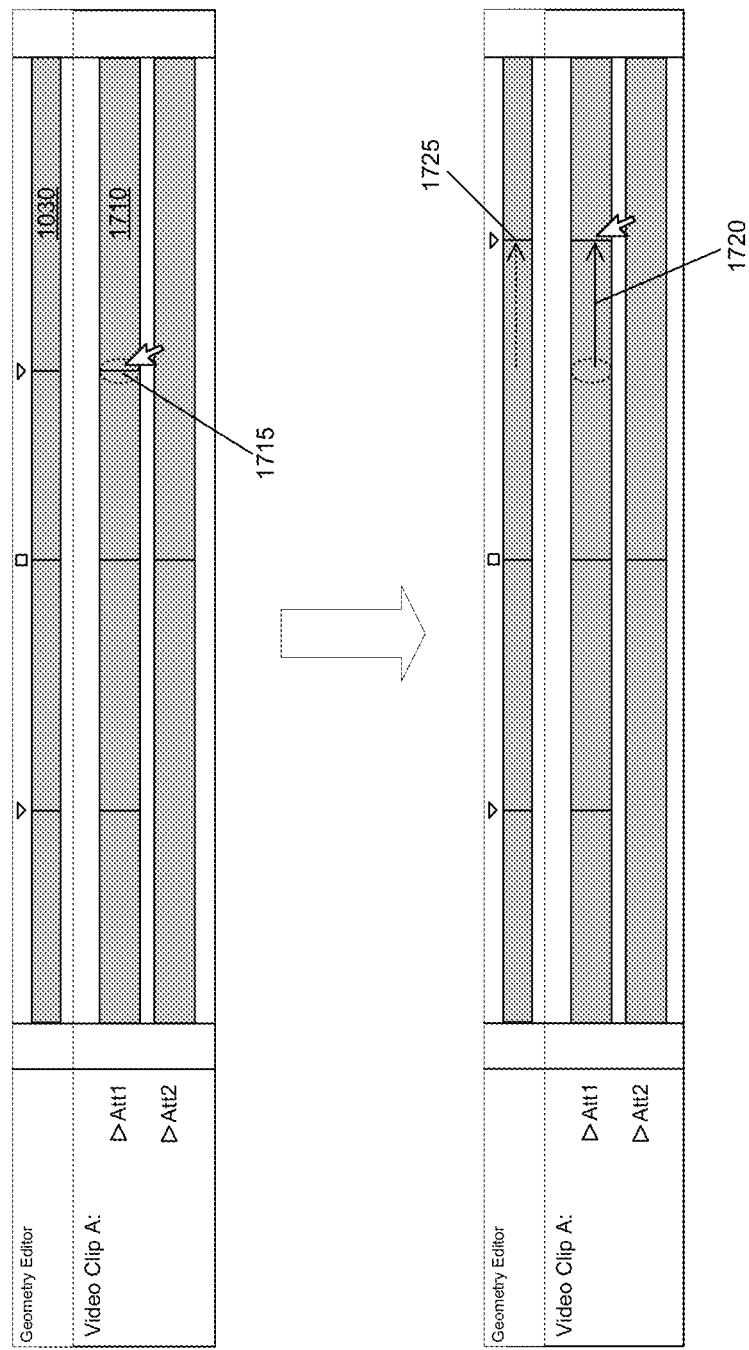
FIG. 17 illustrates relocating a key index using a timing bar in some embodiments.

FIG. 17 illustrates relocating the key index on the timing bar 1710 by selecting and moving a key index marker 1715 within the timing bar 1710. Specifically, to relocate the key index, this figure illustrates selecting and moving the marker 1715 which was similarly described above by reference to FIG. 4. To simplify these illustrations, a key index has not been shown on the key index marker as described in FIG. 4. In this example, when a user selects the marker 1715 (e.g., through a cursor click operation), the user can then move the marker (e.g., through a cursor drag operation 1720) to relocate the key index on the timing bar. Relocation of a key index will also be reflected in the global timing bar 1030 as illustrated by the relocation of the key index marker 1725 in the global timing bar 1030 in FIG. 17.

Figure 18:
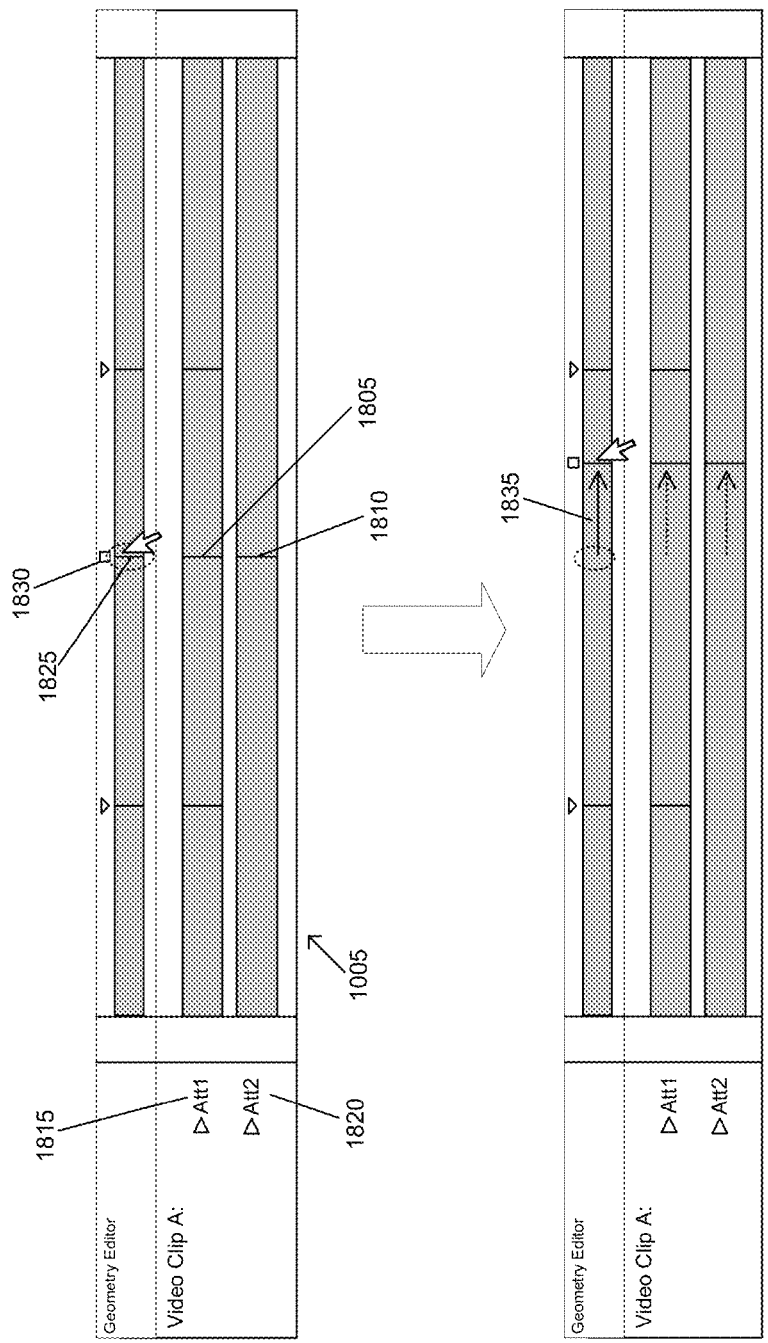
FIG. 18 illustrates relocating multiple key indices belonging to two attributes from the global timing bar in some embodiments.
Figure 19:
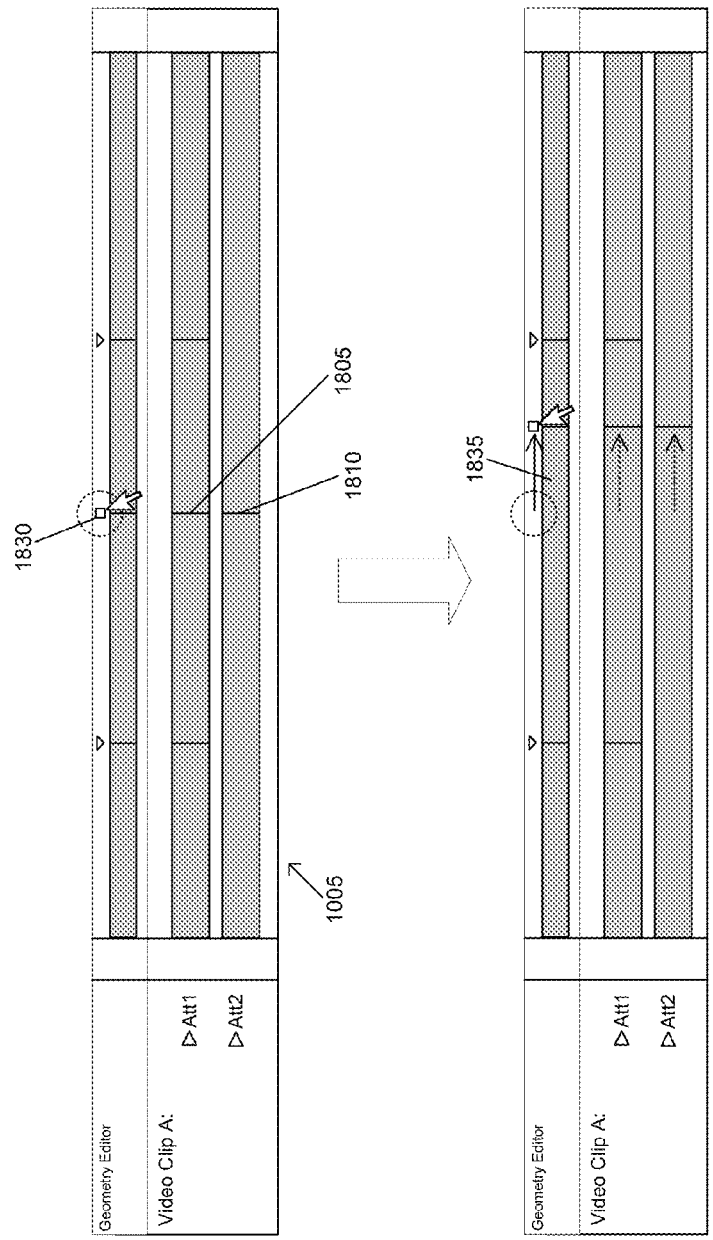
FIG. 19 illustrates relocating multiple key indices belonging to two attributes from the global timing bar in some embodiments.

Similarly, FIG. 18 illustrates relocating multiple shared key indices 1805 and 1810 from the global timing bar. Here, the shared location of a key index in Att1 1815 and Att2 1820 is represented by a key index marker 1825 dividing the global timing bar. The square icon 1830 above the timing bar represents that the particular key index at that location is shared between all active attributes (1815 and 1820) currently displayed in the geometry editing window 1005. FIG. 18 specifically illustrates the selection of the marker 1825 representing the location of a key index on the global timing bar, and through a cursor drag operation 1835, each key index, 1805 and 1810, represented by the marker 1825 in the global timing bar is relocated to a new position. This same operation can also be accomplished by selecting the icon 1830 and relocating its position. Such an example is illustrated in FIG. 19.

Figure 20:
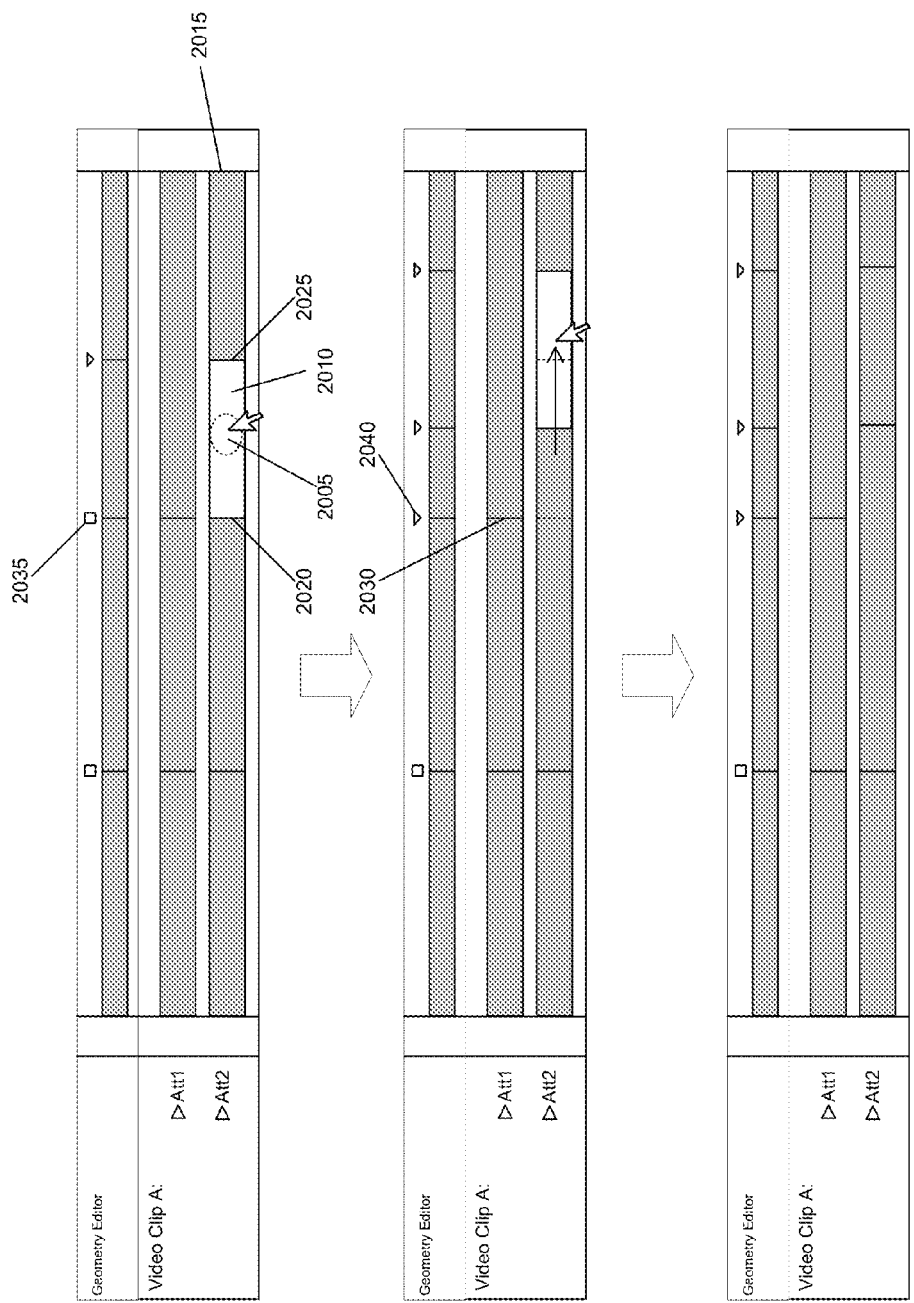
FIG. 20 illustrates the relocation of a segment, as defined by two key indices, for a single attribute from a timing bar in some embodiments.

When several key indices for several attributes overlap (i.e., are at the same point in the timeline), some embodiments display on the global timing bar one representation for the several key indices, as previously mentioned. When one of the two overlapping key indices is moved, some embodiments change the representation in the global timing bar to signify that the two key indices are no longer overlapping. One such example is illustrated in FIG. 20. Specifically, this figure illustrates an example of the grabbing the interior location 2005 of a segment 2010 in a timing bar 2015. This type of operation allows a user to move two key indices 2020 and 2025 that define the segment 2010 simultaneously without altering the duration between the two indices 2020 and 2025. Specifically, the segment is moved to a later or earlier position in the timeline while the duration between the two key indices 2020 and 2025 remains the same.

As illustrated in FIG. 20, relocating, with a click and drag cursor operation, the two key indices represented by key index markers 2020 and 2025 relocates key index 2020 that originally overlapped key index 2030. When key index 2020 is relocated, the representation in the global timing bar changes from a square 2035 to a triangle to signify that the two key indices 2020 and 2030 are no longer overlapping. As previously mentioned, the icons 2035 and 2040 may represent various types of information, and for illustration purposes the information being conveyed by the icons in FIG. 20 is the identification of overlapping and non-overlapping key indices.

Figure 21:
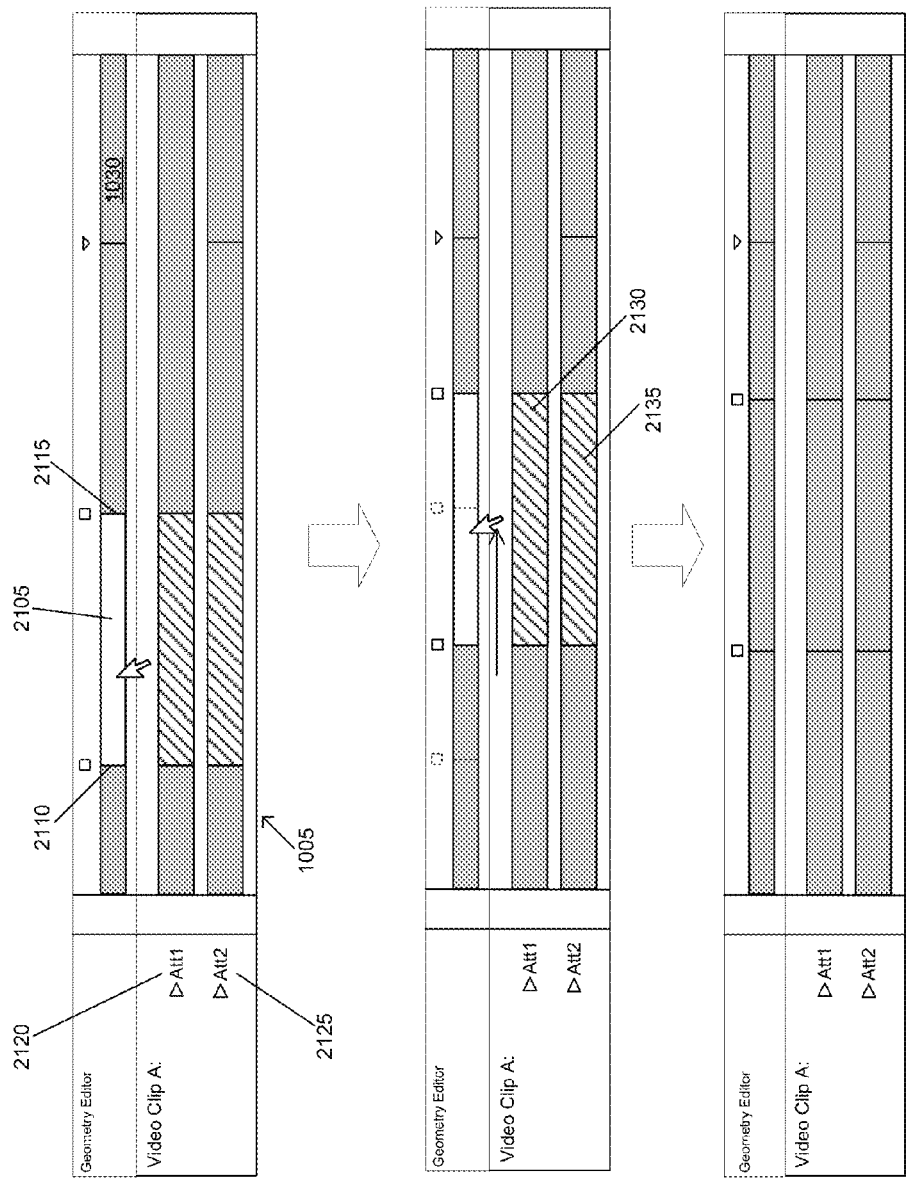
FIG. 21 illustrates the relocation of a segment, as defined by two key indices, for a multiple attributes from the global bar in some embodiments.

FIG. 21 illustrates the similar concept of relocating a segment defined by two key indices as shown in FIG. 20 from a global timing bar 1030. As shown, two attribute 2120 and 2125 are currently being edited in the geometry editing window 1005. The segment 2105 is defined by two key index markers 2110 and 2115 that are shared across the two attributes 2120 and 2125. Relocating a segment 2105 in the global timing bar 1030 shifts each corresponding segment as illustrates here with segments 2130 and 2135 for each attribute 2120 and 2125. This same operation could have also been performed from a multi-attribute timing bar having both attributes 2120 and 2125 grouped together. Some embodiments allow a modification of multiple attributes from a global or multi-attribute timing bar only when both starting and ending key indices are commonly shared at the same location as shown here. Other embodiments may allow this modification if only one key index is commonly shared, while some embodiments might not allow this operation altogether.

Figure 22:
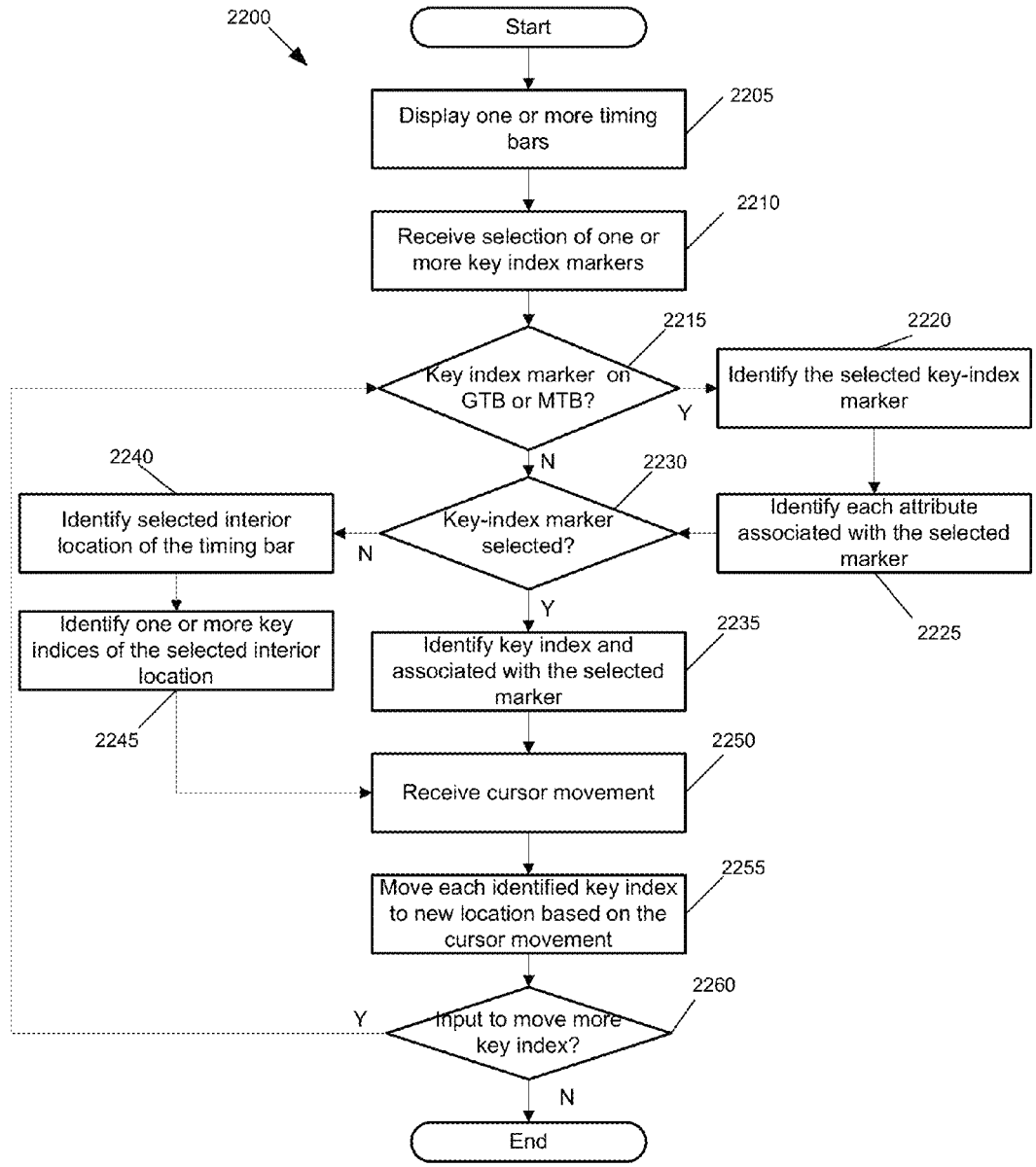
FIG. 22 illustrates a process for relocating key indices from a timing bar in some embodiments.

The preceding section described and illustrated various ways to relocate key indices on a timing bar. FIG. 22 conceptually illustrates a process 2200 of some embodiments for relocating one or more key indices on a timing bar. The process is performed by a media editing application in some embodiments. The specific operations of the process may not be performed in the exact order described. The specific operations may not be performed in one continuous series of operations. Different specific operations may be performed in different embodiments. Furthermore, the process could be implemented using several sub-processes, or as part of a larger macro-process. As shown, the process starts when it displays (at 2205) one or more timing bars. Several examples of displaying such timing bars are illustrated in FIGS. 17-21.

The process then receives (at 2210) a selection of one or more the key index markers on the timing bar. In some embodiments, the input is received from a user interacting with a graphical user interface of the media editing application. Next, the process determines (at 2215) whether the selected key index marker is on a global or multi-attribute timing bar.

When a key-index marker on either a global or multi-attribute timing bar is selected, the process proceeds to 2220. Otherwise the process proceeds to 2230. The process identifies (at 2220) the selected key-index marker. After identifying the selected marker, the process identifies (at 2225) each attribute associated with the selected key-index marker. An example of identifying key indices that are associated with multiple attributes on a on a global timing bar is described above by reference to FIG. 18.

When the determination is made (at 2215) that a single-attribute timing bar is selected (i.e. not a global or multi-attribute timing bar) or has identified all the attributes associated with a global or multi-attribute timing bar, the process determines (at 2230) whether the key index marker on a timing bar is selected as opposed to an interior region of the timing bar. When a single key-index marker or key index is selected, the process identifies (at 2235) the location of the key index associated with the key-index marker for each attribute.

When a determination is made (at 2230) that a key index marker or key index on the timing bar is not selected, the selected portion of the timing bar is an interior location on the timing bar. The process then identifies (at 2240) the selected interior location. Based on this identification, the process then identifies (at 2245) one or more key indices that are affected by the selected interior location. Examples of identifying such key indices are described above by reference to FIGS. 20 and 21. For instance, some embodiments identify the first key indices on either side of the selected location.

Once one or more key indices are identified, the process receives (at 2250) cursor movement. Based on the cursor movement, the process (at 2255) moves each identified key index for each identified attribute to a new location on a corresponding graph. The process then awaits (at 2260) input to relocate more key indices. When such input is received, the process returns to 2215. Otherwise, the process ends.

One of ordinary skill in the art will realize that not all features for relocating key indices need to be used together. Accordingly, some embodiments perform variations on the process 2200. In some embodiments, the operations of process 2200 might be performed by two or more separate processes. That is, some embodiments could have one or more processes for relocating key indices through selection of a single attribute timing bar and a separate process for relocating key indices through selection of a global or multi-attribute timing bar.

The preceding section described and illustrated various ways to relocate new key indices through the use of various types of timing bars including single-attribute, multi-attribute and global timing bars. The next section will illustrate how the attribute value at each key index may be modified using the various types of timing bars illustrated in the preceding sections.

C. Specifying Attribute Values

FIGS. 23-26 provide several illustrative examples of selecting key indices provided in a timing bar and modifying the attribute value at a particular key index. In particular, these figures illustrate modifying the value of one or more attributes at a key index from a timing bar by selecting the key index on the timing bar and positioning the key index vertically on its corresponding key index marker to represent the value of the attribute at the location of that particular key index.

Figure 23:
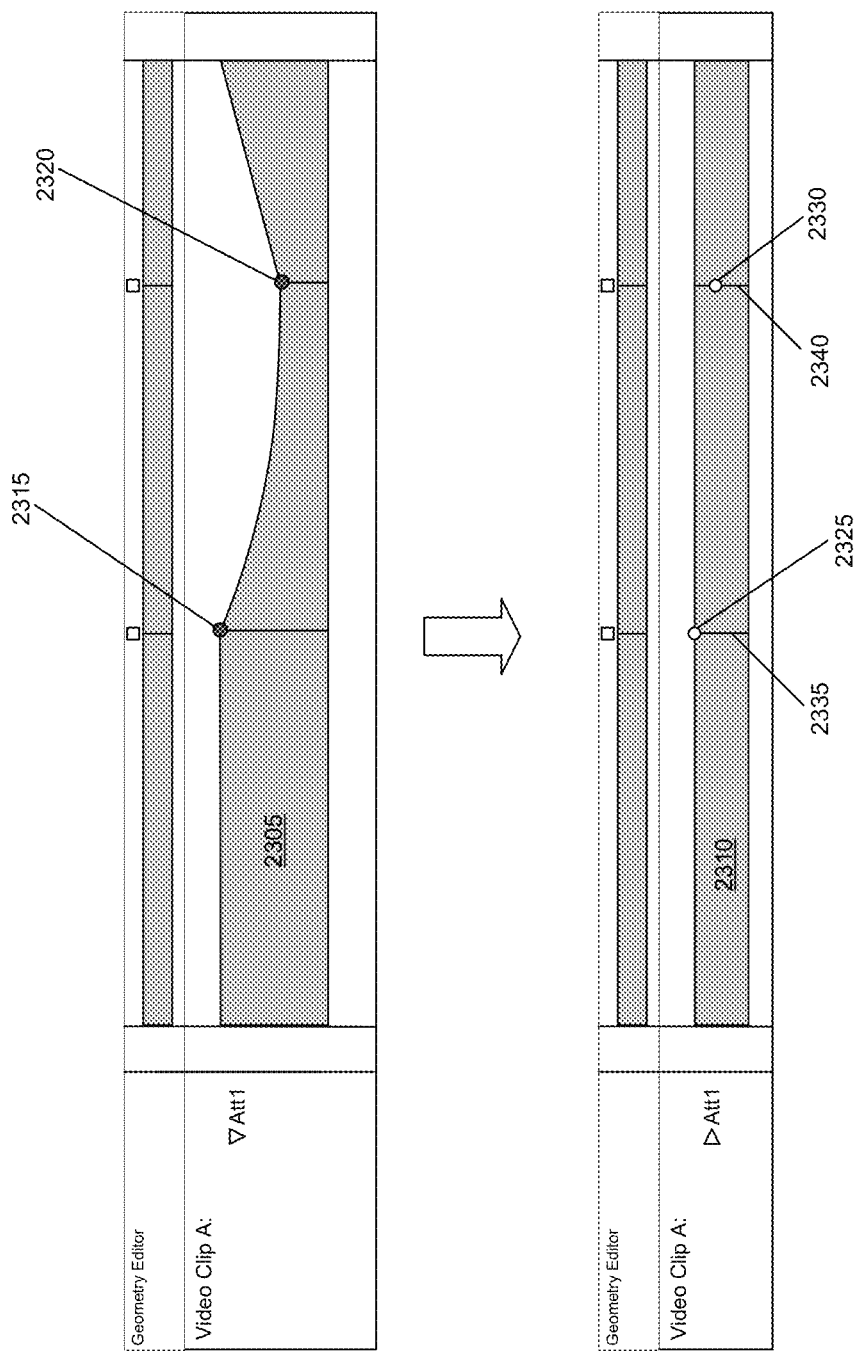
FIG. 23 illustrates key index marker and attribute value indicators on a timing bar in some embodiments.
Figure 24:
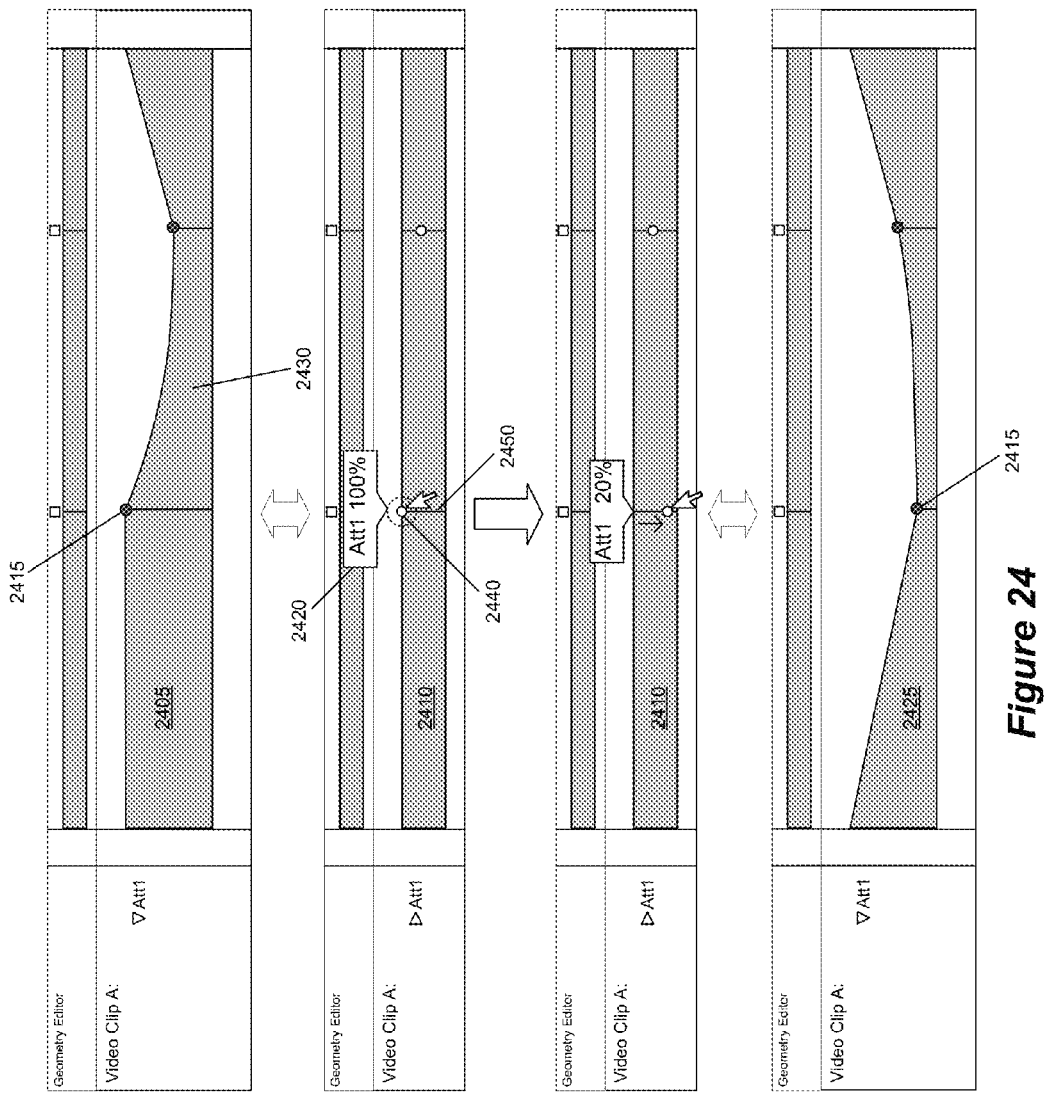
FIG. 24 illustrates modifying the value of an attribute using the attribute value indicator of a timing bar in some embodiments.

FIG. 23 illustrates a key-indexed graph 2305 and its collapsed timing bar representation 2310 where the attribute value at each key index 2315 and 2320 is represented by the vertical positions the key index 2325 and 2330 on their respective key index markers 2335 and 2340. As illustrated, key index 2315 is positioned at its maximum value on the key indexed graph 2305. The attribute value gradually decreases to key index 2320, as indicated by the position of key index 2320, before linearly increasing back towards its maximum value. The key-indexed graph is then shown collapsed into a timing bar. The key indices 2315 and 2320 are represented as selectable key indices 2325 and 2330 on the timing bar. FIG. 24 will demonstrate how these key indices can be moved vertically along a key index marker within the timing bar to change the attribute values at its particular location.

FIG. 24 illustrates modifying the attribute value of one key index from a timing bar. Specifically, FIG. 24 first shows a key-indexed graph 2405 and the graph collapsed into a timing bar 2410. Within the timing bar 2410, a cursor selection of the key index 2440 brings up a pop-up window 2420 displaying the current attribute value. As shown, the current value of the attribute is 100% at the selected location. The key index 2440 is then dragged in a downward direction by the cursor. As the key index 2440 is moved along its key index marker 2450, the pop-up window 2420 displays the value of the attribute as the value is modified. Some embodiments allow the user to drag the cursor outside the timing bar when manipulating an attribute value in this manner. This allows freedom of movement while editing and therefore does not restrict the user to be bound by the small area within the timing bar when making such edits in a timing bar.

As shown, the key index 2440 is dragged towards the bottom of the timing bar 2410 which modifies the attribute value from 100% to 20%. The change in attribute value is reflected in the expanded graph shape of the attribute where the key-indexed graph 2425 now reflects the new attribute value of 20% at the first key index 2415. In some embodiments, the attribute values are displayed at all times through text labels within the timing bar rather than displaying the value in a pop-up window during selection of a key index. Such an example is shown in FIG. 25.

Figure 25:
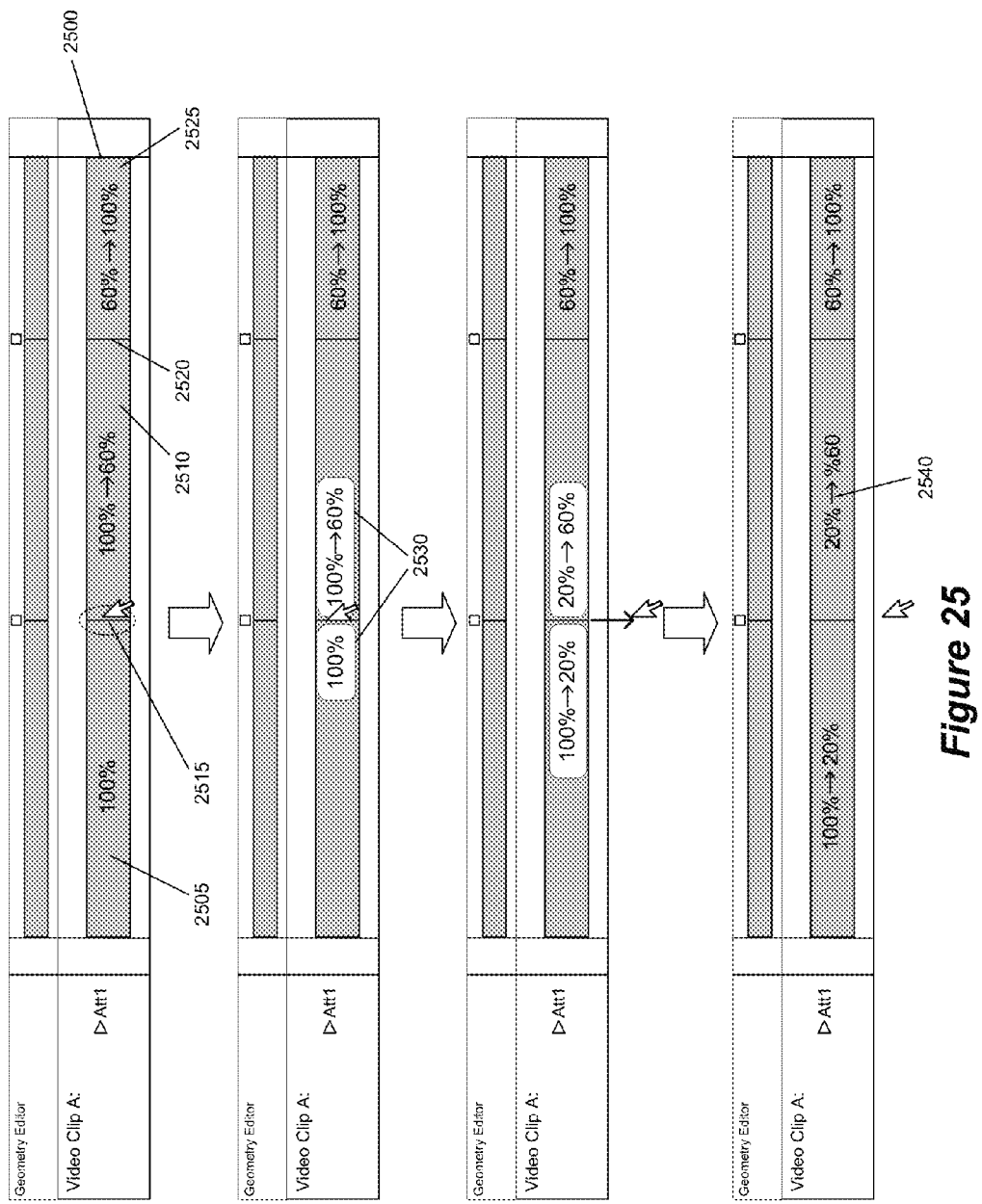
FIG. 25 illustrates attribute values text labels of a timing bar and modifying the value of an attribute using a key index marker in some embodiments.

FIG. 25 illustrates the same timing bar 2310 and 2410 of FIGS. 23 and 24 having text labels to reflect the attribute values at each key index. Specifically, FIG. 25 illustrates how the text labels react when editing the attribute value at a key index. In this illustration, the text conveys the attribute values in each segment of the timing bar, where each segment is defined by a starting and ending key index. When an attribute value is constant between two key indices, only the constant value of the attribute is displayed within the segment as illustrated in the first segment 2505 of the timing bar 2500. The second segment 2510 represents segment 2430 of the key-indexed graph 2405 of FIG. 24. This segment reflects the change in attribute value from 100% at the beginning key index 2515 to 60% at the ending key index 2520. The final segment 2525 illustrates the attribute value going back up to 100% from 60%.

The illustration initially shows the selection of key index marker 2515. After selection of the key index marker 2515, the text labels 2530 are highlighted and move towards the key index to visually inform a user of the selection of that particular key index for editing. Here, the illustration shows the same edit of FIG. 24 where the attribute value at key index 2515 is modified from an initial value of 100% to 20% at key index 2515 in segment 2505. The second segment 2510 also reflects the change in the same fashion by showing the attribute value now starting at 20% and changing to 60% between the two key indices 2515 and 2520 that define the second segment 2510 of the timing bar 2500. After releasing the key index marker 2515, the text labels return to their centered position within their respective segments and are no longer highlighted.

This illustration shows that the attribute values are changing from one value to another by displaying an arrow 2540 between the text that displays the attribute values. Some embodiments can also convey the type of interpolation (e.g. ease out, ease in, linear) at which the attribute value changes through icons rather than displaying an arrow between the text. These icons can represent certain default or pre-set transitions that are available to the user in the media editing application. Furthermore the icon or arrow 2540 can be selectable in some embodiments, where selection of the arrow or icon reveals a context menu populated with pre-set interpolations that can be applied to that particular segment. Editing the transition, or interpolation, from a timing bar using other methods will be discussed in further detail in the following section.

Figure 26:
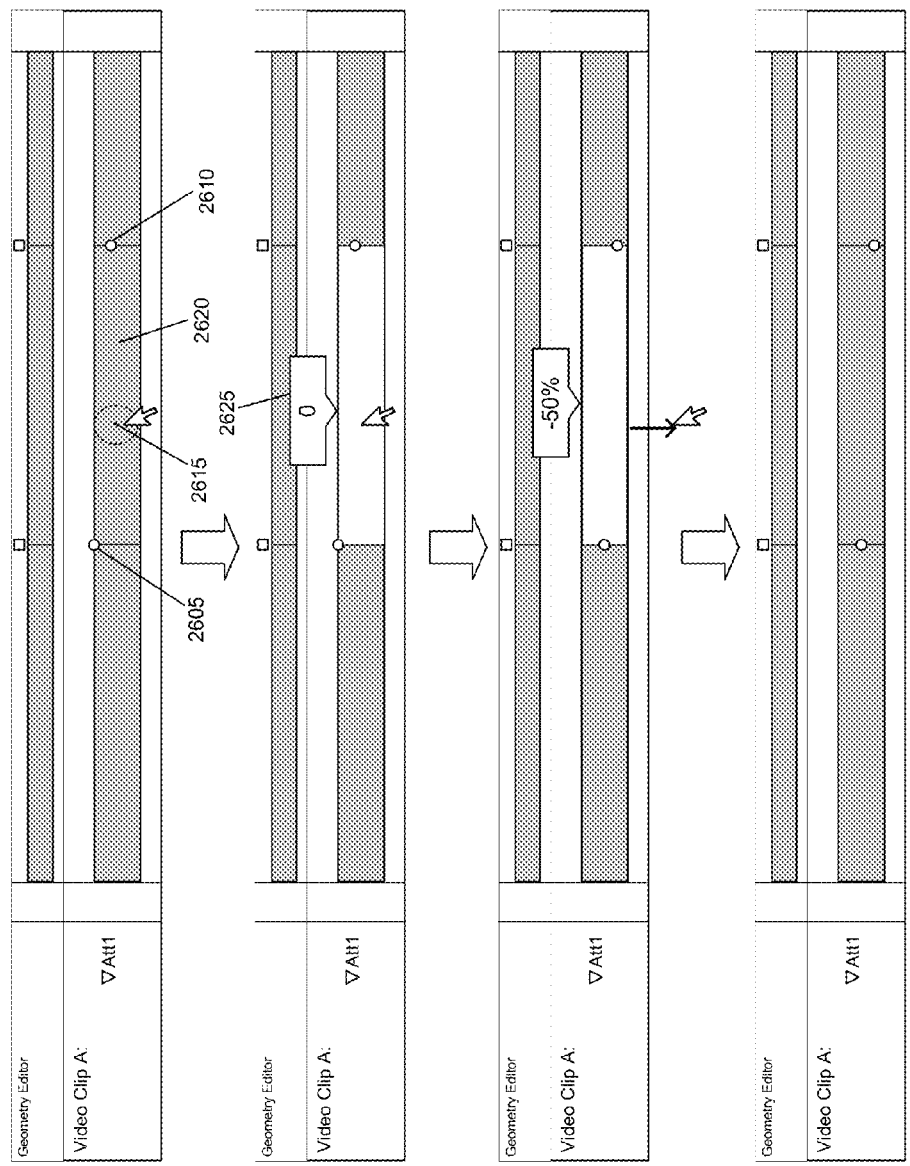
FIG. 26 illustrates modifying attribute values at two key indices through selection of a segment of a timing bar in some embodiments.

FIG. 24-25 illustrated how the attribute value at one key index can be specified. Some embodiments also allow the simultaneous modification of the value of an attribute at more than one key index, specifically the starting and ending key indices that define a segment within a timing bar or graph shape. This example is illustrated in FIG. 26. FIG. 26 shows the same timing bar of FIGS. 23-25 having an attribute value of 100% at the first key index 2605 and a value of 60% at the second key index 2610. First, the selection of an interior location 2615 of the segment 2620 is shown. This selection highlights the segment 2620 to indicate to the user that he is about to perform an edit operation on the entire segment. Previously, FIG. 20 illustrated a similar selection of a segment on the timing bar to show that the position of two key indices can be relocated to a different position in the timeline by dragging the segment left or right. In FIG. 26 the same concept applies, but instead the attribute value at each key index 2605 and 2610 is being modified by a vertical up or down movement of the cursor. Some embodiments provide the user with a keyboard control or hotkey to allow movement in only the vertical or horizontal direction to avoid the user from accidentally making edits in both the location and attribute value of each key index.

When modifying the attribute value, as illustrated, a pop-up box 2625 displays the relative change in value at each key index 2605 and 2610. Initially, the relative change is zero. When the cursor is dragged vertically in a downward direction, the pop-up box 2625 reflects the relative change at each key index. Here, the illustration shows that the attribute value has been decreased by a value of 50%. Therefore, the final position of key index 2605, which started at 100%, has changed to 50% and the value of key index 2610, which started at 60%, has changed to 10% as illustrated by the position of each key index along their respective key index maker within the timing bar.

The operations described above can also be translated in the same manner to a multi-attribute or global timing bar where the two or more attributes being represented share common key indices for a particular segment. When changing the value of multiple attributes in a similar fashion, the pop up displays 2420 and 2625 of FIG. 24 and FIG. 26 can be populated with each attribute and the current value of each attribute at that particular location.

Figure 27:
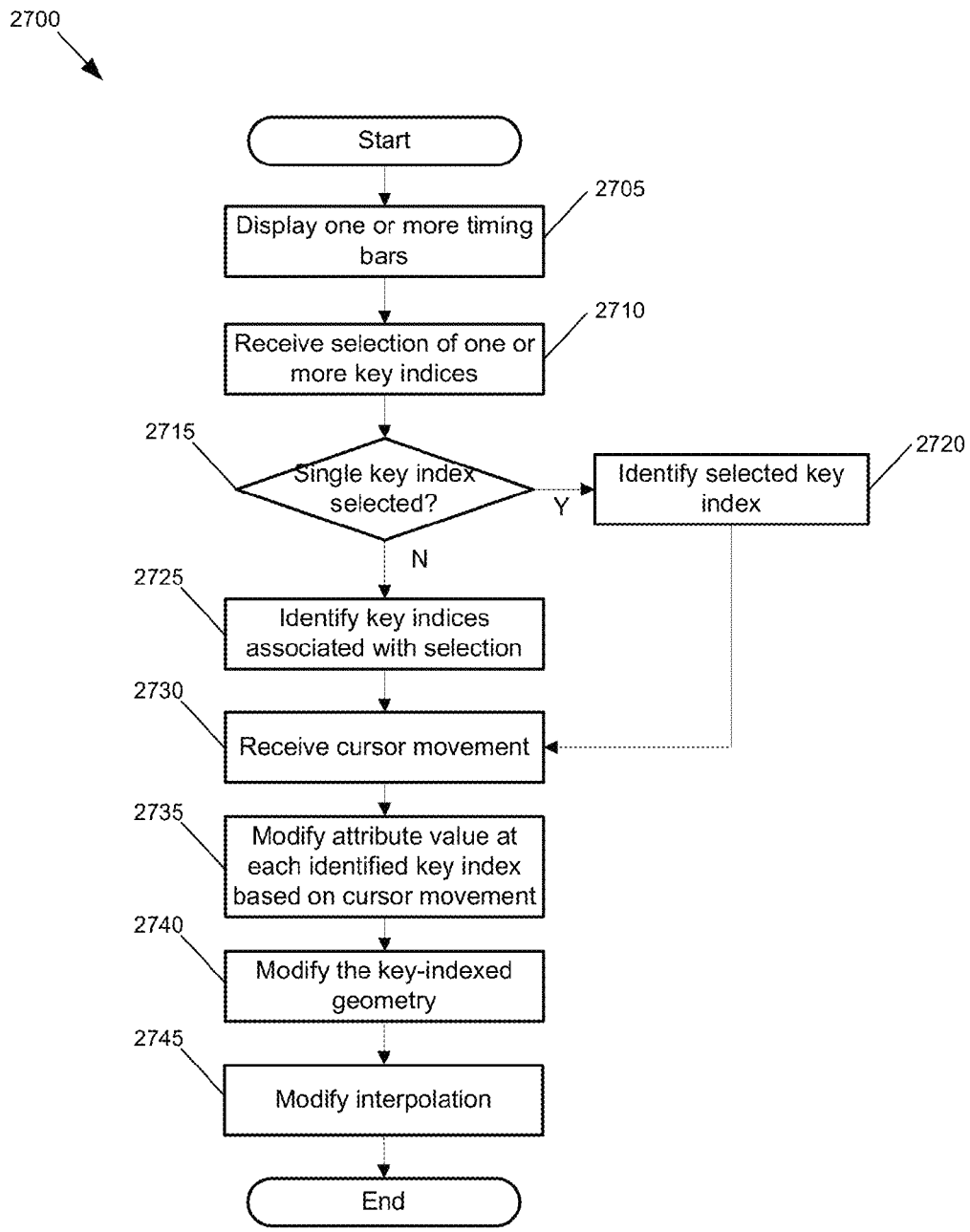
FIG. 27 illustrates a process for modifying the attribute value at a key index in some embodiments.

The preceding section described and illustrated various ways to modify attribute values at key indices. FIG. 27 conceptually illustrates a process 2700 of some embodiments for setting attribute values at one or more key indices. The specific operations of the process may not be performed in the exact order described. The specific operations may not be performed in one continuous series of operations. Different specific operations may be performed in different embodiments. Furthermore, the process could be implemented using several sub-processes, or as part of a larger macro-process. As shown, the process starts when it displays (at 2705) one or more timing bars in a geometry editor window of a media editing application as illustrated in all the previous figures.

The process then receives (at 2710) selection of at least one key index to set the attribute values at each key index. After receiving the selection, the process then determines (at 2715) whether the a single key index is selected as illustrated in FIGS. 24-25 as opposed to the selection of two key indices as illustrated in FIG. 26. Some embodiments make this determination based on whether a single key index or key index marker is selected or whether a segment, defined by a starting and ending key index is selected on the timing bar. When the selection corresponds to a single key index, the process then identifies (at 2720) the corresponding key index.

When the selection corresponds to multiple key indices (i.e. when a segment of the timing bar is selected), the process proceeds to 2725. The process identifies (at 2725) the key indices associated with the selected location on the timing bar. In some embodiments, the identification includes identifying the key indices that are adjacent to the selected segment of a timing bar. That is, when the selection is at a point within a timing bar between two key indices, the process identifies the key indices on either side of the selected point. This corresponds to the selection of a segment of the timing bar as illustrated in FIG. 26.

Next, the process receives (at 2730) cursor movement for the identified key indices. Based on the cursor movement, the process (at 2735) modifies the attribute value at each of the identified key indices. The process then modifies (at 2740) the key-index geometry at each identified key index in accordance with the new attribute values at each key index. That is, as the attribute value at a key index is modified, the key-indexed geometry is modified as well. Several examples of performing such modifications are described above by reference to FIGS. 24-26. The process also modifies (at 2745) the interpolation between key indices. For instance, in FIG. 24, the selection and movement of the key index 2440 causes the interpolation between adjacent sets of key indices to be modified. Modifying the attribute of one key index, as illustrated in FIG. 24, will modify the slope of the graph between key index 2415 and the neighboring key index before 2415 as well as the interpolation between key index 2415 and the neighboring key index after key index 2415.

One of ordinary skill in the art will realize that not all features described above for setting attribute at key indices need to be used together. Accordingly, some embodiments perform variations on the process 2700. That is, some embodiments could have one process for modifying attribute values at key indices through selection of one or more key indices and a separate process for modifying attribute values at key indices through the selection of text labels or the selection of the key-index markers on a global timing bar.

The above examples have illustrated how key indices can be relocated and how the attribute value at each key index can be modified from a timing bar. The next section will describe how the transition, or interpolation, between key indices can be directly modified from a timing bar without having to expand the timing bar into a full key-indexed graph.

D. Modifying Interpolation Between Key Indices

FIG. 28-35 illustrate examples of manipulating the transition (i.e. interpolation) between two key indices of a key-indexed graph with the use of a timing bar. Specifically, these figures illustrate (i) selection of an interpolation mode for editing interpolations using timing bars, (ii) interpolation marks for representing the speed or ease of a transition, and (iii) manipulation of the interpolation marks to affect the interpolation between two key indices.

Figure 28:
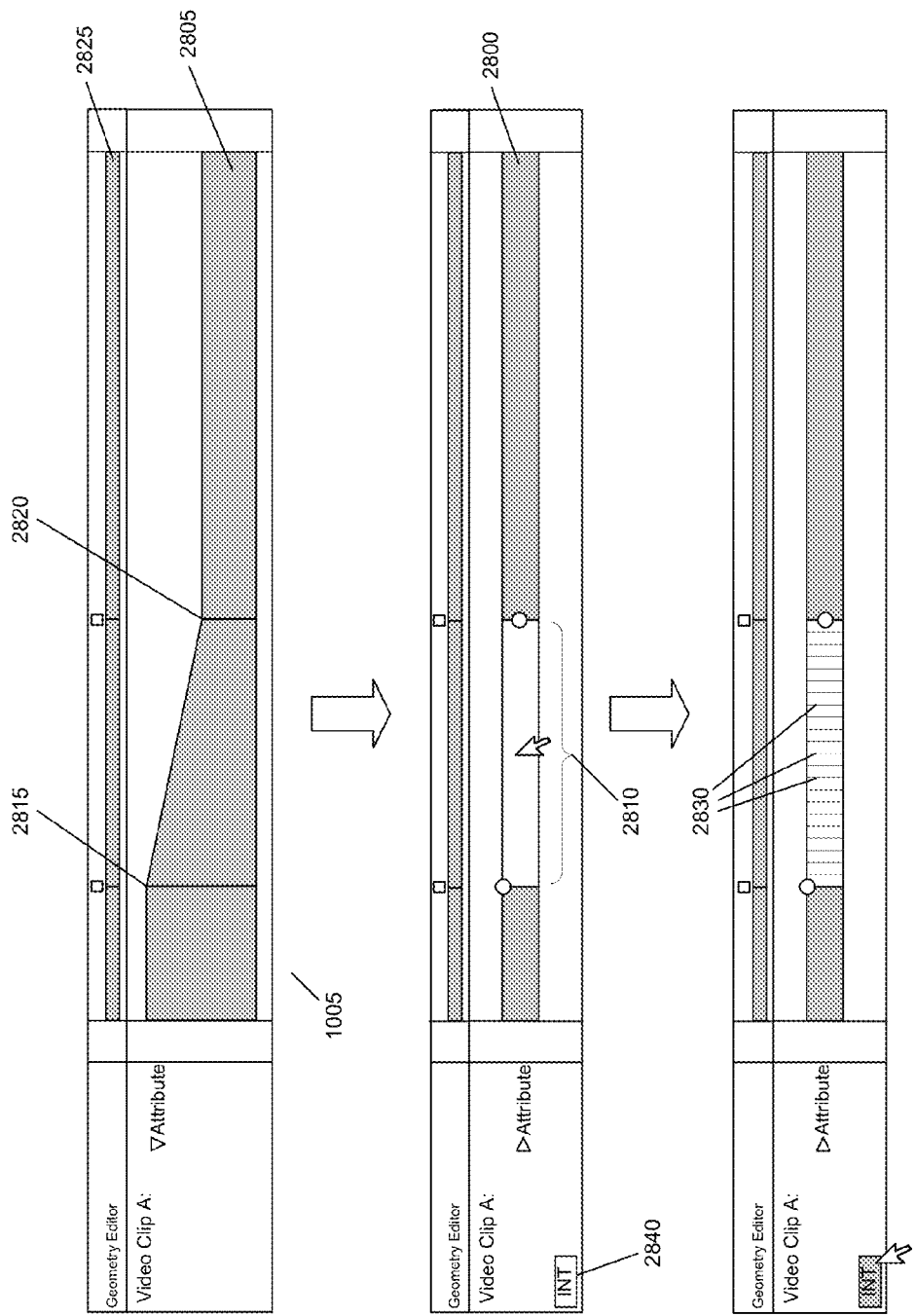
FIG. 28 illustrates interpolation mode editing for timing bars in some embodiments.

FIG. 28 illustrates a timing bar representation 2800 of a key-indexed graph 2805 with one segment 2810 selected for editing in interpolation mode. This figure includes a geometry editor widow 1005 for displaying a key-indexed graph representation 2805 or timing bar 2800, a global timing bar 2825, and an interpolation user interface (UI) item 2840. The interpolation UI item 2840 is a conceptual illustration of one or more UI items that allows the media editing application to enter a specific editing mode designed for affecting the transition of an attribute between two key indices. Different embodiments implement this UI differently. For instance, some embodiments implement it as an interpolation mode button, others as a interpolation mode command that can be selected in a pull-down or drop-down menu, and still others as a interpolation mode command that can be invoked through one or more keystroke operations.

Initially, FIG. 28 shows a key-indexed graph 2805 having two key indices 2815 and 2820. The graph 2805 is then collapsed into a timing bar 2800. Within the timing bar 2800, the segment 2810 defined by the key indices 2815 and 2820 is selected. Then, the interpolation mode UI item 2840 is selected as indicated by the shading of UI item 2840. Initiating interpolation mode editing does not need to be invoked after the selection of a particular segment. Starting the interpolation editing mode can be invoked by a user anytime before selection of a segment as the user can freely choose any desired segment to edit once interpolation editing has been activated.

After a particular segment has been selected for editing in interpolation mode, several vertical lines (i.e. interpolation marks) 2830 are displayed. These marks convey the speed or ease at which the attribute value is changing over the duration of the segment. Some embodiments represent a slow, gradual change in attribute value with larger spacing between lines and a fast, swift change in attribute value with smaller spacing between each vertical line. As illustrated in the figures of this section, other embodiments may represent the speed of change in an opposite way by displaying faster, swift change in attribute value with larger spacing between lines and a slow, gradual change in attribute value with smaller spacing between each vertical line. Editing the transition between key indices in interpolation mode will now be illustrated by reference to FIGS. 29-33 which show a progression of multiple interpolation mode edits and its corresponding effect on the key-indexed graph.

Figure 29:
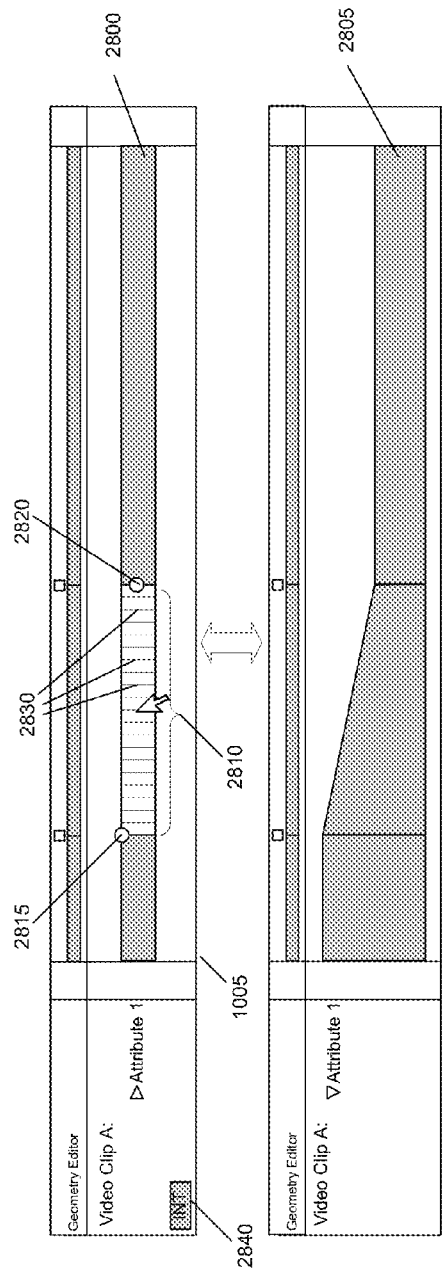
FIG. 29 illustrates interpolation marks for representing the interpolation between two key indices in some embodiments.

FIG. 29 shows the geometry editor window 1005 in interpolation mode, as indicated by the shaded interpolation UI item 2840, with the timing bar 2800 of FIG. 28 having segment 2810 selected. This figures, as well as each subsequent figures in this section, shows the timing bar 2800 expanded to illustrate the equivalent key-indexed graph 2805 and the modified transition between key indices 2815 and 2820. Here, the interpolation marks 2830 are evenly spaced representing a consistent change in attribute value, specifically a linear transition. The linear transition between key indices 2815 and 2820 is visually illustrated by the linear slope between the two key indices 2815 and 2820 in the key-indexed graph 2805.

Figure 30:
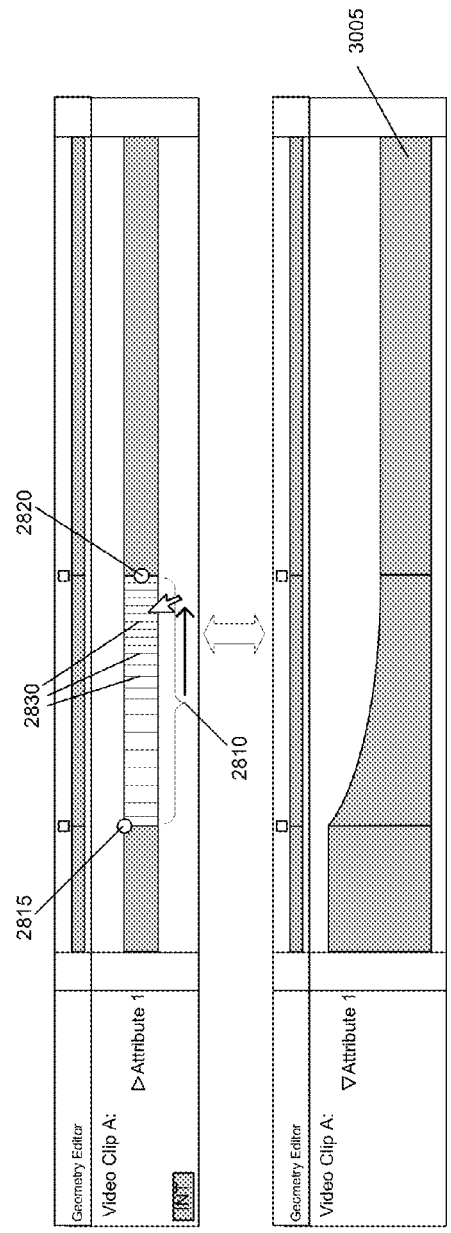
FIG. 30 illustrates modification of the interpolation between two key indices for a single attribute using interpolation marks on a timing bar for a single attribute in some embodiments.

FIG. 30 illustrates manipulation of the interpolation marks 2830 to create a non-linear transition between key indices 2815 and 2820. Here, the cursor has performed a click and drag movement within the segment 2810. Moving the cursor to the right squeezes the interpolation marks 2830 together, which, in this embodiment, represents a slower transition in the attribute value. In particular, the first edit illustrated in this figure represents an ease-out transition where the change in attribute value decreases in speed as it approaches the second key index 2820. The ease out transition between key indices 2815 and 2820 is visually illustrated in the key-indexed graph 3005.

Figure 31:
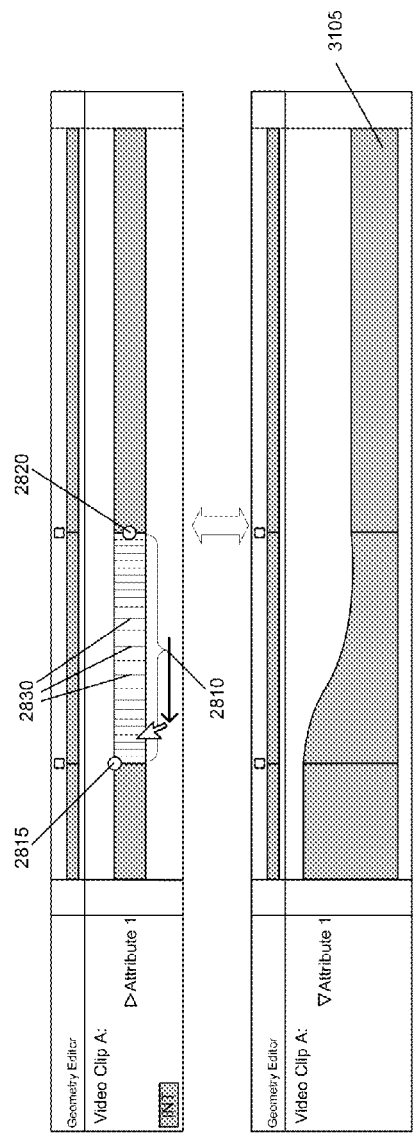
FIG. 31 illustrates further modification of the interpolation between two key indices using interpolation marks on a timing bar in some embodiments.

FIG. 31 continues from FIG. 30 and illustrates a second edit to the transition of the attribute between key indices 2815 and 2820. Here, the cursor has clicked the middle of the segment 2810 and dragged to the left creating an ease-in transition. This edit combines the ease-out transition from FIG. 30 with an ease-in transition to slow down the change in attribute values at the beginning and before the end of the transition over the duration of the segment 2810. The interpolation marks 2830 convey the ease-both transition by showing the marks squeezed together towards the beginning and end of the segment 2810. The ease-both transition between key indices 2815 and 2820 is visually illustrated in the key-indexed graph 3105.

Figure 32:
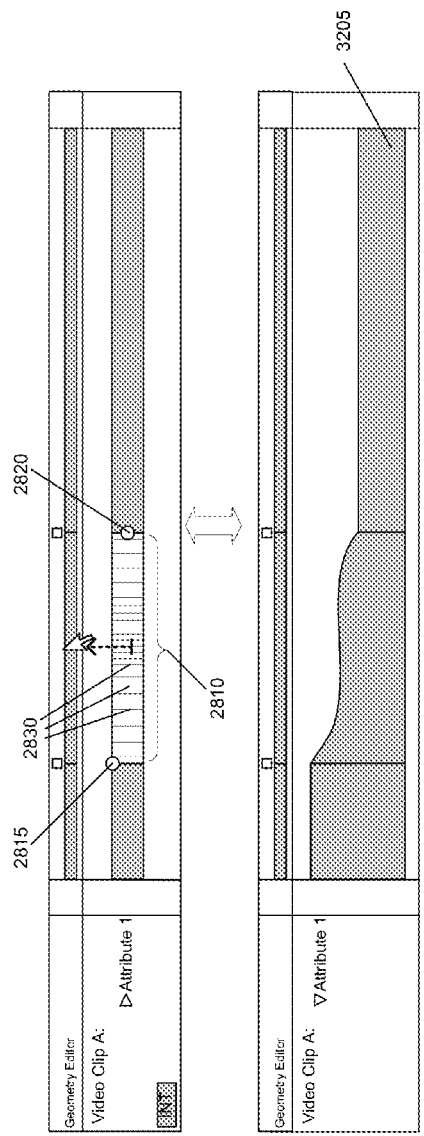
FIG. 32 illustrates accelerating and decelerating the interpolation between two key indices using interpolation marks on a timing bar in some embodiments.

FIG. 32 illustrates one further interpolation edit using interpolation marks. Here, the cursor has selected the middle of the segment 2810 and dragged the cursor up. An up and/or down cursor movement can accelerate and/or decelerate the speed of change in the attribute value. The operation illustrated here accelerates the transition at the beginning and towards the end of the segment 2810 while decelerating the change in value in the middle of the segment 2810. This is reflected by interpolation marks being closer together in the center and more spread apart towards each key index 2815 and 2820. The change in transition between key indices 2815 and 2820 is visually illustrated in the key-indexed graph 3205.

In FIGS. 29-32, the selected internal location of the segment 2810 was horizontally halfway in between key indices 2815 and 2820 and the ease of transition throughout the entire segment was modified equally. In some embodiments, the amount of modification to the transition is weighted depending on the location of the internal selection point on the segment. For instance, when the selection point is closer to a first key index than a second key index, the transition near the first key index will be modified by a greater amount than at the second key index.

Figure 33:
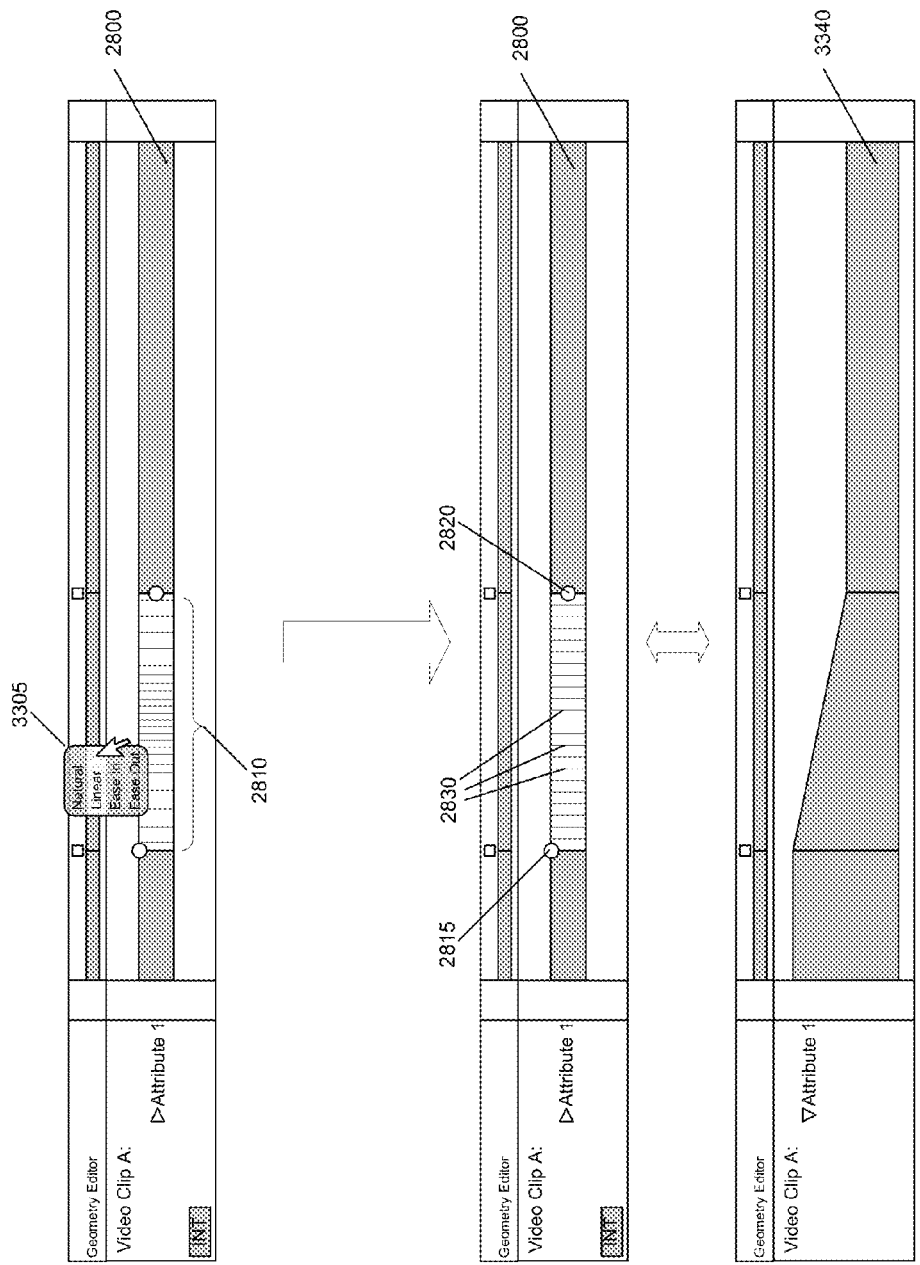
FIG. 33 illustrates application of a pre-set interpolation from a timing bar in some embodiments.

FIG. 33 illustrates the application of a pre-set transition from the timing bar 2800 in interpolation mode. Here, a user performs a control-click or right-click within the segment 2810 to reveal a context menu 3305 to display the different pre-set transitions available. In this example, a linear transition has been selected from the context menu 3305. Selection of a pre-set transition will replace all user edits in regards to the transition and instead use the pre-set transition selected. After selection of the linear transition, the interpolation marks 2830 become evenly spaced to represent the same linear progression within the segment 2810. The change in transition is visually illustrated in the key-indexed graph 3340 with a linear slope between key indices 2815 and 2820.

Figure 34:
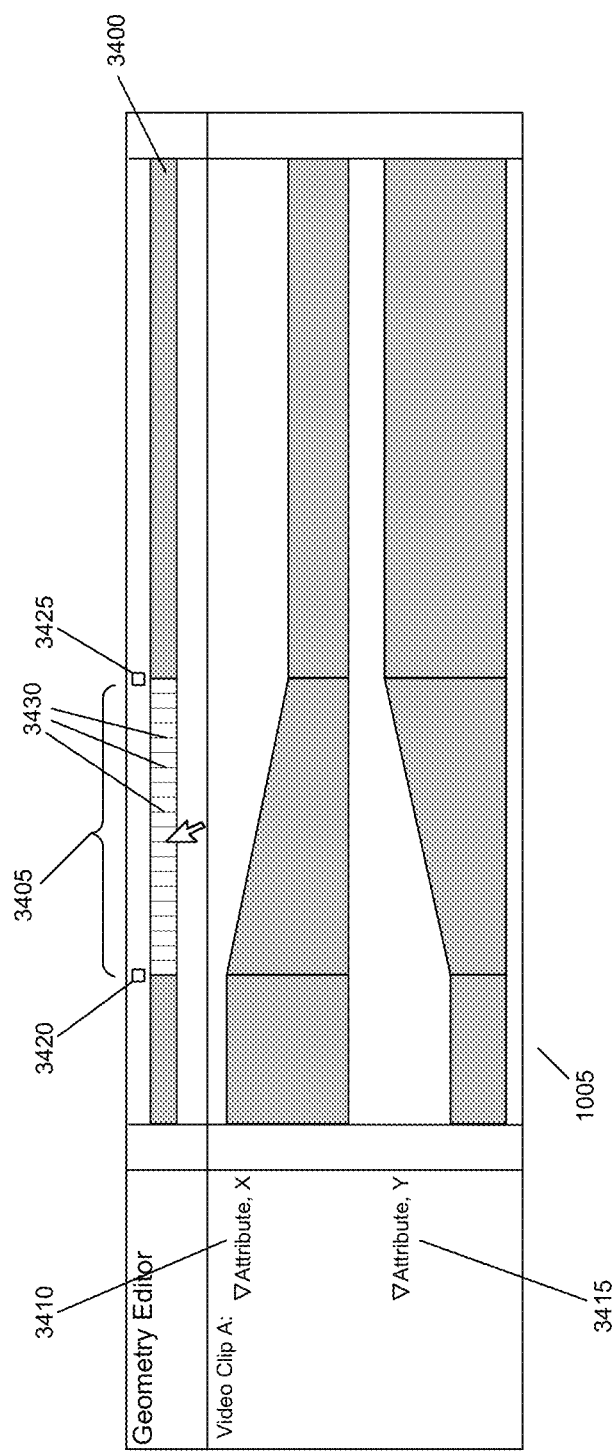
FIG. 34 illustrates interpolation mode editing from a global timing bar in some embodiments.
Figure 35:
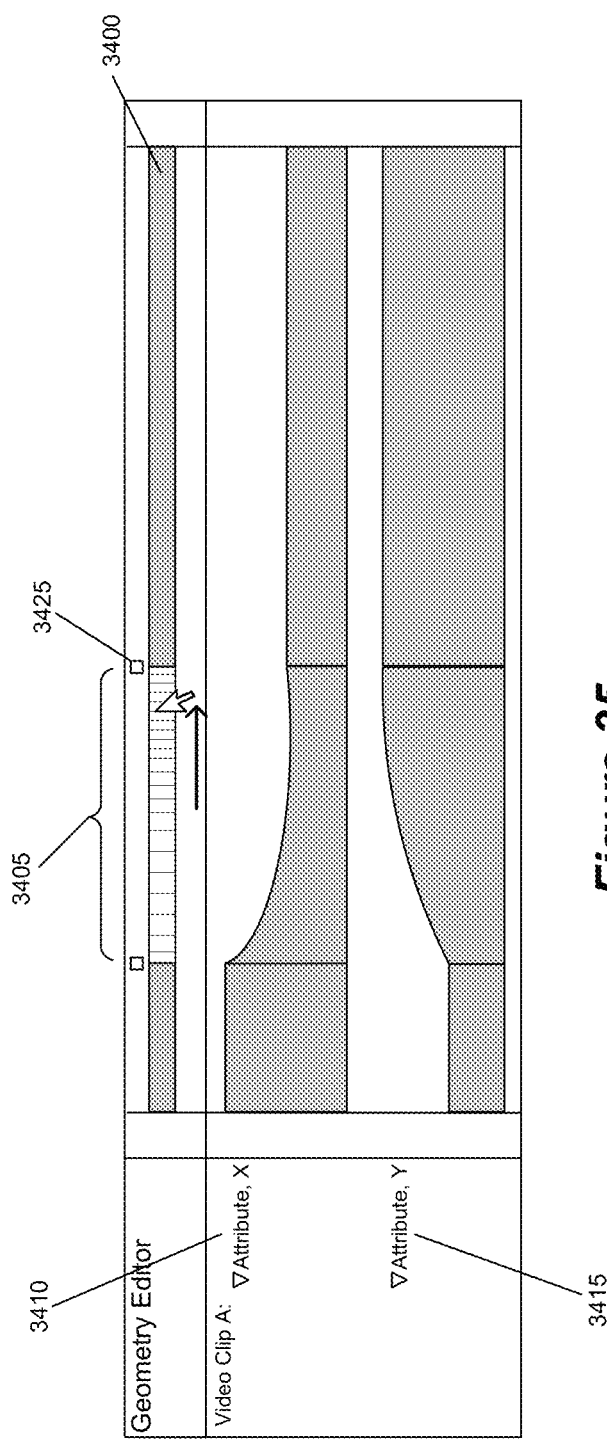
FIG. 35 illustrates modification of the interpolation between two key indices for multiple attributes using interpolation marks on a global timing bar in some embodiments.

Some embodiments allow editing the interpolation between two key indices for two or more attributes. Such an edit would take place within a multi-attribute timing bar or the global timing bar. An example of such an edit is illustrated in FIGS. 34 and 35. FIG. 34 illustrates segment 3405 on the global timing bar 3400 in interpolation mode. This could just as well be a multi-attribute timing bar in the geometry editing window where Attribute X 3410 and Attribute Y 3415 are grouped together. For simultaneous editing of a transition between two key indices of multiple attributes, it is essential that the attributes share common key indices so a transition can be applied uniformly over the shared duration. There is no need for the multiple attributes to share common attribute values since the transition only affects the speed of the transition between a starting and ending key index. Here, both attributes 3410 and 3415 share key indices 3420 and 3425, therefore the media editing application will allow a user to enter interpolation mode for that selected segment 3405 as illustrated by the interpolation marks 3430 in FIG. 34. As shown, both attributes 3410 and 3415 currently have a linear transition between the shared key indices 3420 and 3425.

FIG. 35 illustrates the same ease out modification of FIG. 30 applied from the global timing bar 3400 for two attributes 3410 and 3415. Here, the center of the segment 3405 is selected and dragged towards the ending key index 3425. As illustrated, the values for both attributes 3410 and 3415 change slower towards the ending key index as illustrated by the key-indexed graph.

Figure 36:
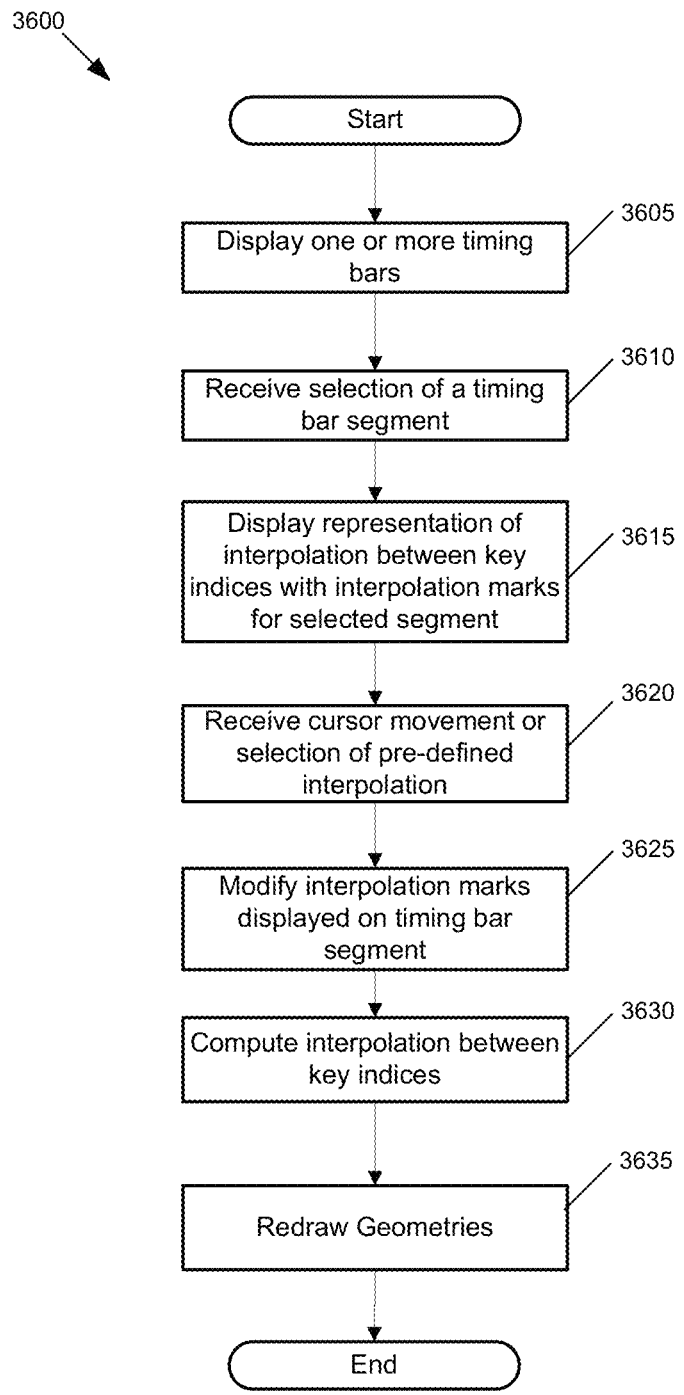
FIG. 36 illustrates a process for editing the interpolation between two key indices on a timing bar in an interpolation editing mode in some embodiments.

Having described editing the interpolation of an attribute between two key indices from a timing bar, FIG. 36 illustrates a process 3600 that some embodiments perform when modifying the interpolation between two key indices using interpolation marks on a timing bar. The specific operations of the process may not be performed in the exact order described. The specific operations may not be performed in one continuous series of operations. Different specific operations may be performed in different embodiments. Furthermore, the process could be implemented using several sub-processes, or as part of a larger macro-process. FIG. 36 will be described by reference to the examples that were described above in FIGS. 28-33. In some embodiments, the process of FIG. 36 starts after the interpolation mode editing has been enabled by a user.

In some embodiments, the process of FIG. 36 initially displays (at 3605) one or more timing bars in the media editing application. For example, in FIG. 28, the key-indexed graph 2805 is collapsed into a single attribute timing bar 2800 in the geometry editor window 1005.

Next, the selection of a segment of the timing bar is received (at 3610). A segment is defined by a starting and ending key index. As illustrated in FIG. 28, the selected segment 2810 is highlighted and defined by the starting key index 2815 and an ending key index 2820. After a segment has been selected, the process displays (at 3615) several vertical interpolation marks that span the selected segment of the timing bar. As illustrated in FIG. 28, the interpolation editing mode has not been enabled until after the selection of segment. The interpolation marks appear on the selected segment in interpolation editing mode, and it would be apparent to one skilled in the art that the enabling the interpolation editing mode can occur anytime before or after the selection of a desired segment.

Once a segment of the timing bar is displaying the interpolation marks, the process continues (at 3620) with the user manipulating the interpolation marks with click and drag cursor movements. Several different cursor movements within the segment 2810 were illustrated in FIGS. 29-32. For example, a user can click on any interior section of the segment and drag the cursor in any direction (i.e. up, down, left, or right). Furthermore, as illustrated in FIG. 33 a pre-set interpolation can also be applied in lieu of manually editing the interpolation marks.

Interacting with the interpolation marks 2830 in the process 3600 will modify (at 3625) the distance between each interpolation mark within the segment as illustrated in FIGS. 29-32. Applying a pre-set interpolation, as illustrated in FIG. 33, will similarly modify the distance between the interpolation marks. As previously described, the distance between each mark represents the speed at which the attribute value is changing over the duration. Accordingly, the process will compute (at 3630) the interpolation between the two key indices that define the segment with respect to the manipulation of the interpolation marks. After computing the interpolation, the process will (at 3635) redraw the key-indexed geometries for that particular segment to correspond with the computed interpolation.

Editing the interpolation between two key indices on a key-indexed graph was cumbersome before such an interpolation editing mode on a timing bar. Previously, a user created a curve, or interpolation, on the graph representing the value of an attribute through manipulation of key index control points to achieve a desired curve between two key indices. With interpolation mode editing on a collapsed representation of a key-indexed graph, a user can easily interact and receive visual feedback of the interpolation or curve between two key-indices without having to interact with an attribute graph. Accordingly, this novel feature allows greater ease when editing the interpolation between two key indices.

While all the examples described by reference to FIGS. 1-35 have illustrated editing key-indexed geometries, other permutations are possible. For instance, many collapsed geometric representations of key index geometries are describe by reference to single-attribute timing bars, multi-attribute timing bars, and global timing bars. However, for cases where the duration these bars span is defined over a frequency, similar bars would be characterized as frequency timing bars. Moreover, although the collapsed representations are shown as a bars, any type of collapsed representation that would provide similar features can be used. Thus, the scope of the invention should be analyzed by reference to the claims.

IV. Key-Index Editing from the Canvas

The previous sections illustrated examples of manipulating timing bars that represents one or more key-indexed graphs for the purpose of modifying attribute values of a media item over a duration. Another novel feature of the media-editing application allows modification of one or more attributes directly from the display area, or canvas, that is used to preview the composite presentation created in the media editing application. In some such embodiments, canvas editing operations allow a user to create a pre-defined transition over a pre-defined duration for one or more attributes without having to interact with attribute geometries in the geometry editor.

In some embodiments, the media editing application allows such canvas editing operation to be performed without interacting with the geometry editor by allowing the user to manipulate a particular frame of a media clip on the canvas. For instance, the particular frame displayed on the canvas is defined by the position of the playhead in time for the particular media clip. Attributes can be edited as desired, and a pre-defined transition is applied over a pre-defined duration to each attribute that was edited. The pre-defined duration can define two new key indices for the transition, one at the playhead and a second before the playhead according to the pre-defined duration for each edited attribute. Other embodiments allow the user to define the duration to begin at the closest exiting key index before the playhead. Other embodiments also allow for the second key index of the transition to be created after the playhead.

Figure 37:
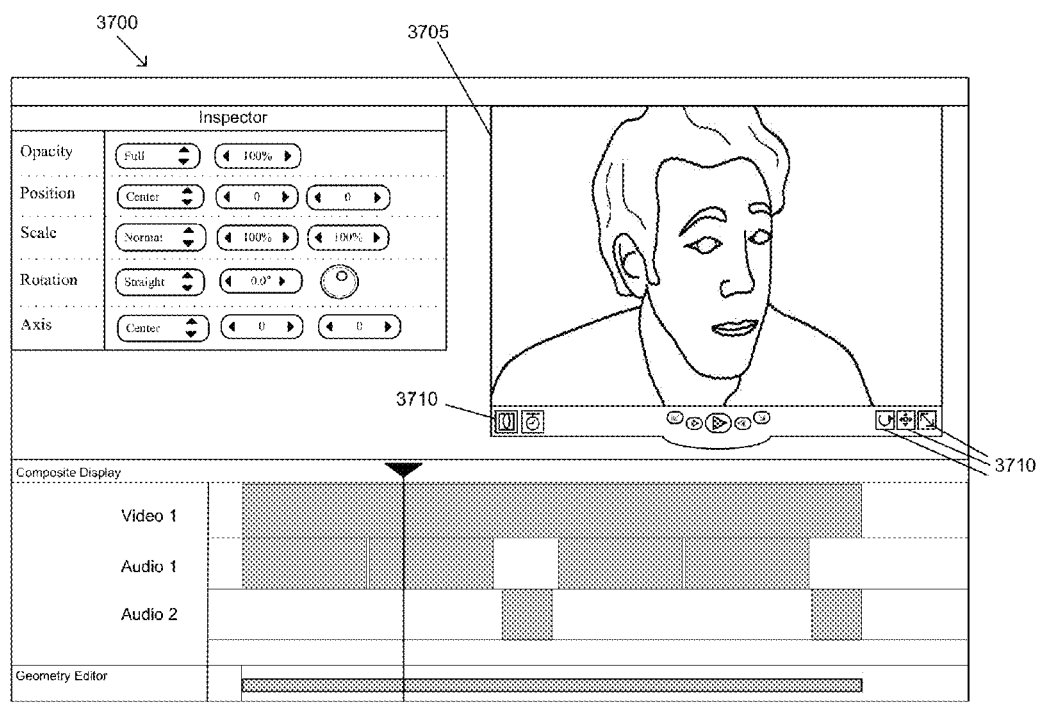
FIG. 37 illustrates a graphical user interface of a media editing application having tools on the canvas for editing attributes of media content in some embodiments.

FIG. 37 illustrates a media editing application 3700 that has a canvas 3705 on which a user can specify attribute modifications. This media editing application is identical to the media application of FIG. 9 with the exception of the several tools 3710 provided on the canvas 3705. Accordingly, similar reference numbers of are used to identify similar components of FIG. 9 that match components of FIG. 37. For purposes of brevity, these similar items will not be described here.

The canvas 3705 of the media editing application 3700 in FIG. 37 includes several user interface ("UI") tools 3710 that can be utilized to perform key-indexed editing operation for one or more attributes of a particular media clip displayed on the canvas 3705. These UI tools 3710 are conceptual illustrations of one or more UI items that allow the user of the media editing application to edit the media clip currently displayed on the canvas. Different embodiments implement these UI items differently. For instance, some embodiments implement the tools through UI buttons, others as a command that can be selected in a pull-down or drop-down menu, and still others as a command that can be invoked through one or more keystroke operations. Further embodiments can display editing tools directly on the canvas as graphical UI items for editing which will become apparent through the following figures.

Figure 38:
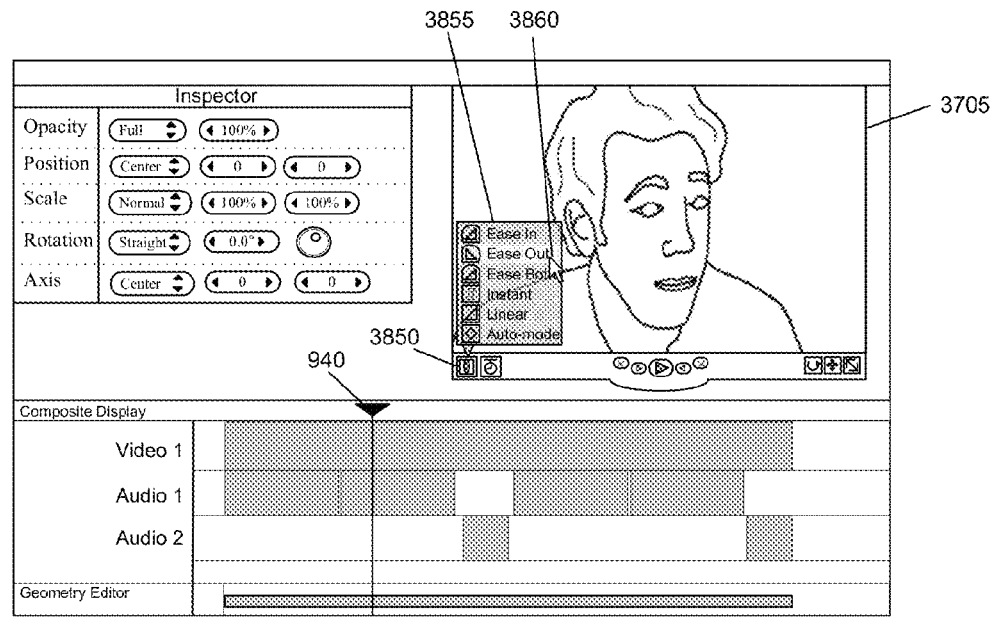
FIG. 38 illustrates the selection of a pre-set interpolation from a canvas in a media editing application in some embodiments.

To illustrate an example of the creation and manipulation of key indices for one of more attributes directly from the canvas 3705, FIGS. 38-45 illustrate eight different stages of a user's interaction with the GUI 3700, specifically the canvas 3705. FIG. 38 illustrates a first stage that is before the creation of any new key indices. Initially, the canvas 3705 displays the video frame of a media clip at the particular time defined by the position of the playhead 940. In this first stage, a pre-defined transition for applying to the attributes the user will be editing on the canvas 3705 has been selected. Here, the selection of the first UI item 3850 reveals a pop-up menu 3855. The pop-up menu displays multiple pre-defined transitions that a user can select. In this particular example, an ease out transition 3860 has been selected.

Figure 39:
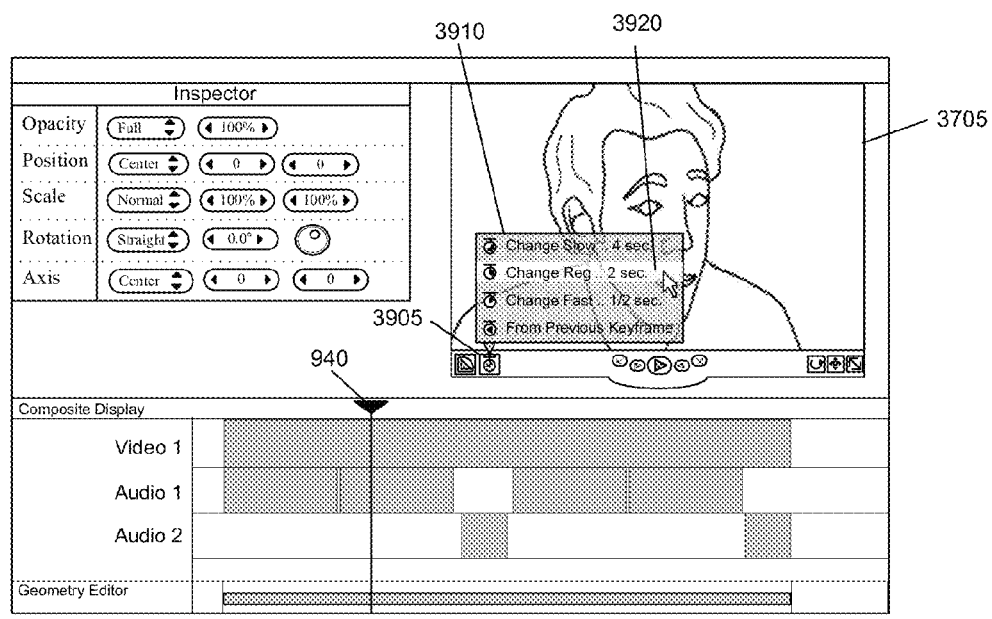
FIG. 39 illustrates the selection of a duration used to define the location of new key indices for one or more attributes in some embodiments.

FIG. 39 illustrates a second stage where the duration of the transition has been selected. In this stage, selection of a second UI item 3905 reveals another pop-up menu 3910 populated with pre-defined durations. Here, selection of item 3920 which provides a duration of two seconds for the transition is illustrated. Some embodiments allow a user to specify the exact duration of the transition, while others allow the duration to begin from the last key index up until the playhead 940. In this example, selection of a two second duration will be used to create two new key indices on each attribute geometry that will be manipulated from the canvas.

Figure 40:
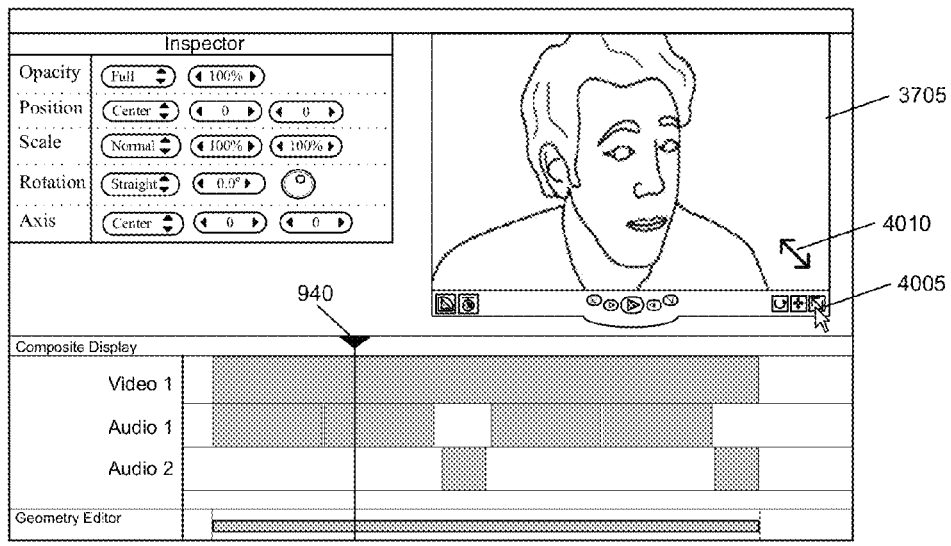
FIG. 40 illustrates the selection of a scale tool on a canvas in some embodiments.

FIG. 40 illustrates a third stage where the scale tool 4005 has been selected on the canvas 3705 for modifying the scale attribute of the particular media clip being displayed. This displays a graphic 4010 on the canvas 3705 which represents the particular edit operation that can be performed. Here, that arrow graphic 4010 is selectable for editing the scale attribute of the media clip at the particular frame. Some embodiments automatically provide multiple graphics on the canvas in an editing mode where each graphic represents a tool that is used for manipulating a particular attribute of the media clip (e.g. scale, position, rotation, opacity) rather than requiring a user input to display each tool on the canvas. Other modifiable attributes that are not as easily conveyed as graphical items on a canvas (e.g. pivot, shadows, shear) can be selected through a control-click which can display all the modifiable attributes of the media content displayed in a context menu in some embodiments.

Figure 41:
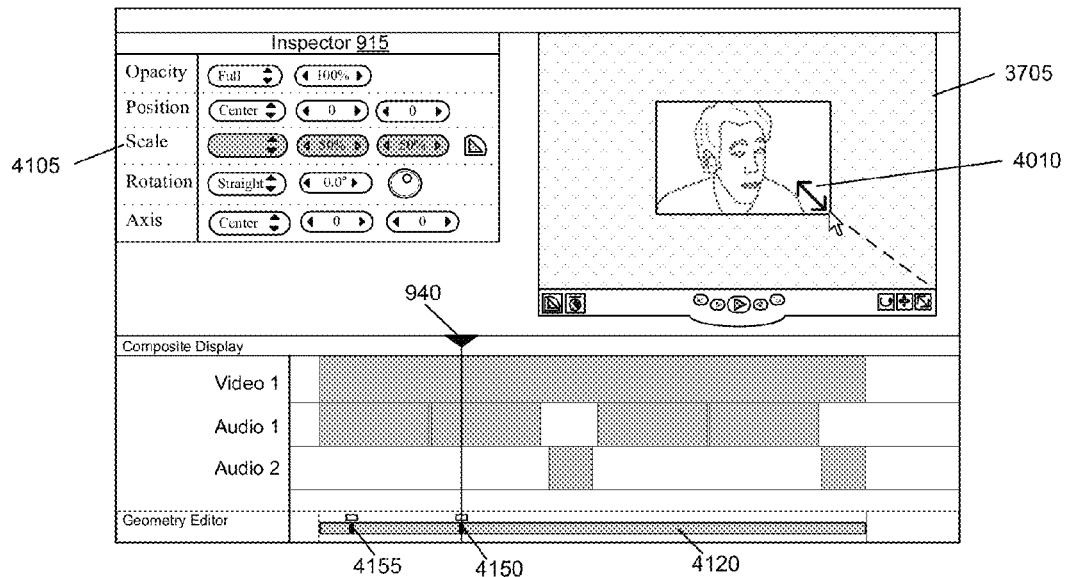
FIG. 41 illustrates modifying the scale attribute of a frame of media content on the canvas in some embodiments.

FIG. 41 illustrates a fourth stage where the scale graphic 4010 has been selected and dragged towards the middle of the canvas 3705. This causes the frame to be reduced in size in the x and y-direction. In response to this user edit, the attribute display window 915 reflects the changed attribute value at the playhead 940. In particular, the scale attribute 4105 reflects that the scale in both the x and y-direction has been reduced to 50%. As soon as a particular attribute is being edited on the canvas, a first key index 4150 is created at the playhead for the scale attribute. A second key index 4155 is created two seconds before the playhead to correspond with the pre-defined duration selected in the second stage as shown in FIG. 39. FIG. 41 displays these new key indices on the global timing bar 4120. Therefore, up to this point in the canvas edit operation, two new key indices 4150 and 4155 have been created for the first edited attribute and they key indices 4150 and 4155 are separated by two seconds with the second key index ending at the current playhead 940 location.

Figure 42:
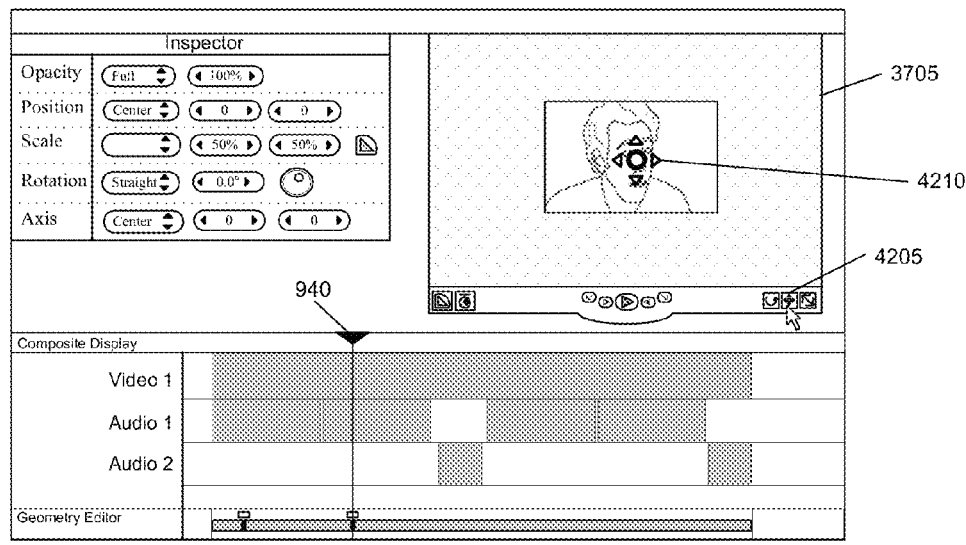
FIG. 42 illustrates the selection of a position tool on a canvas in some embodiments.

FIG. 42 illustrates a fifth stage where the position UI item 4205 has been selected on the canvas 3705 for modifying the position attribute for the particular media clip being displayed. This reveals a graphic 4210 on the canvas 3705 that represents a tool for manipulating the position of the current frame. Here, the graphic 4210 is selectable for dragging the scaled frame to a different position on the canvas.

Figure 43:
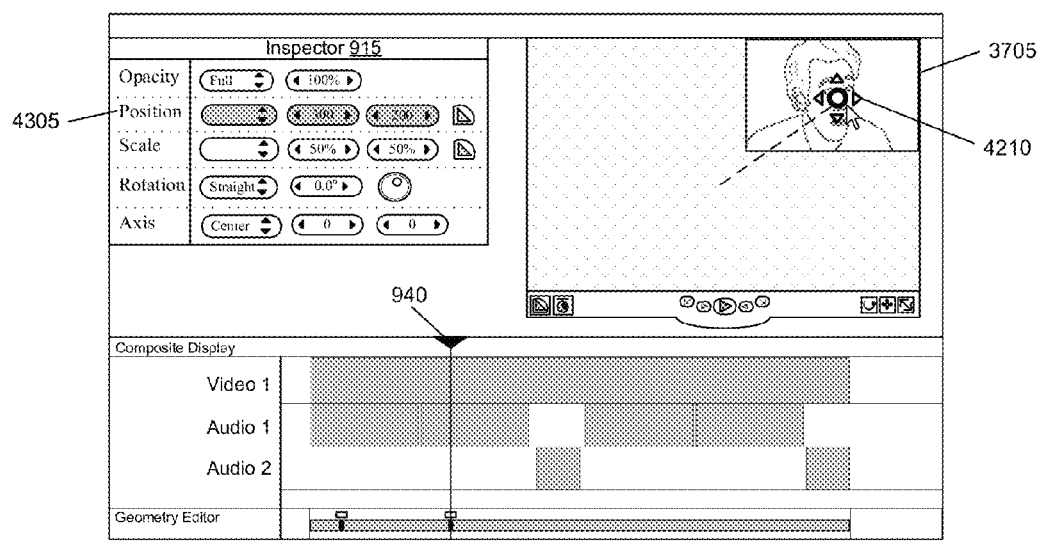
FIG. 43 illustrates modifying the position attribute of a frame of media content on the canvas in some embodiments.

FIG. 43 illustrates a sixth stage where the position graphic 4210 has been selected and dragged towards the top right corner of the canvas. In response to the relocation of the scaled frame, the attribute display window 915 reflects the changed position attribute 4305 at the playhead 940. Specifically, the position attribute has changed in the x-direction from 0 to 300 and the y-direction has changed from 0 to 200. Similar to FIG. 41, as soon as the position attribute is modified, two new key indices will be created on the corresponding key-indexed attribute geometry for position. This completes the particular edit operation being performed on the canvas. In particular, the edit performed has accomplished a picture-in-picture effect where the scale of the media clip been reduced by half and then positioned in the top right corner of the canvas. This transition happens over a period of two seconds and occurs faster at the beginning of the transition than the end as indicated by the ease out transition selected in the first stage of the canvas edit.

Figure 44:
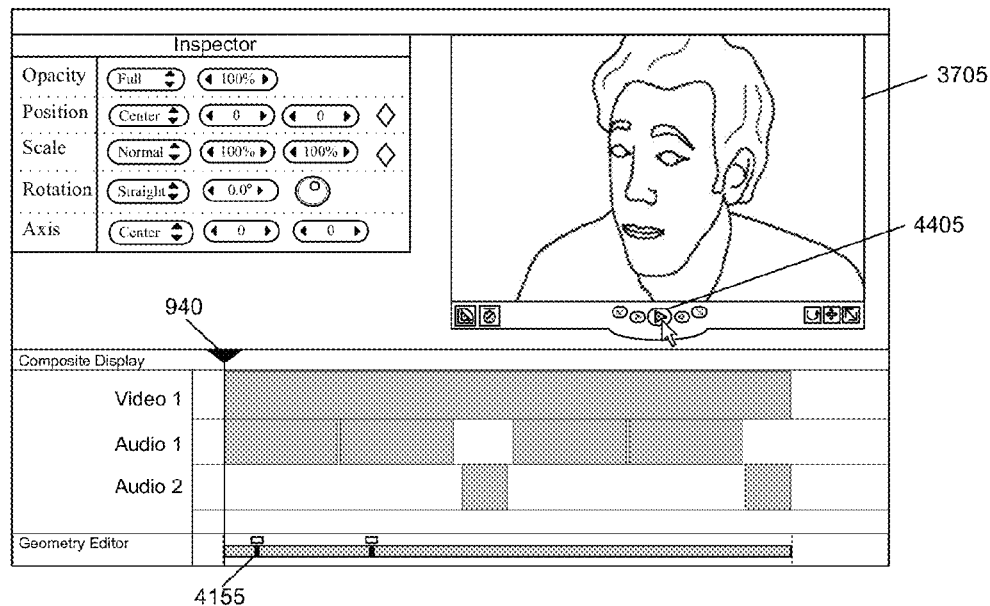
FIG. 44 illustrates the first frame of media content on the canvas at the starting point of the media content in some embodiments.
Figure 45:
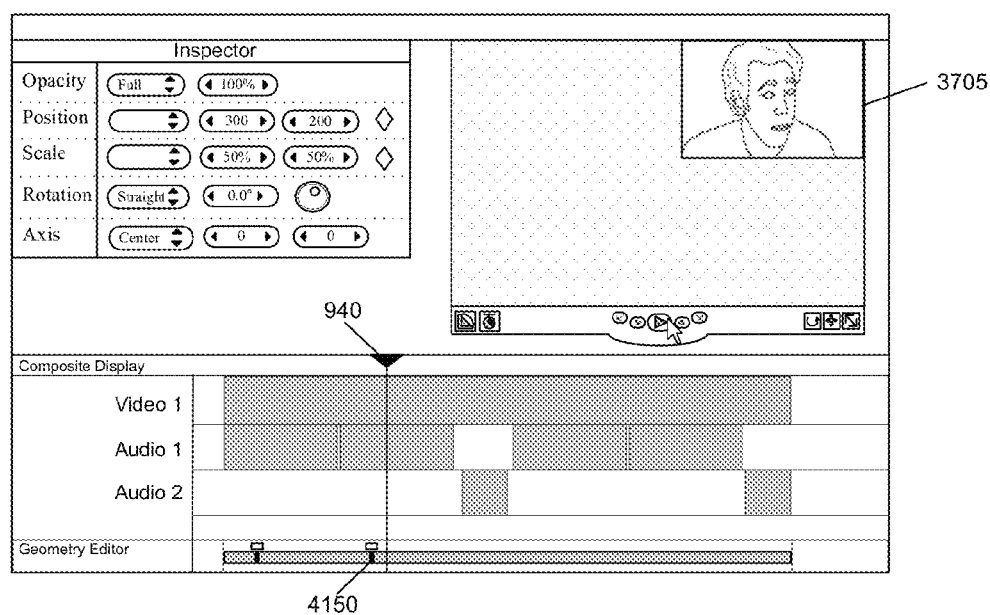
FIG. 45 illustrates a frame of media content after a transition that was created on the canvas in some embodiments.

FIGS. 44-45 illustrate the completed canvas edit and transition. FIG. 44 first shows the playhead 940 moved to the beginning of the timeline. In particular, the playhead 940 has been moved ahead of the key index 4155 that was created for each attribute, namely position and scale. The canvas displays the frame of the media clip at the playhead 940 which occupying the entire canvas 3705. The play button 4405 is selected to begin playing the media presentation created in the media editing application.

FIG. 45 then illustrates the playhead 940 past the second key index 4150. At this point in time, the media clip has been scaled down and moved to the corner of the screen in accordance with the canvas edits described in the previous figures. In summary, the canvas edits described have created two new key indices 4150 and 4155 for each attribute manipulated in the canvas edit, scale 4105 and position 4305, and created a transition between the key indices 4150 and 4155 for the changing attribute value over the pre-defined duration. Although only two key indices 4150 and 4155 are displayed on the global timing bar, in reality, eight new key indices have actually been created. Specifically, two key indices have been created for each edited attribute as illustrated by the attribute geometries shown in the FIGS. 46-47.

Figure 46:
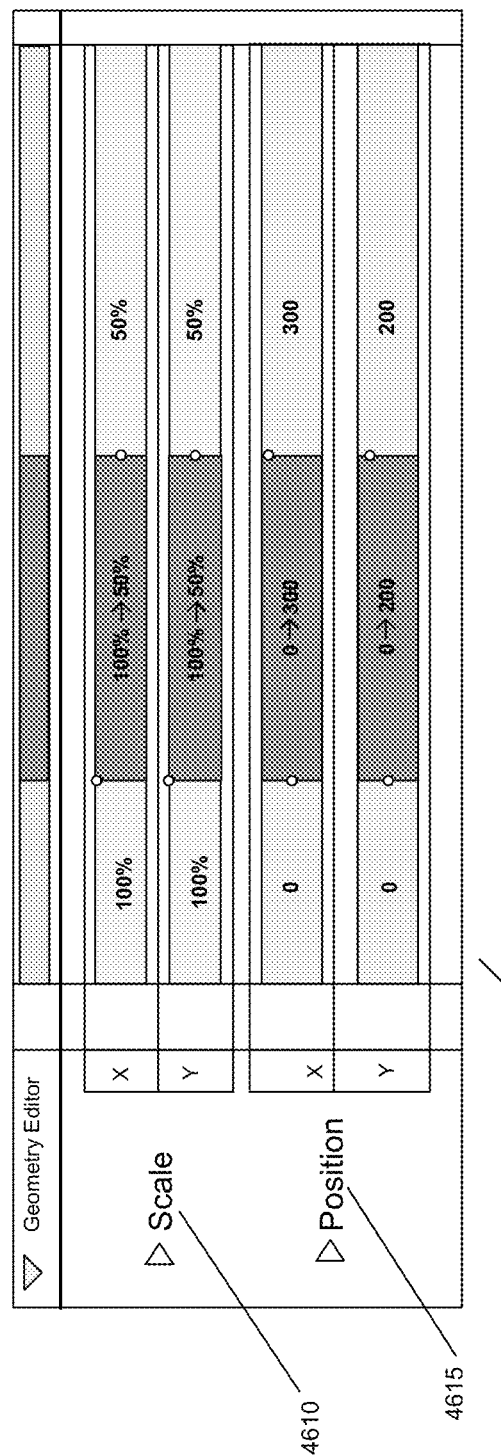
FIG. 46 illustrates the timing bars of each attribute that was modified from the canvas in some embodiments.
Figure 47:
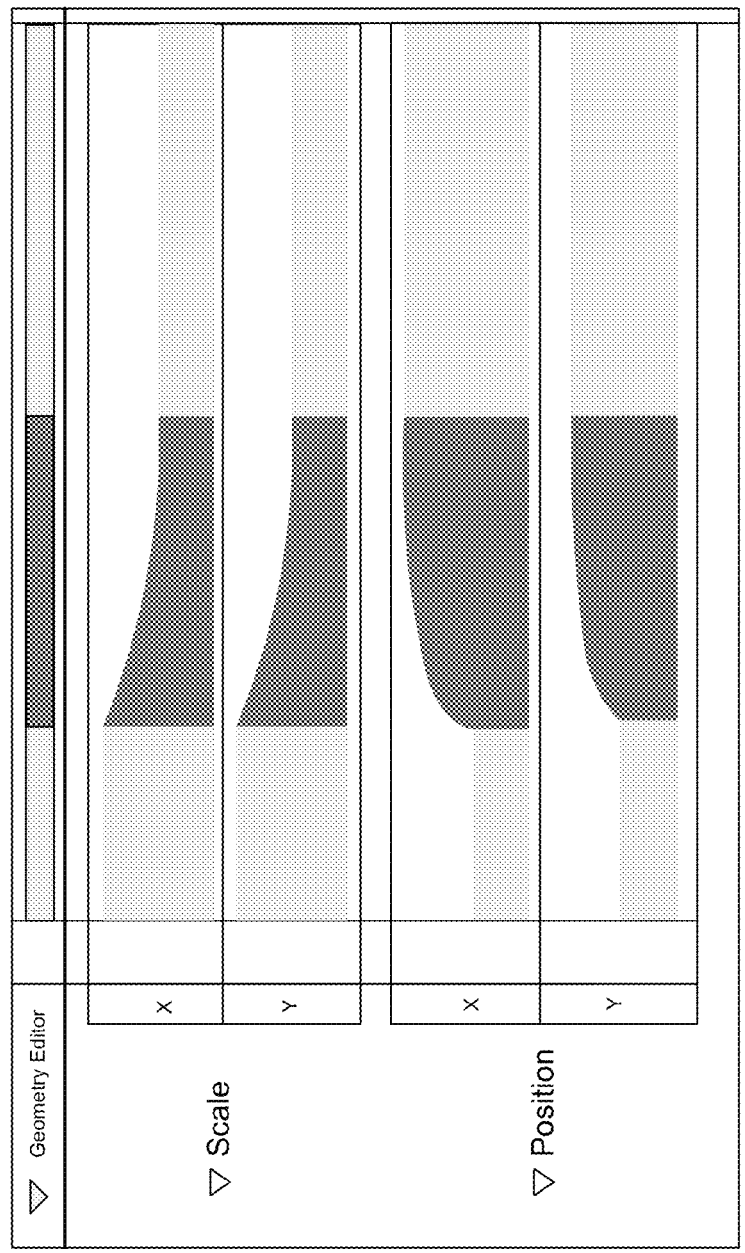
FIG. 47 illustrates the key-indexed graphs of each attribute that was modified from the canvas in some embodiments.

FIGS. 46-47 illustrate a geometry editor window 4600 that displays each attribute that was edited on the canvas in FIGS. 38-41. FIG. 46 illustrates four timing bars in the geometry editor window 4600. In particular, the scale attribute 4610 for the x and y-direction and the position attribute 4615 for the x and y-direction are all displayed. These timing bars represent the key indices that were created, the attribute values at those key indices, and the change in value of each attribute between the two key indices that were created on the canvas. FIG. 47 illustrates the same timing bars uncollapsed to reveal the graph shapes of each attribute.

Figure 48:
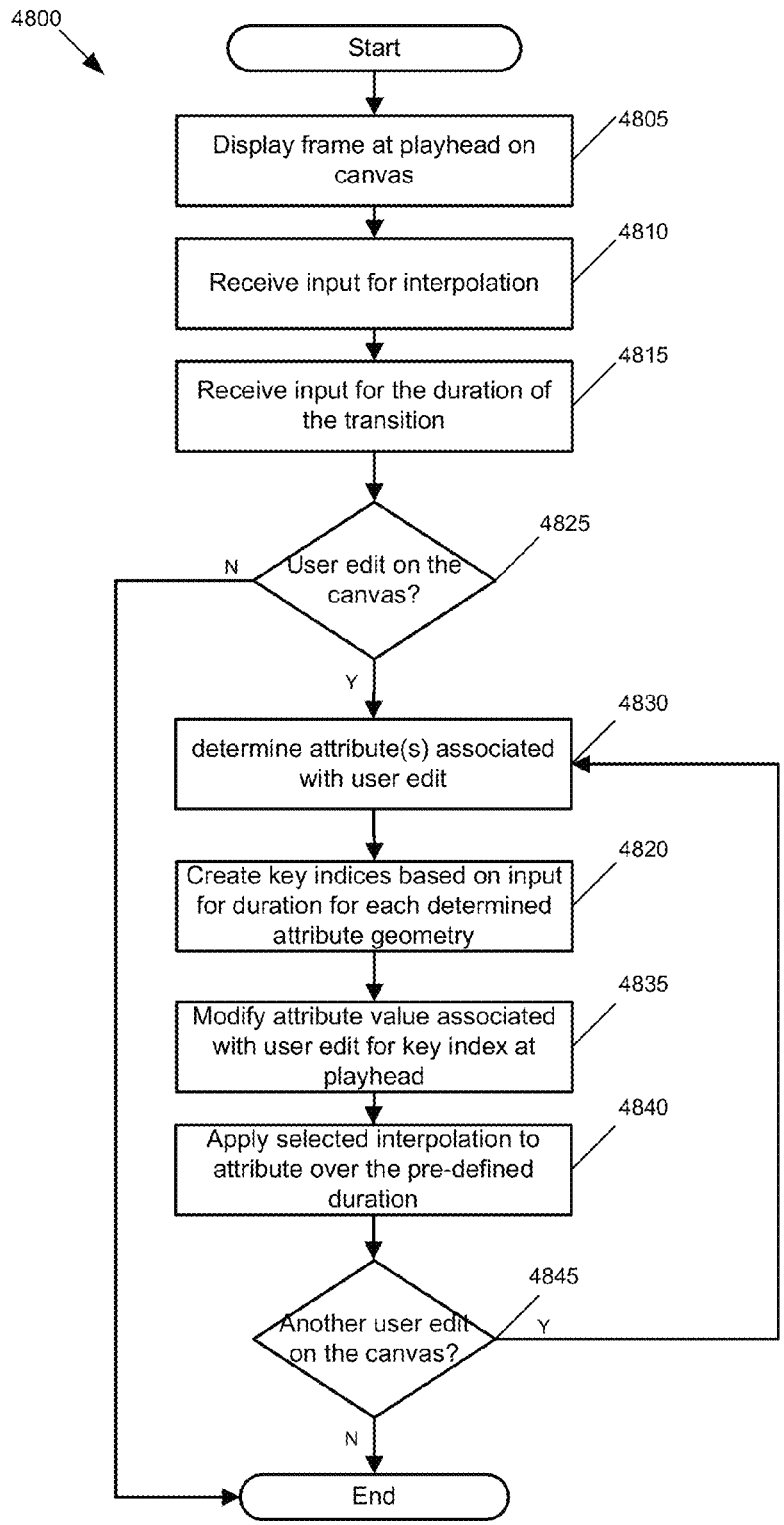
FIG. 48 illustrates a process for editing the value of one or more attributes on the canvas of a media editing application in some embodiments.

FIG. 48 illustrates a conceptual process 4800 that some embodiments perform when editing one or more attributes directly from the canvas of a media editing application. This process will be described with reference to FIGS. 38-47. The specific operations of the process may not be performed in the exact order described. The specific operations may not be performed in one continuous series of operations. Different specific operations may be performed in different embodiments. Furthermore, the process could be implemented using several sub-processes, or as part of a larger macro-process. As shown in FIG. 48, the process initially provides (at 4805) a canvas displaying a frame of a media clip. The position of the playhead determines the frame that is displayed. Specifically, it is the frame of the media clip that would be displayed at a particular point (i.e. the location of the playhead) in the duration of the media clip. FIG. 38 illustrates the playhead 940 over a media clip, and displays the current frame at that particular point in time.

Next, the process receives an input (at 4810) for a desired interpolation that will be applied to the canvas edits which will be made later in the process. FIG. 38 illustrates this input being made from a UI tool on the canvas 3705. Here, the transition is specified to be an ease out transition 3860. The process then receives a second input (at 4815) which calls out the duration of the transition. As illustrated in FIG. 39, a duration of two seconds for the transition has been selected from the canvas 3705.

Next, the process determines (at 4825) if there has been a user edit on the canvas 3705. If a user edit has been made on the canvas, the process determines (at 4830) the particular attribute that has been manipulated. As illustrated in FIG. 40-41, the scale attribute of the media clip has been modified at the playhead 940.

When a particular attribute is edited, the process then creates (at 4820) new key indices in accordance with the duration input. As illustrated in FIG. 39, the playhead represents the end of the duration defined by the user input at 4815. Therefore, the ending key index 4150 is created at the playhead 940. Accordingly, the starting key index 4155 is created before the playhead 940 according to the duration specified by the input at 4815. Here, the duration was selected to last two seconds, therefore the first key index 4155 is created two second before the playhead 940.

Then the process will modify the value of the attribute being edited at the playhead location, i.e. key index 4150. As shown in FIG. 41, the scale tool is used on the canvas 3705 to adjust the size of the frame displayed from 100% to 50% as illustrated in the attribute display window 915. Once the edit is complete, the process applies (at 4840) the selected interpolation between the two key indices 4150 and 4155 that were defined at 4820.

The process then determines (at 4845) if another user edit for a second attribute has been performed on the canvas and repeats steps 4830-4845 for each particular attribute being edited. As illustrated in FIG. 42-43, a second edit on the canvas, specifically the position of the frame at the playhead 940 is modified. As shown in FIG. 42, the position tool 4205 and 4210 is selected on the canvas 3705 to adjust the location of the scaled down frame. Specifically, FIG. 43 shows the position in the x-direction is changed from 0 to 300 and the position in the y-direction is changed from 0 to 200. Once the edit is complete, the process applies (at 4840) the selected interpolation identified (at 4810) once again to the attribute transition between the two key indices 4150 and 4155. Although the interpolation is not visually illustrated in the GUI, the timing bar representation in FIG. 46 and key-indexed graphs in FIG. 47 illustrate all the attributes that were affected by the canvas edit.

It is also apparent to one skill in the art, that the steps described may be performed in different sequences to achieve the same result. For instance, the canvas edits of one or more attributes can be performed before an input for the duration and interpolation are received. The selection of duration and interpolation can also be made in any order. If an interpolation is not selected, the media editing application can specify the transition (e.g. linear) for speed at which the attribute value changes over the duration identified. Another process of some embodiments for manipulating key-indexed attribute geometries from a canvas is described by reference to FIG. 49.

Figure 49:
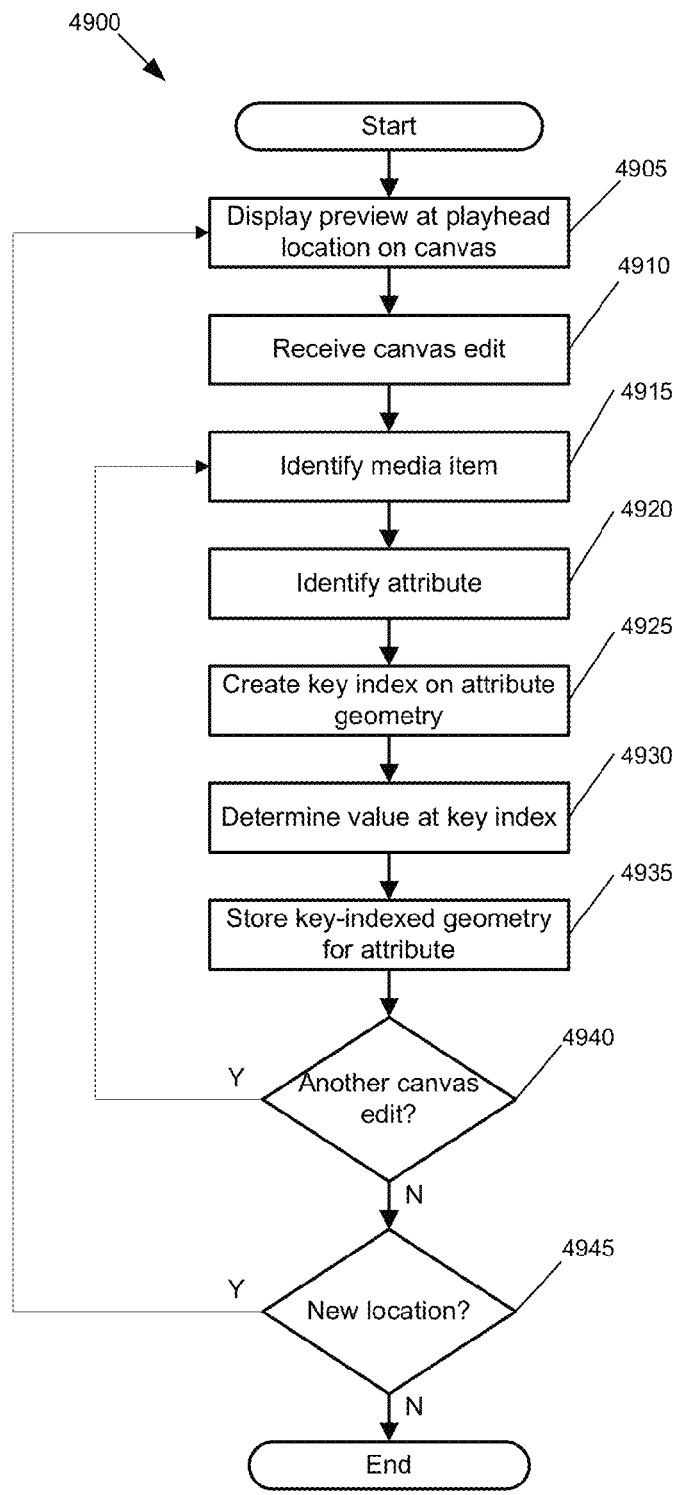
FIG. 49 illustrates a process for creating key indices on attribute geometries from the canvas of a media editing application in some embodiments.

FIG. 49 illustrates a conceptual process 4900 that some embodiments perform when editing one or more attributes directly from the canvas of a media editing application. The specific operations of the process may not be performed in the exact order described. The specific operations may not be performed in one continuous series of operations. Different specific operations may be performed in different embodiments. Furthermore, the process could be implemented using several sub-processes, or as part of a larger macro-process. As shown, the process first displays (at 4905) on the canvas a preview of the media content at the location of the playhead. Then the process receives (at 4910) an edit operation from the canvas. The edit operations can be performed using one or more of the several edit tools described in FIGS. 40-43. In some embodiments, the tools can be invoked through UI items, graphical representations of the tools on the canvas, or context menus.

Next, the process identifies (at 4915) the particular media item of the composite presentation that has been edited at 4910. Then the process (at F28) identifies the particular attribute of the media item that has been manipulated during the canvas edit.

After determining the media item and associated attribute that was manipulated, the process (at 4925) creates a key index on the identified attribute geometry. Attributes of a media item each have an associated geometry for displaying the value of that attribute over a duration. In some embodiments, this geometry may be displayed in a geometry editor window while as an edit is made from the canvas. Other embodiments might only display a global timing bar and make edits to the geometries in the background. Once the key index is created on the geometry, the process determines (at 4930) the new value of the attribute as defined by the canvas edit. Then the process (at 4935) stores the new key index and value for the attribute. If another canvas edit is made, the process (at 4940) returns to 4915 and repeats the steps described. If the playhead is moved to a new location for further canvas editing, the process (at 4945) returns to 4905.

The figures and processes discussed above represent an alternative method of editing multiple attribute and key indices without the use of the geometry editor. This embodiment allows a user to quickly and visually make edits to one or more attributes directly on the canvas opposed to manipulating the attributes through the use key-indexed geometries. It would also be apparent to one skilled in the art that the canvas edits described can be applied in any order to achieve the same results.

V. Overall Software Architecture

A. Software Architecture of an Application

Figure 50:
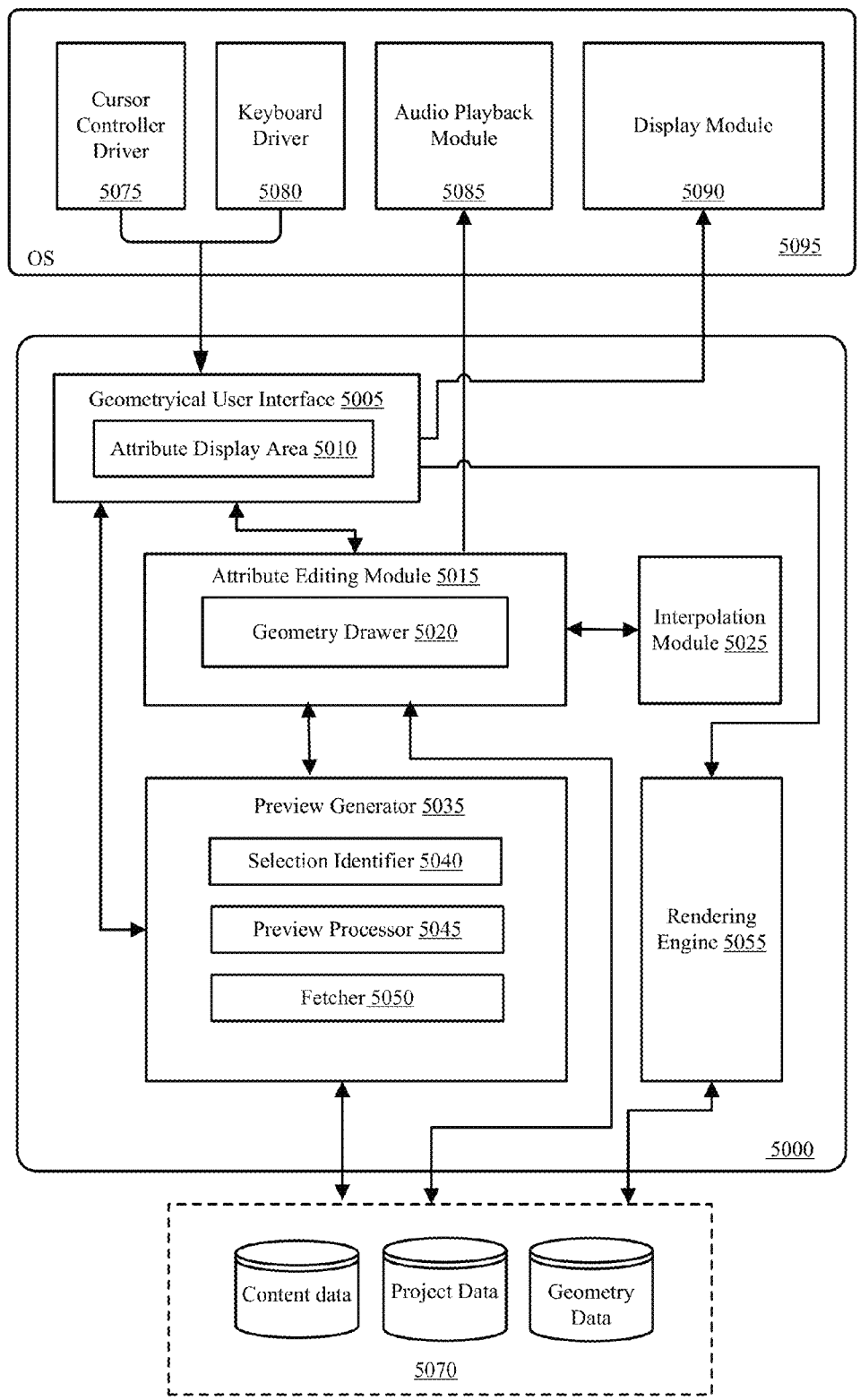
FIG. 50 conceptually illustrates the software architecture of an application of some embodiments.

In some embodiments, the above-described operations and user-interface tools are implemented as software running on a particular machine, such as a desktop computer, laptop, or handheld device, (or stored in a computer readable medium). FIG. 50 conceptually illustrates the software architecture of an application 5000 in accordance with some embodiments. In some embodiments, the application is a stand-alone application or is integrated into another application (for instance, application 5000 might be a portion of a media editing application), while in other embodiments the application might be implemented within an operating system. Furthermore, in some embodiments, the application is provided as part of a server-based (e.g., web-based) solution. In some such embodiments, the application is provided via a thin client. That is, the application runs on a server while a user interacts with the application via a separate client machine remote from the server (e.g., via a browser on the client machine). In other such embodiments, the application is provided via a thick client. That is, the application is distributed from the server to the client machine and runs on the client machine. In still other embodiments, the components (e.g., engines, modules) illustrated in FIG. 50 are split among multiple applications. For instance, in some embodiments, one application defines one or more key-indexed geometries to use in creating the media presentation, while another application performs composing and rendering of the media presentation based on the key-indexed geometries.

As shown in FIG. 50, the application 5000 includes a graphical user interface 5005, attribute editing module 5015, interpolation module 5025, preview generator 5035, and rendering engine 5055. The graphical user interface 5005 provides user-interface tools (e.g., display areas, user-interface controls, user-selectable graph elements, etc.) that a user of the media editing application 5000 interacts with in order to create a media presentation. In some embodiments, the graphical user interface includes an attribute display area 5010 that displays one or more key-indexed geometries that can be modified by the user according to one or more of the novel editing operations described above. When the attribute display area 5010 displays a key-indexed geometry, some embodiments define the key-indexed geometries as selectable and modifiable elements (i.e., as items that can be selected and modified by the user).

As shown in FIG. 50, to facilitate attribute editing and displaying operations, the media editing application 5000 includes the attribute editing module 5015. In some embodiments, when the user inputs instructions to modify a particular key-indexed geometry through one of the user-interface tools, the attribute editing module 5015 receives and processes these instructions in order to modify and redraw the geometry in the graphical user interface 5005. As shown in FIG. 50, the attribute editing module 5015 in some embodiments includes a geometry drawer 5020 for drawing and/or redrawing one or more of the key-indexed geometries in the graphical user interface 5005.

To draw the key-indexed geometry, the geometry drawer 5020 in some embodiments receives attributes values from the interpolation module 5025. This interpolation module 5025 in some embodiments is a module in the media editing application 5000 that receives the user modifications to one or more of the key-indexed geometries (e.g., attribute values at key indices, interpolation between the key indices) and performs data interpolation. For instance, in some such embodiments, the interpolation module receives a first attribute value at one key index and a second attribute value at a subsequent key index and fills in (i.e., interpolates) the attribute values between the two key indices in accordance with the interpolation that is defined between the two key indices.

The preview generator 5035 in some embodiments generates a preview (e.g., real-time preview) of the media presentation that is being created by the media editing application 5000. The preview generator generates the preview by incorporating one or more media clips into the preview with the attribute values defined by one or more of the key-indexed geometries in some embodiments.

As shown in FIG. 50, the preview generator 5035 of some embodiments includes a preview processor 5045 that may be used to communicate with the attribute editing module 5015, and sends and receives data (e.g., project data) to and from the graphical user interface 5005 and/or the set of data storages 5070. In addition, the preview processor 5045 may send and receive data to and from a section identifier 5040 and/or a fetcher 5050. In some embodiments, the preview processor 5045 sends timeline data to the section identifier 5040 that generates an appropriate set of data (e.g., a segment table) needed to generate the preview. In some embodiments, the preview processor 5045 supplies the set of data generated by the section identifier 5040 to the fetcher 5050. The fetcher 5050 of some embodiments retrieves content data (e.g., video frame data, audio sample data) from the set of data storages 5070 based on the set of data provided by the preview processor 5045. The preview generator 5035 in some embodiments receives and uses the content data in order to generate the preview.

The rendering engine 5055 enables the storage or output of audio and video from the media editing application 5000. For example, the rendering engine 5055 may use attribute values associated with one or more attributes of a media clip to render the media clip for display and/or storage. In some embodiments, the rendering engine 5055 may receive attribute data from the preview generator 5035 in order to generate a preview. In some embodiments, data from the rendering engine 5055 (e.g., audio and video data of a video scene, preview data, etc.) is passed to the graphical user interface 5005 and/or an audio playback module 5085.

The operating system 5095 of some embodiments includes a cursor controller driver 5075 for allowing the application 5000 to receive data from a cursor control device, a keyboard driver 5080 for allowing the application to receive data from a keyboard, the audio playback module 5085 for processing audio data that will be supplied to an audio device (e.g., a soundcard and speakers), and a display module 5095 for processing video data that will be supplied to a display device (e.g., a monitor).

An example operation of the media editing application 5000 will now be described by reference to the components (e.g., engines, modules) illustrated in FIG. 50. A user interacts with user-interface tools (e.g., graphs, shapes defined by the graphs, timing bars, user-selectable controls, display areas) in the graphical user interface 5005 of the media editing application via input devices such as a cursor controller (e.g., a mouse, touchpad, touch screen, etc.) and keyboard (e.g., physical keyboard, virtual keyboard).

When the user interacts with one or more user-selectable elements of key-indexed geometry and/or other geometry modifying items (e.g., controls, menu items) in the graphical user interface 5005, some embodiments translate the user interaction into input data and send this data to the attribute editing module 5015. As mentioned above, the attribute editing module 5015 in some embodiments receives the input data and processes the input data in order to modify one or more of the key-indexed geometries. For example, when the attribute editing module receives instructions for creating a key index on a key-index geometry that is associated with an attribute of a media clip, the attribute editing module 5015 processes the input data (e.g., by identifying the location and attribute value) and creates the key index.

When a user input results in a need to modify the interpolation between two or more key indices in a particular key-indexed geometry, the editing module 5015 sends the input data to the interpolation module. The interpolation module 5025 receives the input data (e.g., attribute value at key indices, interpolation between the key indices) from the editing module 5015 and performs data interpolation. For instance, in some such embodiments, the interpolation module receives a first attribute value at one key index and a second attribute value at a subsequent key index and fills in (i.e., interpolates) the attribute values between the two key indices in accordance with the interpolation that is defined between the two key indices (e.g., straight line, parameterizable curve, etc.). In some embodiments, the editing modules 5015 receives the attribute values from the interpolation module 5055 and stores the attribute values in memory (e.g., the set of storage 5070). The geometry drawer in some embodiments uses these attribute values to generate a display of the particular key-index geometry.

In some embodiments, the attribute values that are stored in memory are used by preview generator 5035 in order to generate a preview of the media presentation. As mentioned above, the rendering engine may work in conjunction with the preview generator in order to render the preview for display and/or storage. Alternatively, the rendering engine may work separately from the preview generator in order to render the media presentation for display and/or storage.

B. Process for Defining an Application

Figure 51:
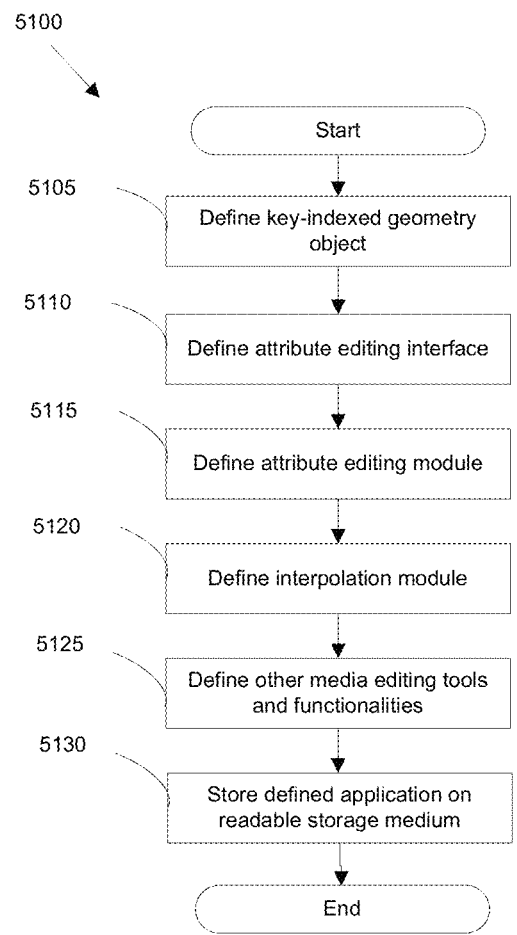
FIG. 51 conceptually illustrates a process of some embodiments for defining an application.

The section above described and illustrated the software architecture of an application in accordance with some embodiments. FIG. 51 conceptually illustrates a process 5100 of some embodiments for defining an application, such as application 5000. As shown, process 5100 begins by defining (at 5105) or more key-indexed geometry objects. In some embodiments, the key-indexed geometry object includes attributes (e.g., color of a shape, thickness of a graph line) and/or methods that perform a particular function (e.g., change color of the shape, modify the graph).

Process 5100 then defines (at 5110) an attribute editing interface. The attribute display area 5010 is an example of such a module. Next, the process defines (at 5115) an attribute editing module. As mentioned above, the attribute editing module, in some embodiments, receives the instructions from the media editing module and processes the instructions to modify one or more of key-indexed geometries.

The process next defines (at 5120) an interpolation module. The interpolation module 5025 is an example of such a module. Process 5100 next defines (at 5125) other media editing tools and functionalities. After 5125, the application is defined. Accordingly, at 5130, the process 5100 stores a representation of the application in a readable storage medium. The readable storage medium may be a disk (e.g., CD, DVD, hard disk, etc.) or a solid-state storage device (e.g., flash memory) in some embodiments. One of ordinary skill in the art will recognize that the various modules and UI items defined by process 5100 are not exhaustive of the modules and UI items that could be defined and stored on a computer readable storage medium for an editing application incorporating some embodiments of the invention.

VI. Computer System

Many of the above-described processes, modules, and interfaces are implemented as software processes that are specified as a set of instructions recorded on a computer readable storage medium (also referred to as "computer readable medium", "readable storage medium", or "machine readable medium"). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" can include firmware residing in read-only memory or applications stored in magnetic storage which can be read into memory for processing by a processor. Also, in some embodiments, multiple software inventions can be implemented as subparts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 52:
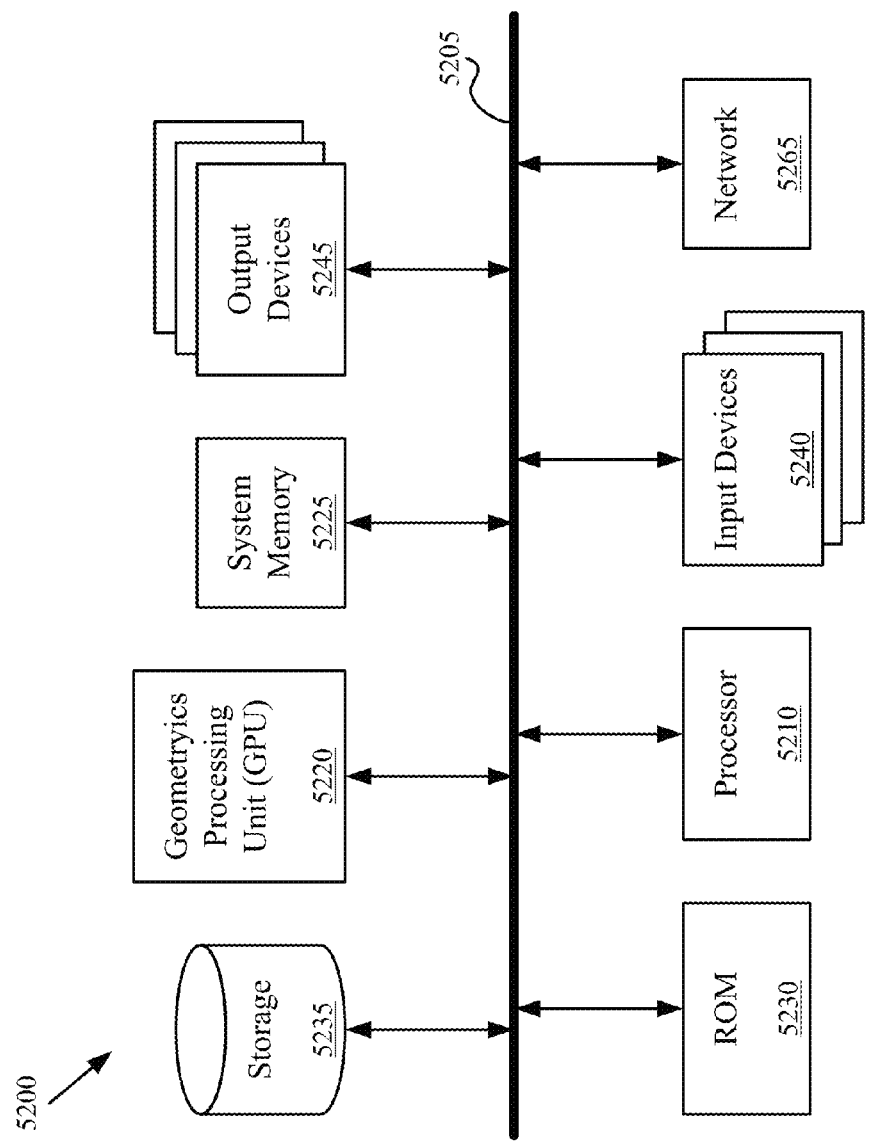
FIG. 52 conceptually illustrates a computer system with which some embodiments of the invention are implemented.

FIG. 52 conceptually illustrates a computer system 5200 with which some embodiments of the invention are implemented. For example, the system described above in reference to FIG. 50 may be at least partially implemented using sets of instructions that are run on the computer system 5200. As another example, the processes described in reference to FIGS. 16, 22, 27, 36, 48, and 49 may be at least partially implemented using sets of instructions that are run on the computer system 5200.

Computer system 5200 includes a bus 5210, a processor 5220, a system memory 5230, a read-only memory (ROM) 5240, a permanent storage device 5250, a graphics processing unit ("GPU") 5260, input devices 5270, output devices 5280, and a network connection 5290. The components of the computer system 5200 are electronic devices that automatically perform operations based on digital and/or analog input signals. The exemplary user interfaces shown in FIG. 9 may be at least partially implemented using sets of instructions that are run on the computer system 5200 and displayed using the output devices 5280.

One of ordinary skill in the art will recognize that the computer system 5200 may be embodied in other specific forms without deviating from the spirit of the invention. For instance, the computer system may be implemented using various specific devices either alone or in combination. For example, a local PC may include the input devices 5270 and output devices 5280, while a remote PC may include the other devices 5210-5260, with the local PC connected to the remote PC through a network that the local PC accesses through its network connection 5290 (where the remote PC is also connected to the network through a network connection).

The bus 5210 collectively represents all system, peripheral, and chipset buses that communicatively connect the numerous internal devices of the computer system 5200. For instance, the bus 5210 communicatively connects the processor 5220 with the system memory 5230, the ROM 5240, and the permanent storage device 5250. From these various memory units, the processor 5220 retrieves instructions to execute and data to process in order to execute the processes of the invention. In some embodiments, the processor comprises a Field Programmable Gate Array (FPGA), an ASIC, or various other electronic components for executing instructions. In some cases, the bus 5210 may include wireless and/or optical communication pathways in addition to or in place of wired connections. For example, the input devices 5270 and/or output devices 5280 may be coupled to the system 5200 using a wireless local area network (W-LAN) connection, Bluetooth®, or some other wireless connection protocol or system.

The ROM 5240 stores static data and instructions that are needed by the processor 5220 and other modules of the computer system. The permanent storage device 5250, on the other hand, is a read-and-write memory device. This device is a non-volatile memory unit that stores instructions and data even when the computer system 5200 is off. Some embodiments of the invention use a mass-storage device (such as a magnetic or optical disk and its corresponding disk drive) as the permanent storage device 5250.

Other embodiments use a removable storage device (such as a floppy disk, flash drive, or CD-ROM) as the permanent storage device. Like the permanent storage device 5250, the system memory 5230 is a read-and-write memory device. However, unlike storage device 5250, the system memory 5230 is a volatile read-and-write memory, such as a random access memory (RAM). The system memory stores some of the instructions and data that the processor needs at runtime. In some embodiments, the sets of instructions used to implement the invention's processes are stored in the system memory 5230, the permanent storage device 5250, and/or the read-only memory 5240. For example, the various memory units include instructions for processing multimedia items in accordance with some embodiments. From these various memory units, the processor 5210 retrieves instructions to execute and data to process in order to execute the processes of some embodiments.

In addition, the bus 5210 connects to the GPU 5260. The GPU of some embodiments performs various graphics processing functions. These functions may include display functions, rendering, compositing, and/or other functions related to the processing or display of graphical data.

The bus 5210 also connects to the input devices 5270 and output devices 5280. The input devices 5270 enable the user to communicate information and select commands to the computer system. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 5280 include printers, electronic display devices that display still or moving images, and electronic audio devices that play audio generated by the computer system. For instance, these display devices may display a GUI. The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computer system.

Finally, as shown in FIG. 52, bus 5210 also couples computer 5200 to a network 5290 through a network adapter (not shown). In this manner, the computer can be a part of a network of computers (such as a local area network ("LAN"), a wide area network ("WAN"), an Intranet, or a network of networks, such as the Internet. For example, the computer 5200 may be coupled to a web server (network 5290) so that a web browser executing on the computer 5200 can interact with the web server as a user interacts with a GUI that operates in the web browser.

As mentioned above, the computer system 5200 may include electronic components, such as microprocessors, storage and memory that store computer program instructions in one or more of a variety of different computer-readable media (alternatively referred to as computer-readable storage media, machine-readable media, machine-readable storage media, readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals. It should be recognized by one of ordinary skill in the art that any or all of the components of computer system 5200 may be used in conjunction with the invention. Moreover, one of ordinary skill in the art will appreciate that any other system configuration may also be used in conjunction with the invention or components of the invention.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc). For example, the present application describes the use of a cursor in the graphical user interface to control (e.g., select, move) user-interface elements in the graphical user interface. However, in some embodiments, these user-interface elements in the graphical user interface can also be controlled or manipulated through other control, such as touch control. In some embodiments, touch control is implemented through an input device that can detect the presence and location of touch on a display of the device. An example of such a device is a touch screen device. In some embodiments, with touch control, a user can directly manipulate user-interface elements by interacting with the graphical user interface that is displayed on the display of the touch screen device. For instance, a user can select a particular user-selectable element in the graphical user interface by simply touching that particular user-selectable element on the display of the touch screen device. As such, when touch control is utilized, a cursor may not even be provided for enabling selection of a user-selectable element of a graphical user interface in some embodiments. However, when a cursor is provided in a graphical user interface, touch control can be used to control the cursor in some embodiments.

While the invention has been described with reference to numerous specific details, one of ordinary skill in the art will recognize that the invention can be embodied in other specific forms (i.e., different embodiments may implement or perform different operations) without departing from the spirit of the invention. One of ordinary skill in the art would also recognize that some embodiments may divide a particular module into multiple modules. In addition, although the examples given above may discuss accessing the system using a particular device (e.g., a PC), one of ordinary skill will recognize that a user could access the system using alternative devices (e.g., a cellular phone, PDA, smartphone, BlackBerry®, or other device).

One of ordinary skill in the art will realize that, while the invention has been described with reference to numerous specific details, the invention can be embodied in other specific forms without departing from the spirit of the invention. For instance, alternate embodiments may be implemented by using a generic processor to implement the video processing functions instead of using a GPU. One of ordinary skill in the art would understand that the invention is not to be limited by the foregoing illustrative details, but rather is to be defined by the appended claims.

What is claimed is:

1. A method for providing a media editing application comprising a graphical user interface (GUI) for compositing media clips, said method comprising:
   providing a first display area for displaying a composite presentation that the media editing application creates by compositing a plurality of media clips, each of a set of the clips having a plurality of media clip attributes that are selectable within the GUI;
   providing a second display area for displaying a preview of the composite presentation;
   to define a plurality of key indices in a third display area, providing a plurality of tools in the second display area, the plurality of tools comprising (i) a set of interpolation presets that are individually selectable to specify a rate of a change over a duration of time in a selected attribute of a media clip in the composite presentation and (ii) a duration control tool to specify the duration of the change in the selected attribute; and
   providing the third display area for displaying a key-indexed graph that represents the selected attribute over the specified duration, wherein an input that is received through at least one of the tools provided in the second display area modifies the selected attribute, modifies the key-indexed graph, and causes a first key index associated with a first image of the media clip and a second key index associated with a second, different image of the media clip to be displayed on the key-indexed graph.

2. The method of claim 1 further comprising providing a playhead that spans a timeline, wherein a start or end of the change in the attribute is defined by a position of the playhead.

3. The method of claim 2, wherein selection of a preset causes the first key index to be displayed on the key-indexed graph at the position of the playhead.

4. The method of claim 3, wherein specification of the duration causes the second key index to be displayed on the key-indexed graph at a position before the position of the playhead.

5. The method of claim 3, wherein specification of the duration causes the second key index to be displayed on the key-indexed graph at a position after the position of the playhead.

6. The method of claim 2, wherein the duration control tool comprises a plurality of different durations that are individually selectable to specify the duration starting or ending at the position of the playhead.

7. The method of claim 2, wherein an interpolation preset defines the first key index at the position of the playhead and the second key index before the position of the playhead, wherein a preset duration is equal to the duration between the first key index and the second key index.

8. The method of claim 2, wherein an interpolation preset specifies a pre-defined duration of a transition created in the second display area, wherein the pre-defined duration starts at a playhead.

9. The method of claim 8, wherein the interpolation preset defines the first key index at the position of the playhead and the second key index after the playhead, wherein the pre-defined duration is equal to the duration between the first key index and the second key index.

10. The method of claim 1, wherein the set of interpolation presets comprises pre-defined interpolations set by the media editing application.

11. A non-transitory computer readable medium storing a media editing application that when executed by at least one processing unit provides a graphical user interface ("GUI") for editing a media clip comprising a sequence of images, the GUI comprising:
   a first display area for displaying a composite presentation that the media editing application creates by compositing a plurality of media clips, each of a set of the clips having a plurality of media clip attributes that are selectable within the GUI;
   a second display area for displaying a preview of the composite presentation;
   a plurality of tools, provided in the second display area, for defining a plurality of key indices for a key-indexed graph, the plurality of tools comprising (i) a set of interpolation presets that are individually selectable to specify a rate of a change over a duration of time in a selected attribute of the media clip in the composite presentation, and (ii) a duration control tool to specify the duration of the change in the selected attribute; and
   a third display area for displaying the key-indexed graph that represents the selected attribute over the specified duration, wherein an input that is received through at least one of the tools provided in the second display area modifies the selected attribute, modifies the key-indexed graph, and causes a first key index associated with a first image of the media clip and a second key index associated with a second, different image of the media clip to be displayed on the key-indexed graph.

12. The non-transitory computer readable medium of claim 11, wherein the set of interpolation presets comprises user-defined interpolations created in the media editing application.

13. The non-transitory computer readable medium of claim 11, wherein the plurality of tools are selectable through user interface items in the second display area.

14. The non-transitory computer readable medium of claim 11, wherein the plurality of tools are selectable through context menus that are invoked in the second display area.

15. The non-transitory computer readable medium of claim 11, wherein the plurality of tools are graphical items that are displayed directly on a displayed image of the media clip in the second display area.

16. An electronic device comprising:
a non-transitory computer readable medium storing a program that when executed by at least one processing unit provides a graphical user interface (GUI) for editing a media clip comprising a sequence of images, the GUI comprising:
composite first display area for displaying a composite presentation that the media editing application creates by compositing a plurality of media clips, each of a set of the clips having a plurality of media clip attributes that are selectable within the GUI;
a second display area for displaying a preview of the composite presentation;
a plurality of tools, provided in the second display area, for defining a plurality of key indices for a key-indexed graph, the plurality of tools comprising (i) a set of interpolation presets that are individually selectable to specify a rate of a change over a duration of time in a selected attribute of the media clip in the composite presentation and (ii) a duration control tool to specify the duration of the change in the selected attribute; and
a third display area for displaying the key-indexed graph that represents the selected attribute over the specified duration, wherein an input that is received through at least one of the tools provided in the second display area modifies the selected attribute, modifies the key-indexed graph, and causes a first key index associated with a first image of the media clip and a second key index associated with a second, different image of the media clip to be displayed on the key-indexed graph.

17. The non-transitory computer readable medium of claim 16, wherein the plurality of tools further comprises a set of on-image user interface (UI) control tools for modifying at least one of the plurality of media clip attributes, wherein a selection of one of the on-image UI control tools modifies the selected attribute, modifies the key-indexed graph, and causes another key index to be displayed on the key-indexed graph.

18. The non-transitory computer readable medium of claim 16, wherein the duration control tool receives user input of a duration to specify the duration.

19. The non-transitory computer readable medium of claim 16, wherein the GUI further comprises a timeline comprising a playhead, wherein the third display area spans the timeline.

20. The non-transitory computer readable medium of claim 19, wherein the selection of the preset causes the third display area to display the first key index at the position of the playhead.

21. The non-transitory computer readable medium of claim 20, wherein the specification of the duration causes the third display area to display the second key index before the position of the playhead.

\* \* \* \* \*